US009262644B2

(12) United States Patent
Nagai et al.

(10) Patent No.: US 9,262,644 B2
(45) Date of Patent: Feb. 16, 2016

(54) SERVER, RECORDING MEDIUM, AND IMAGE DISPLAY SYSTEM

(71) Applicants: Kohta Nagai, Kanagawa (JP); Hiroyuki Matsushima, Kanagawa (JP); Daigo Uchiyama, Kanagawa (JP)

(72) Inventors: Kohta Nagai, Kanagawa (JP); Hiroyuki Matsushima, Kanagawa (JP); Daigo Uchiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 162 days.

(21) Appl. No.: 13/937,300

(22) Filed: Jul. 9, 2013

(65) Prior Publication Data

US 2014/0020117 A1    Jan. 16, 2014

(30) Foreign Application Priority Data

Jul. 12, 2012  (JP) .................................. 2012-156846
Nov. 21, 2012  (JP) .................................. 2012-255602

(51) Int. Cl.

| G06F 21/62 | (2013.01) |
|---|---|
| G06F 21/31 | (2013.01) |
| G06F 21/33 | (2013.01) |
| G06F 21/44 | (2013.01) |
| G06F 21/84 | (2013.01) |

(52) U.S. Cl.
CPC ............ *G06F 21/6218* (2013.01); *G06F 21/31* (2013.01); *G06F 21/33* (2013.01); *G06F 21/44* (2013.01); *G06F 21/84* (2013.01); *G06F 2221/2137* (2013.01)

(58) Field of Classification Search
CPC ..... G06F 21/6218; G06F 21/44; G06F 21/31; G06F 21/84; G06F 21/33; G06F 2221/2137
See application file for complete search history.

(56) References Cited

U.S. PATENT DOCUMENTS

| 6,934,746 | B2 | 8/2005 | Shima | |
|---|---|---|---|---|
| 2002/0138749 | A1* | 9/2002 | Koguchi et al. | ............... 713/191 |
| 2006/0061580 | A1* | 3/2006 | Fujiwara et al. | ............. 345/530 |
| 2006/0075201 | A1 | 4/2006 | Mizutani et al. | |
| 2006/0077165 | A1* | 4/2006 | Jang | ................. 345/97 |
| 2009/0298546 | A1* | 12/2009 | Kim et al. | ..................... 455/566 |

FOREIGN PATENT DOCUMENTS

| JP | 2003-208405 | 7/2003 |
|---|---|---|
| JP | 2006-106992 | 4/2006 |
| JP | 2006-229885 | 8/2006 |
| JP | 2006-236250 | 9/2006 |
| JP | 2008-022548 | 1/2008 |
| JP | 2008-310247 | 12/2008 |
| JP | 4206673 | 1/2009 |
| JP | 2013-117949 | 6/2013 |
| WO | 2008/156046 A1 | 12/2008 |
| WO | 2013/065858 A1 | 5/2013 |

OTHER PUBLICATIONS

U.S. Appl. No. 13/774,046, filed Feb. 22, 2013.

* cited by examiner

*Primary Examiner* — Izunna Okeke
*Assistant Examiner* — Cheng-Feng Huang
(74) *Attorney, Agent, or Firm* — Ipusa, PLLC

(57) ABSTRACT

A server connectable to an apparatus providing contents and an image display apparatus includes an index information processing part configured to provide the image display apparatus with index information for causing a list of information items associated with the contents to be displayed by the image display apparatus, an image data processing part configured to provide the image display apparatus with image data for causing a content associated with an information item selected from the list to be displayed by the image display apparatus, and an apparatus authentication part configured to cause the index information processing part and the image data processing part to execute respective processes when the identification information of the image display apparatus that has requested to obtain the content associated with the selected information item by using access authority information regarding authority to access the content is managed in correlation with the access authority information.

15 Claims, 75 Drawing Sheets

FIG.5

| USER INFORMATION | | |
|---|---|---|
| USER ID | | abc |
| PASSWORD | | xxx |
| ACCESS NUMBER | | 12345 |
| AVAILABLE SERVICE | local | ○ |
| | ext1 | ○ |
| | ext2 | × |
| NOTIFICATION DESTINATION ADDRESS | | User@example.com |
| APPARATUS AUTHENTICATION SETTING | | ENABLED |
| PROJECTION AUTHORIZED PROJECTOR ID | | ABC0123456 |
| | | BCD1234567 |
| | | CDE2345678 |

FIG.6

| PROJECTOR REGISTRATION TICKET | |
|---|---|
| PROJECTOR ID | ABC0123456 |
| REGISTRATION ONE-TIME PASSWORD | Ebz9 |
| ONE-TIME PASSWORD EXPIRATION DATE & TIME | 2012/4/1 12:00 |

FIG.12A

| OBJECT OF CERTIFICATION | IDENTIFICATION NAME, PUBLIC KEY |
| --- | --- |
| ISSUER | IDENTIFICATION NAME, PUBLIC KEY |
| VALIDITY PERIOD | START DATE, EXPIRATION DATE |
| MANAGEMENT INFORMATION | VERSION, SERIAL NUMBER |
| EXTENSION INFORMATION | BASIC RESTRICTIONS, NETSCAPE FLAG, ETC. |

FIG.12B

| IDENTIFICATION NAME ITEM | ABBR. | DESCRIPTION | EXAMPLE |
| --- | --- | --- | --- |
| COMMON NAME | CN | NAME TO BE CERTIFIED URL FOR SSL CONNECTION | CN=WWW.EXAMPLE.COM |
| ORGANIZATION OR COMPANY | O | OFFICIAL ENGLISH NAME OF ORGANIZATION | O=EXAMPLE JAPAN K.K. |
| ORGANIZATIONAL UNIT | OU | NAME OF DEPARTMENT, ETC. | OU=CUSTOMER SERVICE |
| CITY/LOCALITY | L | CITY OF LOCATION | L=SAPPORO |
| STATE/PROVINCE | ST | STATE/PROVINCE OF LOCATION | ST=HOKKAIDO |
| COUNTRY | C | ISO CODE OF NAME OF COUNTRY OF LOCATION IN CASE OF JAPAN JP | C=JP |

FIG.14

(a) http://projection.example.com/12345/

(b) http://projection.example.com/12345/local/

(c) http://projection.example.com/12345/ext1/

(d) http://projection.example.com/12345/ext2/

(e) http://projection.example.com/12345/ext1/folder1/file1.jpg

FIG.16

```
[
  {
    "type":"file",
    "name":"REGISTER ID ABC0123456 WITH PROJECTION SERVER TO PERFORM PROJECTION"
  }
]
```

FIG.20

```
{
  [
    {
      "type":"file",
      "name":"AUTHORIZATION FOR PROJECTION IS NECESSARY.jpg"
    [
}
```

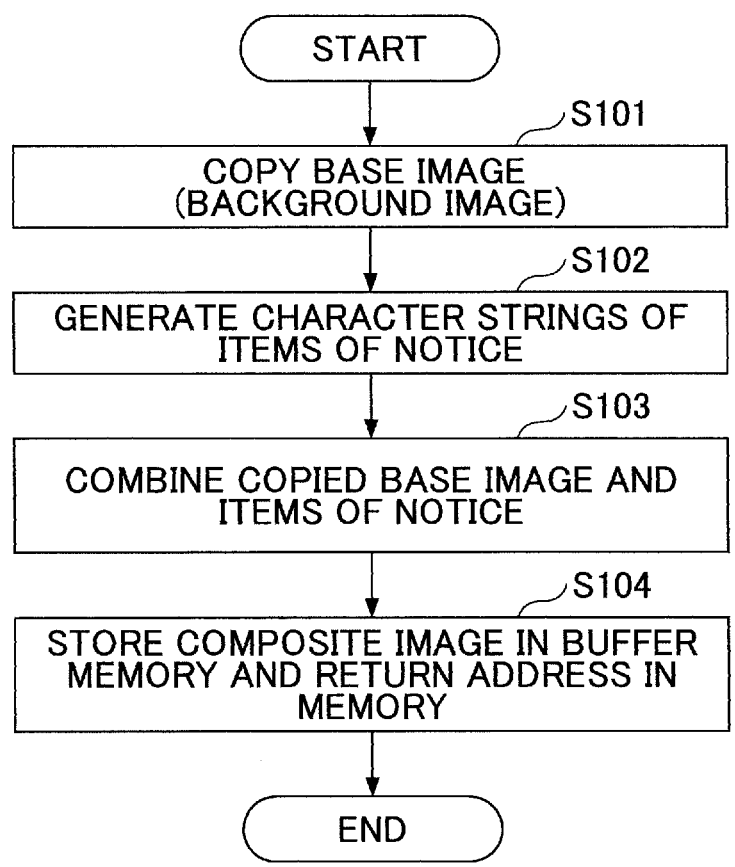

FIG.25A

ENTER APPARATUS ID OR ONE-TIME PASSWORD ON APPARATUS
AUTHENTICATION SETTING SCREEN TO REGISTER PROJECTOR

APPARATUS ID: ←NOTICE ITEM 1

ONE-TIME PASSWORD: ←NOTICE ITEM 2

EXPIRATION DATE AND TIME: ←NOTICE ITEM 3

FIG.25B

| NOTICE ITEM 1 | ABC0123456 |
|---|---|
| NOTICE ITEM 2 | Ebz9 |
| NOTICE ITEM 3 | 2012/4/1 12:00 | http://www.example.com/register?product_id=ABC0123456&onetime=Ebz9 product_id = ID OF PROJECTOR TO BE REGISTERED
onetime = REGISTRATION ONE-TIME PASSWORD http://www.example.com/login?next="http://www.example.com/register?product_id=ABC0123456&onetime=Ebz9

FIG.34

```
[
  {
    "type":"file",
    "name":"QR CODE.jpg"
  }
]
```

FIG.43

| USER INFORMATION | | |
|---|---|---|
| USER ID | | abc |
| PASSWORD | | xxx |
| ACCESS NUMBER | | 12345 |
| AVAILABLE SERVICE | local | ○ |
| | ext1 | ○ |
| | ext2 | × |
| NOTIFICATION DESTINATION ADDRESS | | User@example.com |
| APPARATUS AUTHENTICATION SETTING | | ENABLED |

FIG.44

| FILE-BY-FILE PROJECTION AUTHORIZATION INFORMATION | |
|---|---|
| FILE PATH | /data/abc/presentation/ |
| FILENAME | abc.jpg |
| USER ID | abc |
| PROJECTION AUTHORIZED PROJECTOR ID | ABC0123456 |
| | BCD1234567 |
| | CDE2345678 |

| FILE-BY-FILE PROJECTION AUTHORIZATION INFORMATION | |
|---|---|
| FILE PATH | /data/abc/presentation/ |
| FILENAME | bcd.ppt |
| USER ID | abc |
| PROJECTION AUTHORIZED PROJECTOR ID | ABC0123456 |
| | BCD1234567 |

FIG.48

| ACCESS NUMBER-BASED APPARATUS AUTHENTICATION SETTING INFORMATION | |
|---|---|
| ACCESS NUMBER | 12345 |
| APPARATUS AUTHENTICATION SETTING | ENABLED |
| PROJECTION AUTHORIZED PROJECTOR ID | ABC0123456 |

FIG.49

| FILE INFORMATION | |
|---|---|
| FILENAME | presentation.ppt |
| ACCESS NUMBER | 12345 |
| REGISTRATION DATE & TIME | 2012-01-01 10:00 |
| PROJECTION RESTRICTION | PROJECTION FOR ONLY ONE TIME |
| START OF VALIDITY PERIOD | 2012-01-01 10:00 |
| END OF VALIDITY PERIOD | 2012-01-08 10:00 |
| MULTIPAGE IDENTIFICATION | ○ |
| FILE PATH | /data/abc/presentation/ |

FIG.50

| PROJECTOR REGISTRATION TICKET | |
|---|---|
| PROJECTOR ID | ABC0123456 |
| REGISTRATION ONE-TIME PASSWORD | Ebz97fJK |
| ONE-TIME PASSWORD EXPIRATION DATE & TIME | 2012/4/1 12:00 |

FIG.54

| ACCESS NUMBER-BASED APPARATUS AUTHENTICATION SETTING INFORMATION ||
|---|---|
| ACCESS NUMBER | 12345 |
| APPARATUS AUTHENTICATION SETTING | ENABLED |

FIG.55

PROJECTION SERVER PORTAL

USER ID:

PASSWORD:

OR

ACCESS NUMBER:

LOGON

INTERNAL STORAGE SERVICE

FILE UPLOAD

REFERENCE  SELECT FILE

⊙ ONE-TIME ONLY PROJECTION    ○ LIMITED PERIOD PROJECTION

APPARATUS AUTHENTICATION SETTING    ⊙ ENABLED   ○ DISABLE ~2021

UPLOAD

FILE MANAGEMENT

TO FILE MANAGEMENT SCREEN    ~2020

FIG.56

ACCESS NUMBER: 12345

FILENAME: presentation.ppt

APPARATUS AUTHENTICATION
SETTING: DISABLED     [ENABLED]  [DISABLE]

PROJECTION AUTHORIZED PROJECTOR ID

[                    ]  [REGISTER]

IMPORT APPARATUS AUTHENTICATION SETTING

ACCESS NUMBER: [            ]~2031

[    IMPORT    ]~2032

| ACCESS NUMBER-BASED APPARATUS AUTHENTICATION SETTING INFORMATION | |
|---|---|
| ACCESS NUMBER | 12345 |
| APPARATUS AUTHENTICATION SETTING | DISABLE |
| PROJECTION AUTHORIZED PROJECTOR ID | ABC0123456 |

FIG.58B

| ACCESS NUMBER-BASED APPARATUS AUTHENTICATION SETTING INFORMATION | |
|---|---|
| ACCESS NUMBER | 45678 |
| APPARATUS AUTHENTICATION SETTING | ENABLED |
| PROJECTION AUTHORIZED PROJECTOR ID | CDE456789 |

FIG.58C

| ACCESS NUMBER-BASED APPARATUS AUTHENTICATION SETTING INFORMATION | |
|---|---|
| ACCESS NUMBER | 12345 |
| APPARATUS AUTHENTICATION SETTING | ENABLED |
| PROJECTION AUTHORIZED PROJECTOR ID | CDE456789 |

FIG.59

| ACCESS NUMBER-BASED APPARATUS AUTHENTICATION SETTING INFORMATION | |
|---|---|
| ACCESS NUMBER | 12345 |
| APPARATUS AUTHENTICATION SETTING | ENABLED |
| APPARATUS AUTHENTICATION LOCK | ENABLED |
| PROJECTION AUTHORIZED PROJECTOR ID | ABC0123456 |

FIG.61

ACCESS NUMBER: 12345

FILENAME: presentation.ppt

APPARATUS AUTHENTICATION
SETTING: DISABLED    [ENABLED]  [DISABLE]

PROJECTION AUTHORIZED PROJECTOR ID

[                    ]  [REGISTER]

IMPORT APPARATUS AUTHENTICATION SETTING

ACCESS NUMBER: [        ]

[IMPORT]

LOCK APPARATUS AUTHENTICATION SETTING
                                    2041        2042
APPARATUS AUTHENTICATION   [ENABLED]  [DISABLE]
LOCK: DISABLED
                                                    ~2040

FIG.63

PROJECTION SERVER PORTAL

USER ID:

PASSWORD:

OR

ACCESS NUMBER:

LOGON

INTERNAL STORAGE SERVICE

FILE UPLOAD

[REFERENCE] SELECT FILE

⦿ ONE-TIME ONLY PROJECTION ○ LIMITED PERIOD PROJECTION

ACCESS NUMBER (OPTIONAL) ⎫
⎬ 2051
⎭

UPLOAD

FILE MANAGEMENT

TO FILE MANAGEMENT SCREEN ~2050

FIG.66A

| ACCESS NUMBER-BASED APPARATUS AUTHENTICATION SETTING INFORMATION ||
|---|---|
| ACCESS NUMBER | 12345 |
| FILENAME | abc.jpg |
| FILE PATH | /data/abc/presentation/ |
| APPARATUS AUTHENTICATION SETTING | ENABLED |
| PROJECTION AUTHORIZED PROJECTOR ID | ABC0123456 |
| | BCD1234567 |
| | CDE2345678 |

FIG.66B

| ACCESS NUMBER-BASED APPARATUS AUTHENTICATION SETTING INFORMATION ||
|---|---|
| ACCESS NUMBER | 12345 |
| FILENAME | bcd.jpg |
| FILE PATH | /data/abc/presentation/ |
| APPARATUS AUTHENTICATION SETTING | ENABLED |
| PROJECTION AUTHORIZED PROJECTOR ID | ABC0123456 |
| | BCD1234567 |

FIG.71

ACCESS NUMBER: 12345

FILENAME: presentation.ppt

APPARATUS AUTHENTICATION
SETTING: DISABLED       [ENABLED]  [DISABLE]

PROJECTION AUTHORIZED PROJECTOR ID

[                    ]  [REGISTER]

OR
ONE-TIME PASSWORD

[                    ]  [REGISTER]~2072   ~2070
                   ~2071

FIG.76

```
ENTER APPARATUS ID OR ONE-TIME PASSWORD ON APPARATUS
AUTHENTICATION SETTING SCREEN TO REGISTER PROJECTOR

APPARATUS ID:            ABC0123456

ONE-TIME PASSWORD:       Ebz97fJK

EXPIRATION DATE AND TIME: 2012/4/1 12:00
```

ENTER APPARATUS ID OR ONE-TIME PASSWORD ON APPARATUS
AUTHENTICATION SETTING SCREEN TO REGISTER PROJECTOR

APPARATUS ID:      ⟵ NOTICE ITEM 1

ONE-TIME PASSWORD:      ⟵ NOTICE ITEM 2

EXPIRATION DATE AND TIME:      ⟵ NOTICE ITEM 3

FIG.79B

| NOTICE ITEM 1 | ABC0123456 |
|---|---|
| NOTICE ITEM 2 | Ebz97fJK |
| NOTICE ITEM 3 | 2012/4/1 12:00 |

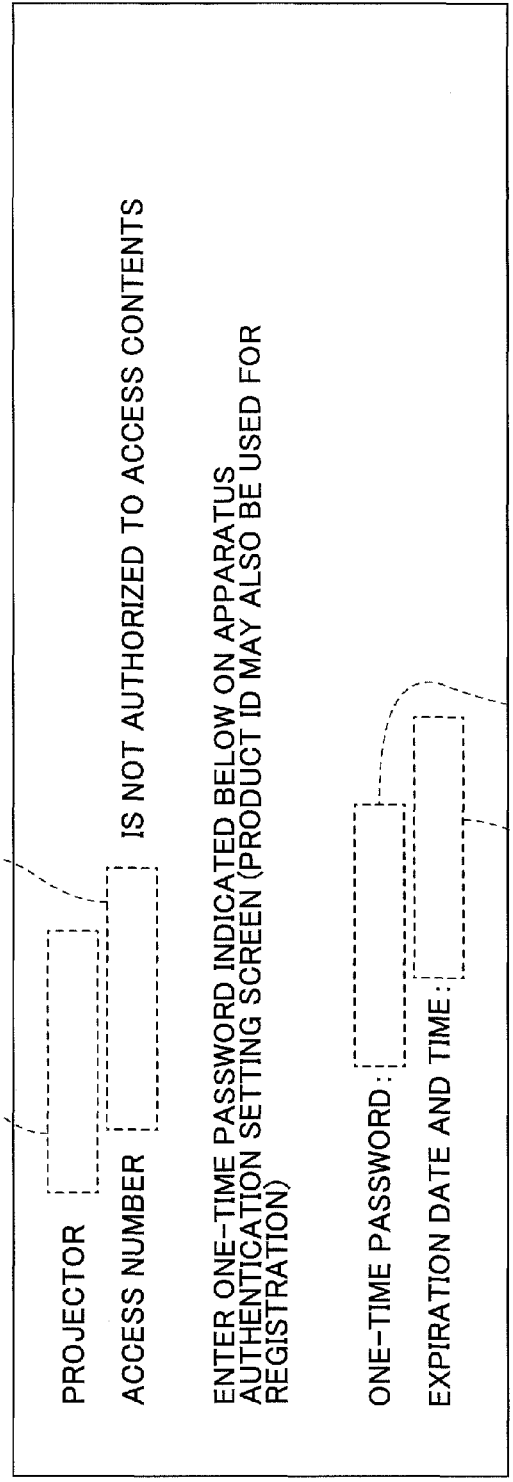

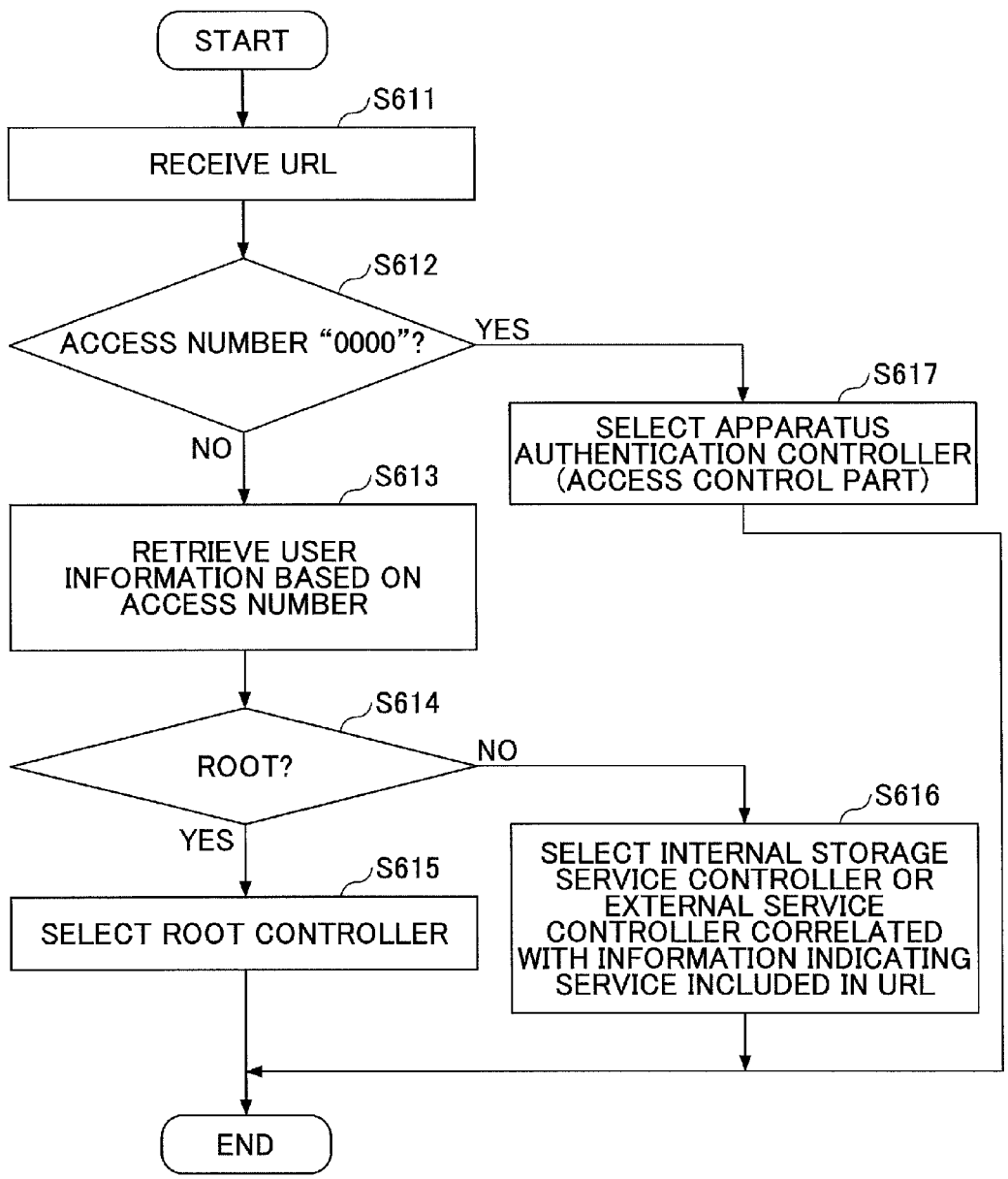

SERVER, RECORDING MEDIUM, AND IMAGE DISPLAY SYSTEM

CROSS-REFERENCE TO RELATED APPLICATIONS

The present application is based upon and claims the benefit of priority of Japanese Patent Applications No. 2012-156846, filed on Jul. 12, 2012, and No. 2012-255602, filed on Nov. 21, 2012, the entire contents of which are incorporated herein by reference.

BACKGROUND OF THE INVENTION

1. Field of the Invention

The present invention relates to a server, a recording medium, and an image display system.

2. Description of the Related Art

In these years, it has become common for companies to hold a conference while projecting an image by connecting a personal computer (PC) to a projector. Furthermore, conventional projectors have been known that call and project a projectable file stored in an attached universal serial bus (USB) memory. (See, for example, Japanese Laid-Open Patent Application No. 2008-310247.)

SUMMARY OF THE INVENTION

According to an aspect of the present invention, a server connectable via a network to one or more apparatuses providing a plurality of contents and to an image display apparatus displaying the contents includes an index information processing part configured to provide the image display apparatus with index information for causing a list of information items associated with the contents to be displayed by the image display apparatus; an image data processing part configured to provide the image display apparatus with image data for causing a content associated with an information item selected from the list to be displayed by the image display apparatus; and an apparatus authentication part configured to cause the index information processing part and the image data processing part to execute respective processes when identification information of the image display apparatus that has requested to obtain the content associated with the selected information item by using access authority information regarding authority to access the content is managed in correlation with the access authority information.

According to an aspect of the present invention, a non-transient computer-readable recording medium has an executable program recorded thereon, wherein the program instructs a computer processor to implement, in a server connectable via a network to one or more apparatuses providing a plurality of contents and to an image display apparatus displaying the contents, an index information processing part configured to provide the image display apparatus with index information for causing a list of information items associated with the contents to be displayed by the image display apparatus; an image data processing part configured to provide the image display apparatus with image data for causing a content associated with an information item selected from the list to be displayed by the image display apparatus; and an apparatus authentication part configured to cause the index information processing part and the image data processing part to execute respective processes when identification information of the image display apparatus that has requested to obtain the content associated with the selected information item using access authority information regarding authority to access the content is managed in correlation with the access authority information.

According to an aspect of the present invention, an image display system includes one or more apparatuses configured to provide a plurality of contents; an image display apparatus configured to display the contents; and a server connected to the one or more apparatuses and the image display apparatus via a network, wherein the server includes an index information processing part configured to provide the image display apparatus with index information for causing a list of information items associated with the contents to be displayed by the image display apparatus; an image data processing part configured to provide the image display apparatus with image data for causing a content associated with an information item selected from the list to be displayed by the image display apparatus; and an apparatus authentication part configured to cause the index information processing part and the image data processing part to execute respective processes when identification information of the image display apparatus that has requested to obtain the content associated with the selected information item by using access authority information regarding authority to access the content is managed in correlation with the access authority information, and wherein the image display apparatus includes a first display part configured to display a screen of the list of the information items associated with the contents based on the provided index information; and a second display part configured to display a screen of the content associated with the selected information item based on the provided image data.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 5 is a diagram illustrating a configuration of user information according to the first embodiment;

FIG. 6 is a diagram illustrating a configuration of a projector registration ticket according to the first embodiment;

FIGS. 12A and 12B are diagrams illustrating the contents of a client certificate according to the first embodiment;

FIG. 14 is a diagram illustrating configurations of URLs received by a dispatcher part according to the first embodiment;

FIG. 16 is a diagram illustrating a configuration of an index indicating the apparatus ID of a projector according to the first embodiment;

FIG. 20 is a diagram illustrating a configuration of the index of a screen that displays the apparatus ID of a projector according to the first embodiment;

FIG. 24 is a flowchart illustrating a process for generating the binary data of "AUTHORIZATION FOR PROJECTION IS NECESSARY.jpg" according to the first embodiment;

FIGS. 25A and 25B are diagrams illustrating a base image and items of notice according to the first embodiment;

FIG. 34 is a diagram illustrating a configuration of an index of a QR code according to the first embodiment;

FIG. 43 is a diagram illustrating a configuration of user information according to the second embodiment;

FIG. 44 is a diagram illustrating a configuration of file-by-file projection authorization information according to the second embodiment;

FIG. 48 is a diagram illustrating a configuration of access number-based apparatus authentication setting information according to a third embodiment;

FIG. 49 is a diagram illustrating a configuration of file information according to the third embodiment;

FIG. 50 is a diagram illustrating a configuration of a projection registration ticket according to the third embodiment;

FIG. 54 is a diagram illustrating another configuration of access-number based apparatus authentication setting information according to the third embodiment;

FIG. 55 is a diagram illustrating an image of another portal screen according to the third embodiment;

FIG. 56 is a diagram illustrating an image of another access number-based apparatus authentication setting screen according to the third embodiment;

FIGS. 58A, 58B, and 58C are image diagrams for illustrating a process of importing another access number-based apparatus authentication setting according to the third embodiment;

FIG. 59 is a diagram illustrating another configuration of access number-based apparatus authentication setting information according to the third embodiment;

FIG. 61 is a diagram illustrating an image of another access number-based apparatus authentication setting screen according to the third embodiment;

FIG. 63 is a diagram illustrating an image of another portal screen according to the third embodiment;

FIGS. 66A and 66B are diagrams illustrating other configurations of access number-based apparatus authentication setting information according to the third embodiment;

FIG. 71 is a diagram illustrating an image of another access number-based apparatus authentication setting screen according to the third embodiment;

FIG. 76 is a diagram illustrating an image of a notification screen that is projected when "AUTHORIZATION FOR PROJECTION IS NECESSARY.jpg" is selected according to the third embodiment;

FIGS. 79A and 79B are diagrams illustrating a base image and notice items according to the third embodiment;

FIGS. 80A and 80B are diagrams illustrating other base image and notice items according to the third embodiment; and FIG. 81 is a flowchart illustrating another procedure for processes of a dispatcher part and a controller part according to the third embodiment.

DETAILED DESCRIPTION OF THE PREFERRED EMBODIMENTS

In order for conventional projectors to project images, a PC or a USB memory that contains images needs to be connected or attached to the projectors. Accordingly, in the case of carrying around a projector and performing projection, it is necessary to carry around a PC or a USB memory that contains images together with the projector, which causes inconvenience.

According to an aspect of the present invention, a server, a recording medium, and an image display system are provided that improve the convenience of an image display apparatus.

A description is given below, with reference to the accompanying drawings, of embodiments of the present invention.

[First Embodiment]

Figure 1:
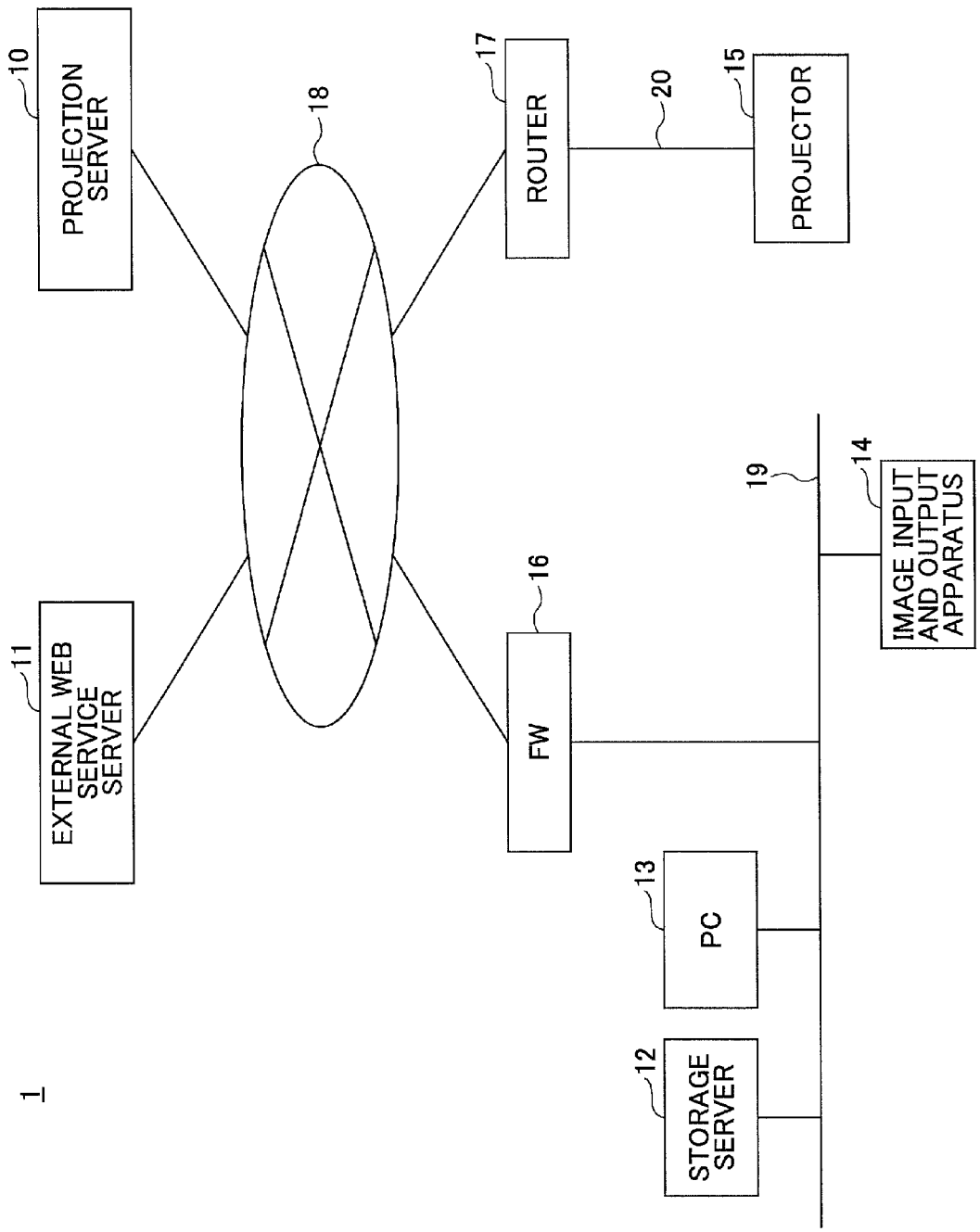
FIG. 1 is a diagram illustrating a configuration of a projection system according to a first embodiment.

FIG. 1 is a diagram illustrating a configuration of a projection system according to a first embodiment. Referring to FIG. 1, a projection system 1 includes a projection server 10, an external Web service server 11, a storage server 12, a PC 13, an image input and output apparatus 14, a projector 15, a firewall (FW) 16, a router 17, and networks 18 through 20.

The projection server 10 and the external Web service server 11 are connected via the network 18 such as the Internet. For example, the projection server 10 and the external Web service server 11 may be in the form of a so-called "cloud." The external Web service server 11 is an example of an apparatus that provides Web services. The external Web service server 11 provides Web services such as a storage service and an application service as, for example, cloud contents. The external Web service server 11 provides the projection server 10 with contents.

The network 19 such as a local area network (LAN) is connected to the network 18 via the FW 16. The storage server 12, the PC 13, and the image input and output apparatus 14 are connected to the network 19. The storage server 12, the PC 13, and the image input and output apparatus 14 provide the projection server 10 with contents. Examples of the image input and output apparatus 14 include a multifunction machine, a scanner, and a digital camera.

The network 20 such as a LAN is connected to the network 18 via the router 17. The projector 15 is connected to the network 20. The projector 15 includes a client function that operates in association with the projection server 10. The projector 15 uses the client function to obtain contents from the projection server 10 and project the obtained contents as described below. Each of the networks 19 and 20 may be wired, wireless, or a combination of wired and wireless networks.

The projector 15 according to this embodiment is an example of an image display apparatus. Furthermore, the projection system 1 is an example of an image display system. Projection by the projector 15 is an example of display by an image display apparatus. In addition, the Web service server 11, the storage server 12, the PC 13, and the image input and output apparatus 14 are examples of apparatuses that provide an image display apparatus with contents. The projection server 10 and the external Web service server 11 may be implemented by software or services that operate in one or more computers.

Figure 2:
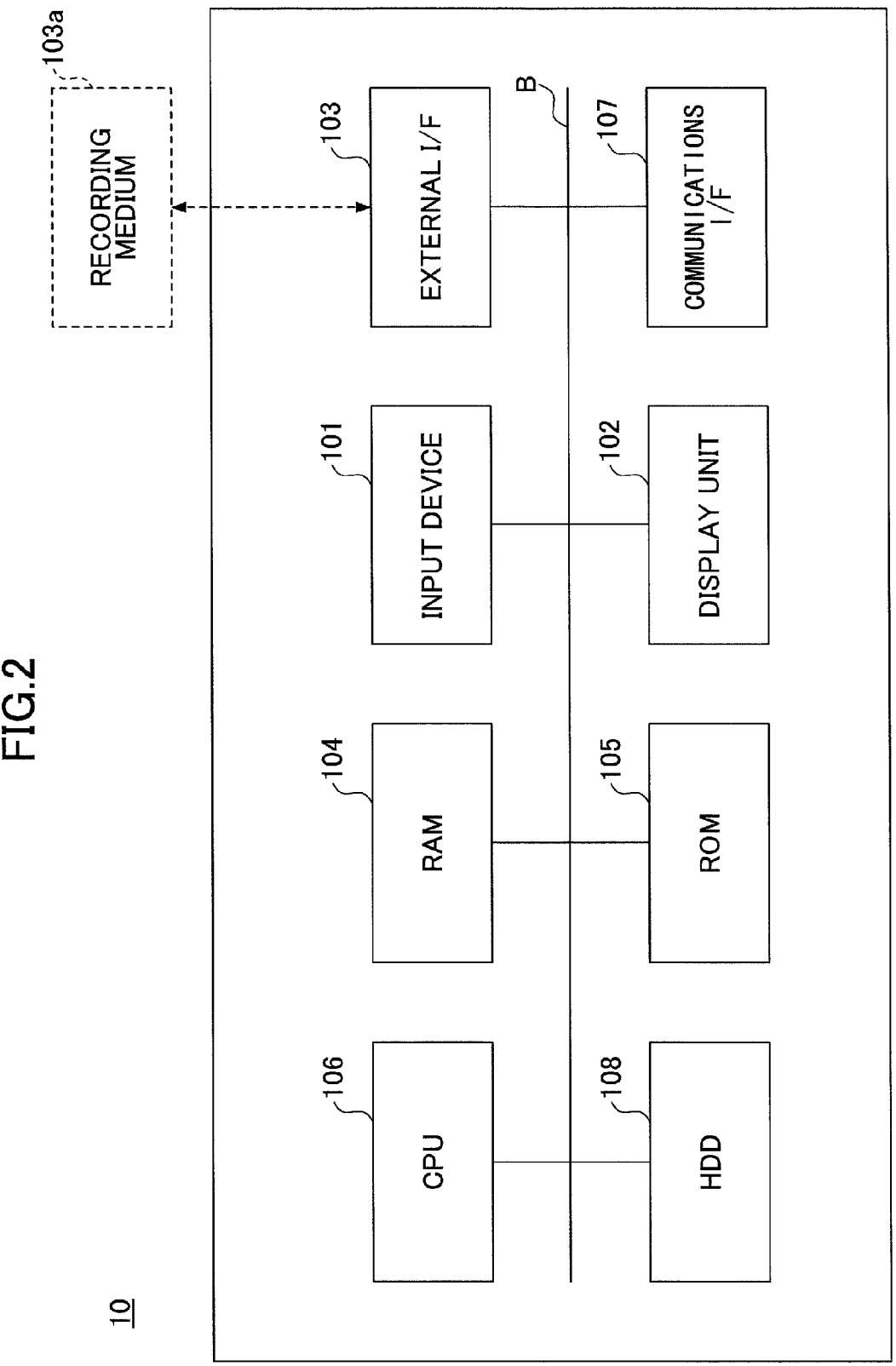
FIG. 2 is a diagram illustrating a hardware configuration of a projection server according to the first embodiment.

FIG. 2 is a diagram illustrating a hardware configuration of a projection server according to this embodiment. Referring to FIG. 2, the projection server 10 includes an input device 101, a display unit 102, an external interface (I/F) 103, a random access memory (RAM) 104, a read-only memory 105, a central processing unit (CPU) 106, a communications I/F 107, and a hard disk drive 108, all of which are interconnected by a bus B.

The input device 101 includes a keyboard and a mouse, and is used to input operation signals to the projection server 10. The display unit 102 includes a display or the like, and displays the management information and log of the projection server 10.

The communications I/F 107 is an interface that connects the projection server 10 to the network 18. This enables the projection server 10 to communicate data with the external Web service server 11, the storage server 12, the PC 13, the image input and output apparatus 14, and the projector 15 through the communications I/F 107.

The HDD 108 is a nonvolatile storage device that contains programs and data. The programs and data stored in the HDD 108 include an operating system (OS), which is basic software that performs overall control of the projection server 10, and application software that provides various kinds of functions on the OS. Furthermore, the HDD 108 manages the stored programs and data with a predetermined file system and/or a database (DB).

The external I/F 103 is an interface with external devices and apparatuses. Examples of external devices and apparatuses include a recording medium 103a. This enables the projection server 10 to read and/or write to the recording medium 103a via the external I/F 103. Examples of the recording medium 103a include a flexible disk, a compact disk (CD), a digital versatile disk (DVD), an SD memory card, and a USB memory.

The ROM 105 is a nonvolatile semiconductor memory (storage device) that is capable of retaining programs and data even after the power is shut off. The ROM 105 contains programs and data of a basic input/output system (BIOS), an OS configuration, a network configuration, etc., which are executed at the time of activation of the projection server 10. The RAM 104 is a volatile semiconductor memory (storage device) the temporary retains programs and data.

The CPU 106 is a processor that performs overall control of the projection server 10 and implements functions of the projection server 10 by reading programs and data from a storage device such as the ROM 105 or the HDD 108 into the RAM 104 and executing processes.

It is possible for the projection server 10 to execute various kinds of processes as described below on account of the above-described hardware configuration. Alternatively, the projection server 10 may execute various kinds of processes using virtual machines on IaaS (Infrastructure as a Service), which has become popular recently, in place of the above-described hardware items.

Figure 3:
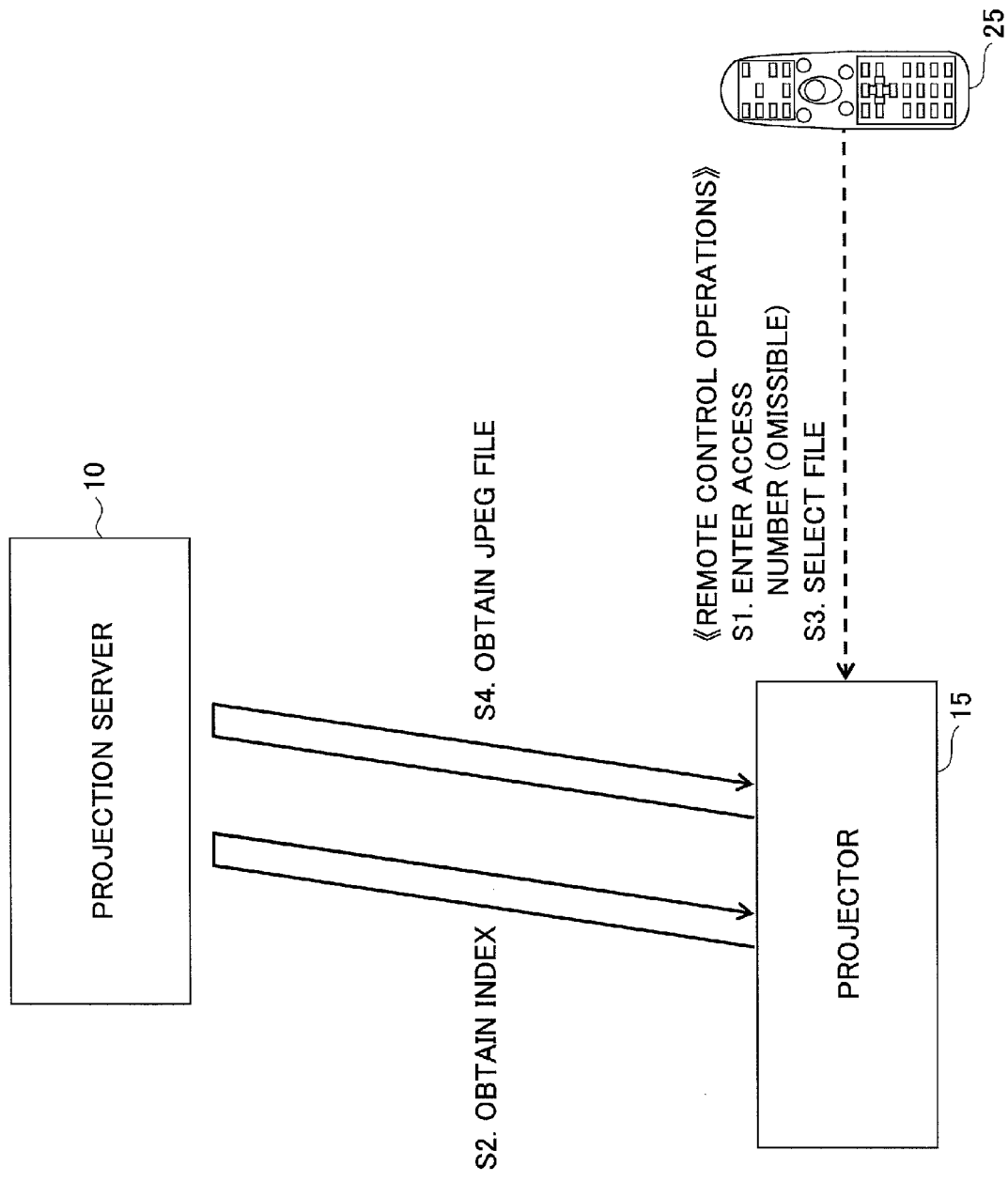
FIG. 3 is a schematic diagram illustrating a procedure for a process executed by a projection server and a projector according to the first embodiment.

FIG. 3 is a schematic diagram illustrating a procedure for a process executed by a projection server and a projector according to this embodiment. In this embodiment, a description is given of a case, as an example of access control (access restriction), where access is controlled based on access numbers. Alternatively, it is also possible to configure access control so that access may optionally be controlled based on IC cards.

After giving a START command (a command to project a file list screen) to the projector 15, at step S1, an operator of the projector 15 enters an access number (a passcode) by, for example, operating a remote controller 25.

At step S2, the projector 15 obtains an index file from the projection server 10. The index file obtained from the projection server 10 includes information on one or more contents files tied to the access number.

The projector 15 generates a file list screen from the index file obtained from the projection server 10, and projects the generated file list screen. A detailed description is given below of the file list screen. At step S3, the operator of the projector 15 selects a contents file to be projected from the file list screen by operating the remote controller 25.

At step S4, the projector 15 obtains the contents file specified by the operator from the projection server 10. The projector 15 generates a file projection screen from the obtained contents file and projects the generated file projection screen.

As illustrated in FIG. 3, it is possible for the operator to cause the projector 15 to obtain a contents file stored in the external Web service server 11 or the like and project a file projection screen generated from the contents file by entering an access number.

A malicious third party, however, may illegally obtain contents if a passcode that removes access restriction, such as an access number, is brought to the knowledge of the malicious third party or an IC card that removes a restriction by an access code is obtained by the malicious third party.

Therefore, according to the projection system 1 of this embodiment, even when a passcode that removes access restriction, such as an access number, is brought to the knowledge of a malicious third party or an IC card that removes a restriction by an access code is obtained by a malicious third party, the malicious third party is prevented from illegally obtaining contents as follows.

According to the projection system 1 of this embodiment, by pre-specifying the projector 15 that is authorized to obtain contents, the contents are prevented from being obtained by projectors other than the pre-specified projector 15 even when a passcode that removes access restriction, such as an access number, is brought to the knowledge of a malicious third party or an IC card that removes a restriction placed by an access code is obtained by a malicious third party.

Figure 4:
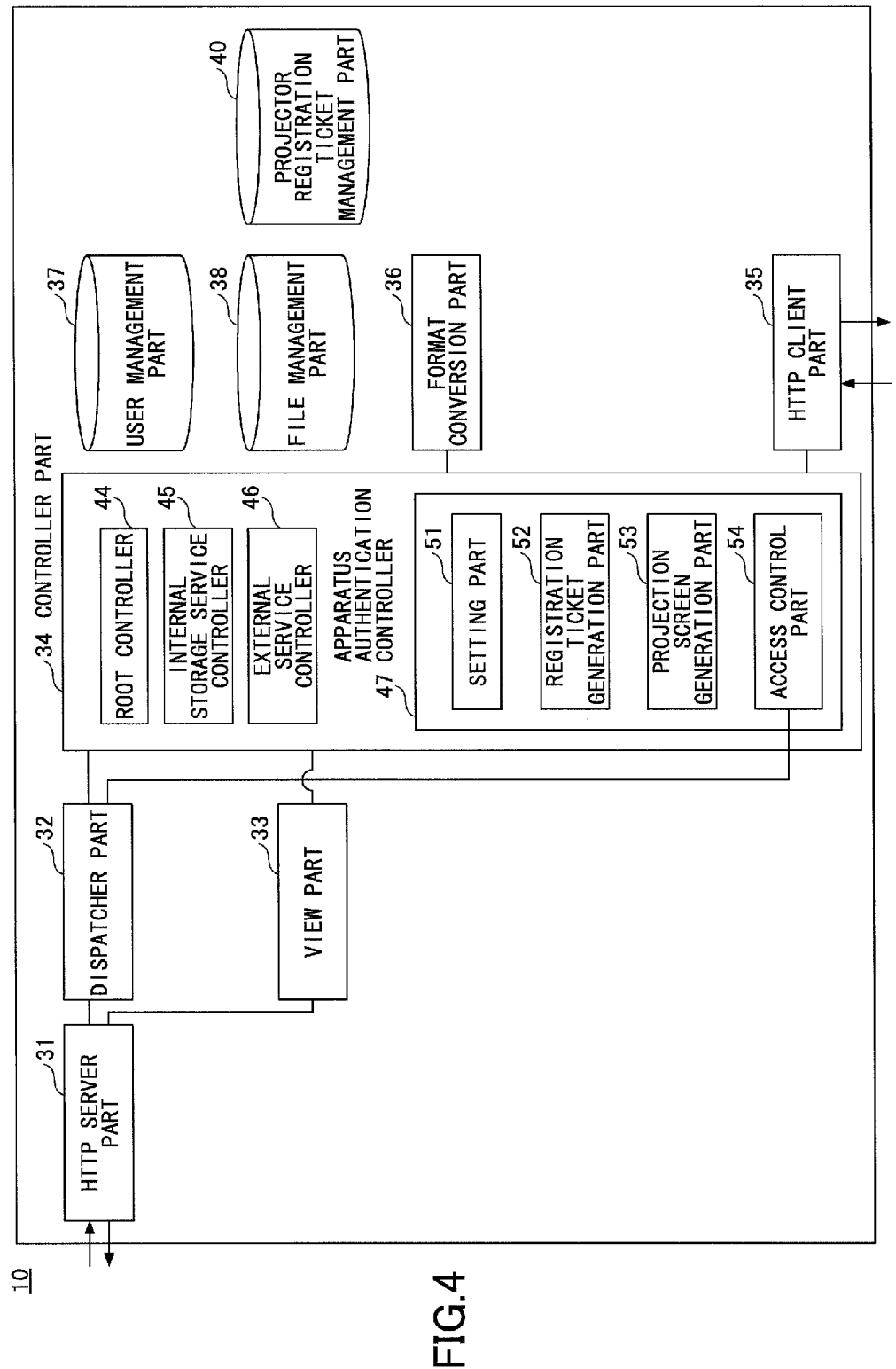
FIG. 4 is a diagram illustrating a software configuration of a projection server according to the first embodiment.

FIG. 4 is a diagram illustrating a software configuration of a projection server according to this embodiment. Referring to FIG. 4, the projection server 10 implements, by executing a program, an HTTP server part 31, a dispatcher part 32, a view part 33, a controller part 34, an HTTP client part 35, a format conversion part 36, a user management part 37, a file management part 38, and a projector registration ticket management part 40.

The controller part 34 includes a root controller 44, an internal storage service controller 45, an external service controller 46, and an apparatus authentication controller 47. The apparatus authentication controller 47 includes a setting part 51, a registration ticket generation part 52, a projection screen generation part 53, and an access control part 54.

The HTTP server 31 performs HTTP(S) communications with the projector 15 and a browser (not graphically illustrated). The browser is installed in, for example, a PC operated by an operator. As described below, the HTTP server part 31 includes a function of authenticating a client and a function of extracting the apparatus ID of the projector 15, such as its machine number, and adding the extracted apparatus ID to a request header. The HTTP client part 35 performs HTTP(S) communications with the external Web service server 11, the storage server 12, the PC 13, and the image input and output apparatus 14.

In the following description, a term "external service" is used as a word that includes both the meaning of a Web service in which the external Web service server 11 provides the projection server 10 with contents and the meaning of a Web service in which the storage server 12, the PC 13, or the image input and output apparatus 14 provides the projection server 10 with contents.

The user management part 37 manages user information and the authentication information of the external service. The file management part 38 manages files such as files uploaded to an internal storage service, files converted as described below, and temporary files downloaded from the external Web service server 11, the storage server 12, the PC 13, or the image input and output apparatus 14. The files managed by the file management part 38 include an index file and a contents file as described below.

The index file is an example of index information. The index file, which includes information on one or more contents files that may be provided to the projector 15, includes information on contents files in the form of a list (contents file list information). For example, as described below, the index file includes information on contents files that may be provided to the projector 15 and information on subdirectories. The contents files, which are examples of image data, are still image files, video files, etc.

The HTTP server part 31 receives an HTTP request from an HTTP client part (not graphically illustrated) of the projector 15 or a browser (not graphically illustrated). The HTTP server part 31 interprets the received HTTP request, and transmits information (URL) to the dispatcher part 32. The dispatcher part 32 delivers the received URL to the controller part 34 as described below.

The controller part 34 executes a process such as obtaining an index file or obtaining a contents file as described below in accordance with the URL distributed by the dispatcher part 32, using the root controller 44, the internal storage service controller 45, or the external service controller 46. Furthermore, if desired, the controller part 34 causes the format conversion part 36 to convert the format of the index file or the contents file to a format projectable by the projector 15.

The apparatus authentication controller 47 of the controller part 34 includes a function of providing an apparatus authentication setting and a function of performing access control with respect to a request from the projector 15. As described below, the apparatus authentication controller 47 implements the function of providing an apparatus authentication setting and the function of performing access control with respect to a request from the projector 15 with the setting part 51, the registration ticket generation part 52, the projection screen generation part 53, and the access control part 54.

The controller part 34 transmits information displayed on an HTTP client part (not graphically illustrated) of the browser (not graphically illustrated) to the view part 33. The view part 33 generates an HTML file and transmits the generated HTML file to the HTTP server part 31. Furthermore, the controller part 34 transmits an index file or a content file to be transmitted to the HTTP client part (not graphically illustrated) of the projector 15 to the HTTP server part 31.

Furthermore, the controller part 34 stores a contents file uploaded from the HTTP client part (not graphically illustrated) of the browser (not graphically illustrated) in a storage inside (an internal storage of) the projection server 10.

The HTTP server part 31 transmits the received index file, contents file, or HTML file to the HTTP client part (not graphically illustrated) of the projector 15 or the browser (not graphically illustrated) as an HTTP response. The projector registration ticket management part 40 manages a projector registration ticket described below.

FIG. 5 is a diagram illustrating a configuration of user information. The user information includes items such as User ID, Password, Access Number, Available Service, Notification Destination Address, Apparatus Authentication Setting, and Projection Authorized Projector ID. The item of Available Service sets an internal storage service and an external service that may be used by a user. In the case of FIG. 5, a user of an access number "12345" is authorized to use an internal storage service (local) and an external service (ext1).

The item of Notification Destination Address sets the e-mail address of a user. The item of Apparatus Authentication Setting provides a setting as to whether the apparatus authentication setting for authorizing a specific projector 15 to perform projection is enabled or disabled. The item of Projection Authorized Projector ID sets, in the form of a list, the apparatus ID of one or more projectors 15 authorized to perform projection when the apparatus authentication setting is enabled.

FIG. 6 is a diagram illustrating a configuration of a projector registration ticket. The projector registration ticket is used at the time of registering the projector 15 in the item of Projection Authorized Projector ID of the user information.

The projector registration ticket includes the items of Projector ID, Registration One-Time Password, and One-Time Password Expiration Date & Time. The item of Projector ID sets the apparatus ID of the projector 15 to be registered. The item of Registration One-Time Password sets a password for registration of the projector 15. The user information of FIG. 5 is correlated with one or more projector registration tickets.

Figure 7:
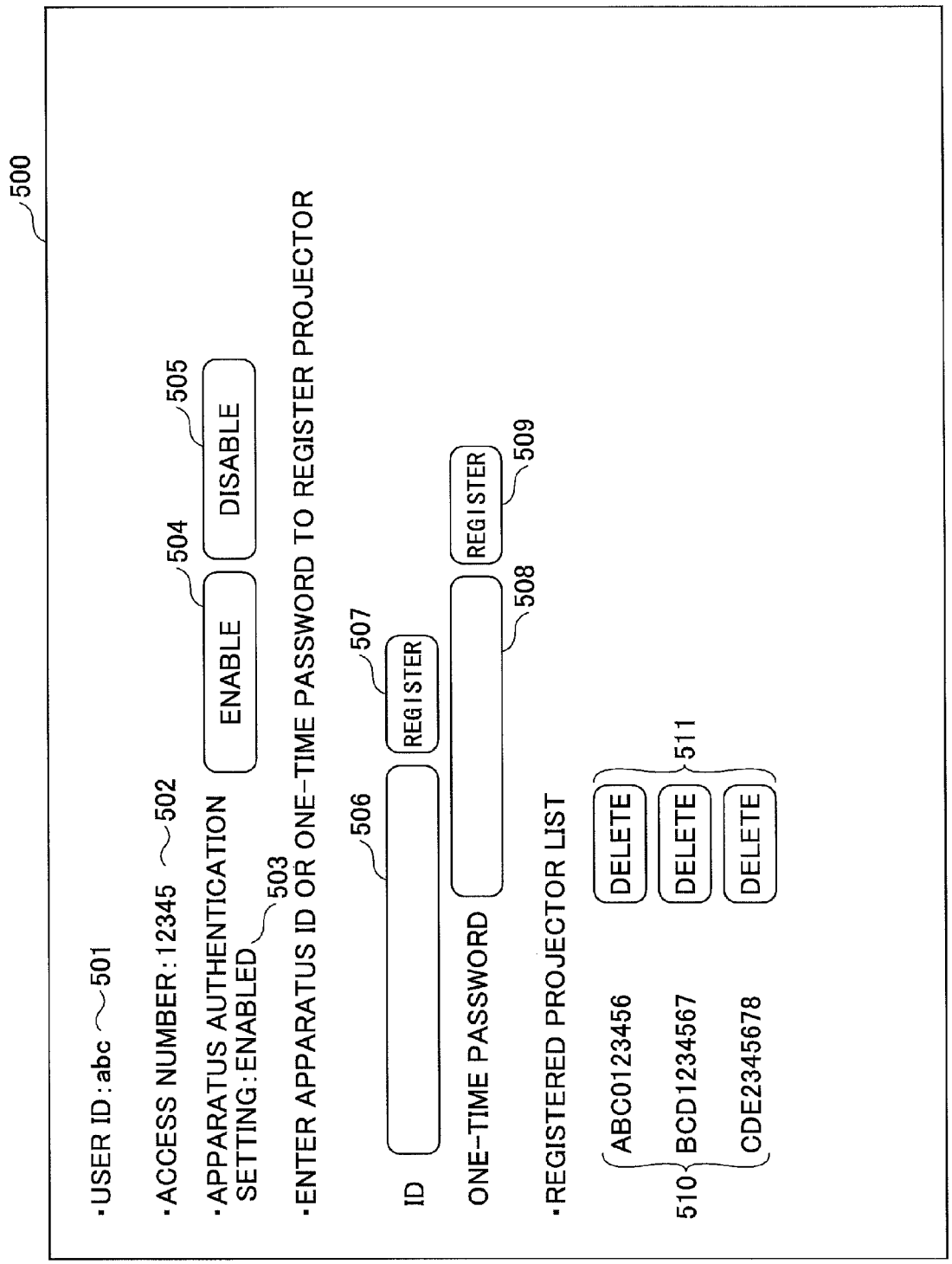
FIG. 7 is a diagram illustrating an image of an apparatus authentication setting screen according to the first embodiment.

FIG. 7 is a diagram illustrating an image of an apparatus authentication setting screen. An apparatus authentication setting screen 500 is generated by the apparatus authentication controller 47 of the projection server 10. The apparatus authentication setting screen 500 may be displayed by the projector 15 that has accessed the projection server 10 or may be displayed on a terminal such as a PC operated by an operator.

The apparatus authentication setting screen 500 is displayed, for example, after an operator of the projector 15 is subjected to user authentication in the projector server 10. The apparatus authentication setting screen 500 reflects the user information illustrated in FIG. 5.

The apparatus authentication setting screen 500 includes a user ID 501, an access number 502, and an apparatus authentication setting 503 of the user information. The apparatus authentication setting 503 is "enabled" by the operator depressing an ENABLE button 504, and is "disabled" by the operator depressing a DISABLE button 505.

The apparatus authentication setting screen 500 further includes an ID entry field 506, where the operator enters an apparatus ID. By the operator depressing a REGISTER button 507, the projector 15 indicated by the apparatus ID entered in the ID entry field 506 is registered (recorded) as a projector authorized to perform projection when the apparatus authentication setting is enabled.

The apparatus authentication setting screen 500 further includes a one-time password entry field 508, where the operator enters a one-time password. By the operator depressing a REGISTER button 509, the projector 15 correlated with the one-time password entered in the one-time password entry field 508 is registered (recorded) as a projector authorized to perform projection when the apparatus authentication setting is enabled.

The apparatus authentication setting screen 500 further includes a registered projector list 510, which is Projection Authorized Projector ID of the user information. A DELETE button 511 is provided for each of the apparatus IDs of the projectors 15 displayed in the registered projector list 510. By the operator depressing the DELETE button 511, the apparatus ID of the projector 15 corresponding to the DELETE button 511 is deleted from Projection Authorized Projector ID of the user information.

Figure 8:
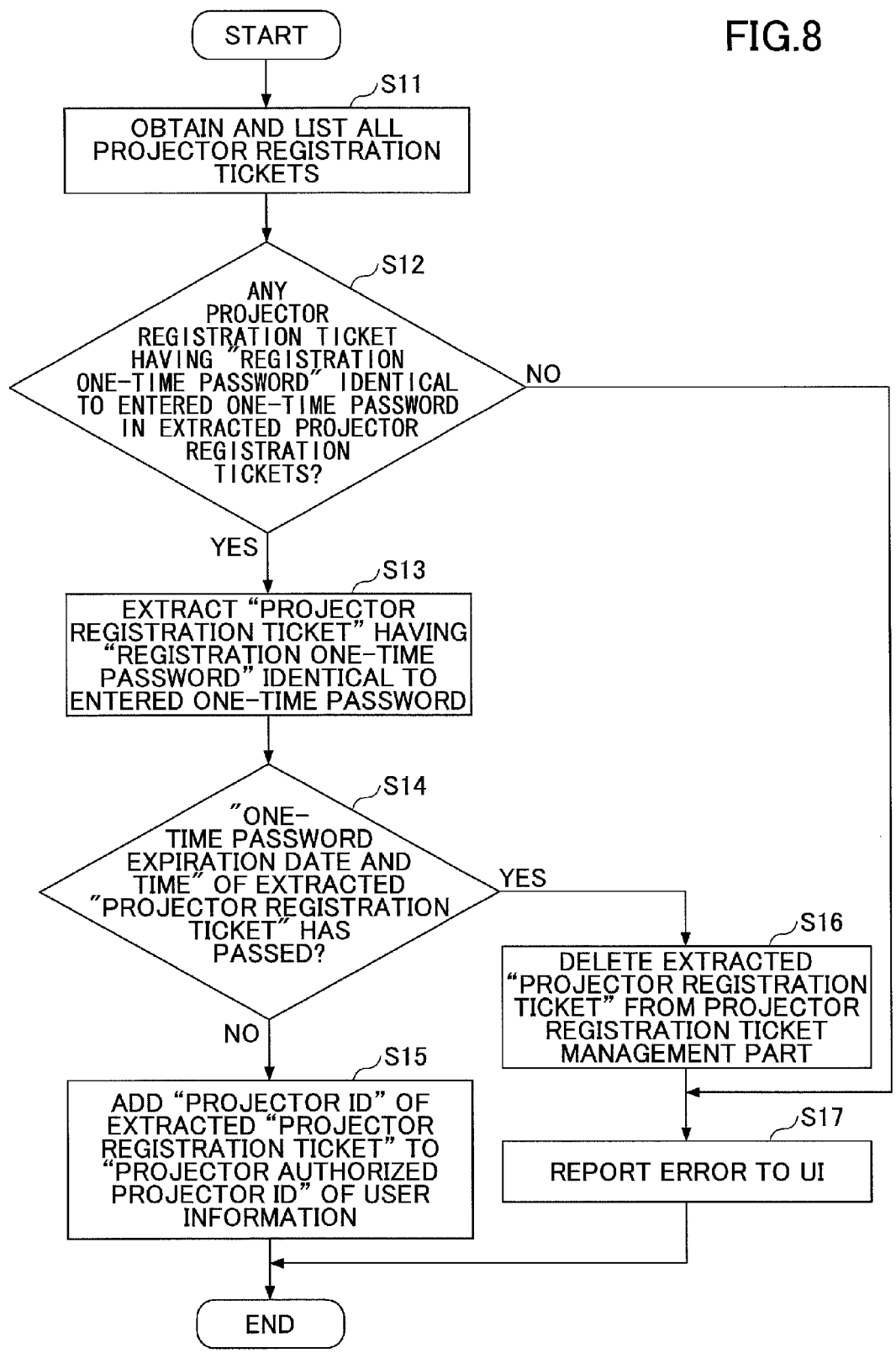
FIG. 8 is a flowchart illustrating a projector registration process using a one-time password according to the first embodiment.

FIG. 8 is a flowchart illustrating a projector registration process using a one-time password. The projector registration process using a one-time password is started by the operator entering a one-time password in the one-time password entry field 508 and depressing the REGISTER button 509 on the apparatus authentication setting screen 500 (FIG. 7).

Referring to FIG. 8, at step S11, the setting part 51 of the apparatus authentication controller 47 obtains and lists all projector registration tickets from the projector registration ticket management part 40. At step S12, the setting part 51 determines whether there is a projector registration ticket that has a "registration one-time password" identical to the one-time password entered in the one-time password entry field 508 in the listed projector registration tickets.

If there is such a projector registration ticket (YES at step S12), at step S13, the setting part 51 extracts the projector registration ticket that has a "registration one-time password" identical to the one-time password entered in the one-time password entry field 508.

At step S14, the setting part 51 determines whether the "one-time password expiration date and time" of the extracted projector registration ticket has passed. If the "one-time password expiration date and time" of the extracted projector registration ticket has not passed (NO at step S14), at step S15, the setting part 51 adds the "projector ID" of the extracted projector registration ticket to Projection Authorized Projector ID of the user information.

If it is determined at step S12 that there is no projector registration ticket that has a "registration one-time password" identical to the one-time password entered in the one-time password entry field 508 in the listed projector registration tickets (NO at step S12), at step S17, the setting part 51 reports an error to a user interface (UI). For example, a message indicating the failure of a projector registration process using the one-time password entered in the one-time password entry field 508 is displayed on the apparatus authentication setting screen 500.

Furthermore, if it is determined at step S14 that the "one-time password expiration date and time" of the extracted projector registration ticket has passed (YES at step S14), at step S16, the setting part 51 deletes the projector registration ticket whose "one-time password expiration date and time" has passed from the projector registration ticket management part 40. Then, at step S17, the setting part 51 reports an error to the UI.

Figure 9:
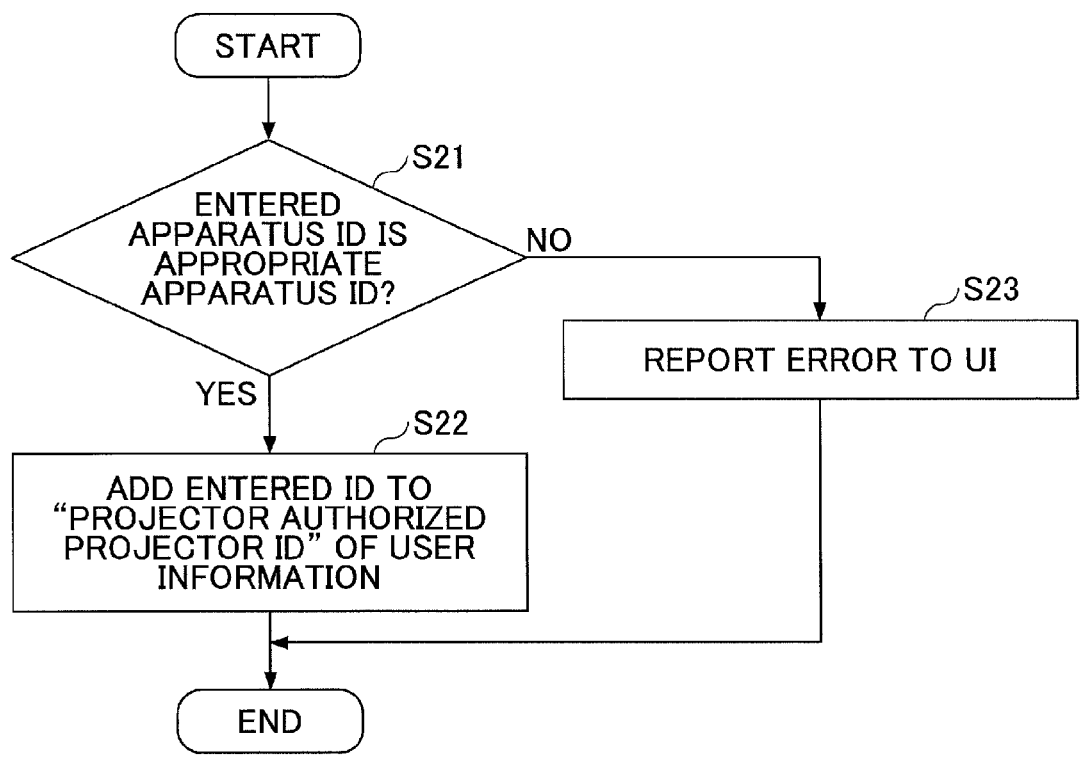
FIG. 9 is a flowchart illustrating a projector registration process using an apparatus ID according to the first embodiment.

FIG. 9 is a flowchart illustrating a projector registration process using an apparatus ID. The projector registration process using an apparatus ID is started by the operator entering the apparatus ID of the projector 15 that is desired to be registered in the ID entry field 506 and depressing the REGISTER button 507 on the apparatus authentication setting screen 500 (FIG. 7).

Referring to FIG. 9, at step S21, the setting part 51 of the apparatus authentication controller 47 determines whether an apparatus ID entered in the ID entry field 506 is an appropriate apparatus ID. A detailed description of the process of step S21 is given below.

If it is determined at step S21 that the entered apparatus ID is an appropriate apparatus ID (YES at step S21), at step S22, the setting part 51 adds the apparatus ID entered in the ID entry field 506 to "Projection Authorized Projector ID" of the user information. If it is determined at step S21 that the entered apparatus ID is not an appropriate apparatus ID (NO at step S21), at step S23, the setting part 51 reports an error to a UI. For example, a message indicating the failure of a projector registration process using the apparatus ID entered in the ID entry field 506 is displayed on the apparatus authentication setting screen 500.

Figure 10:
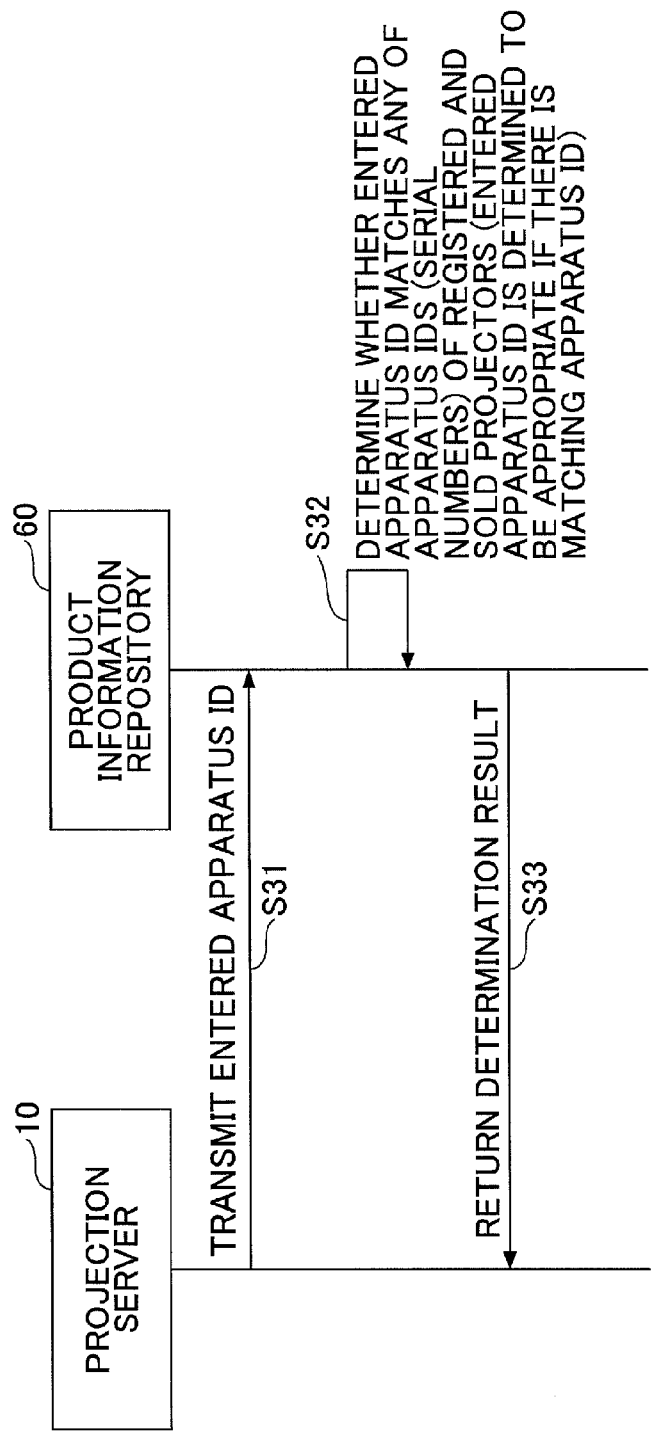
FIG. 10 is a sequence diagram of a process for determining whether an apparatus ID entered in an ID entry field is an appropriate apparatus ID according to the first embodiment.

FIG. 10 is a sequence diagram of a process for determining whether an apparatus ID entered in an ID entry field is an appropriate apparatus ID. Referring to FIG. 10, at step S31, the projection server 10 transmits an apparatus ID entered in the ID entry field 506 to a product information repository 60.

The product information repository 60 retains the apparatus IDs (serial numbers) of projectors 15 that have been registered as products and sold.

At step S32, the product information repository 60 determines whether an apparatus ID that matches the apparatus ID entered in the ID entry field 506 is included in the apparatus IDs of the registered and sold projectors 15. If such an apparatus ID is included, the product information repository 60 determines that the entered apparatus ID is an appropriate ID. On the other hand, if such an apparatus ID is not included, the product information repository 60 determines that the entered apparatus ID is not an appropriate ID. At step S33, the product information repository 60 transmits the result of the determination as to whether the entered apparatus ID is an appropriate apparatus ID to the projection server 10.

According to this embodiment, the projection server 10 determines whether a communication is from an intended projector 15 by client authentication. An overview of client authentication is given below.

Figure 11:
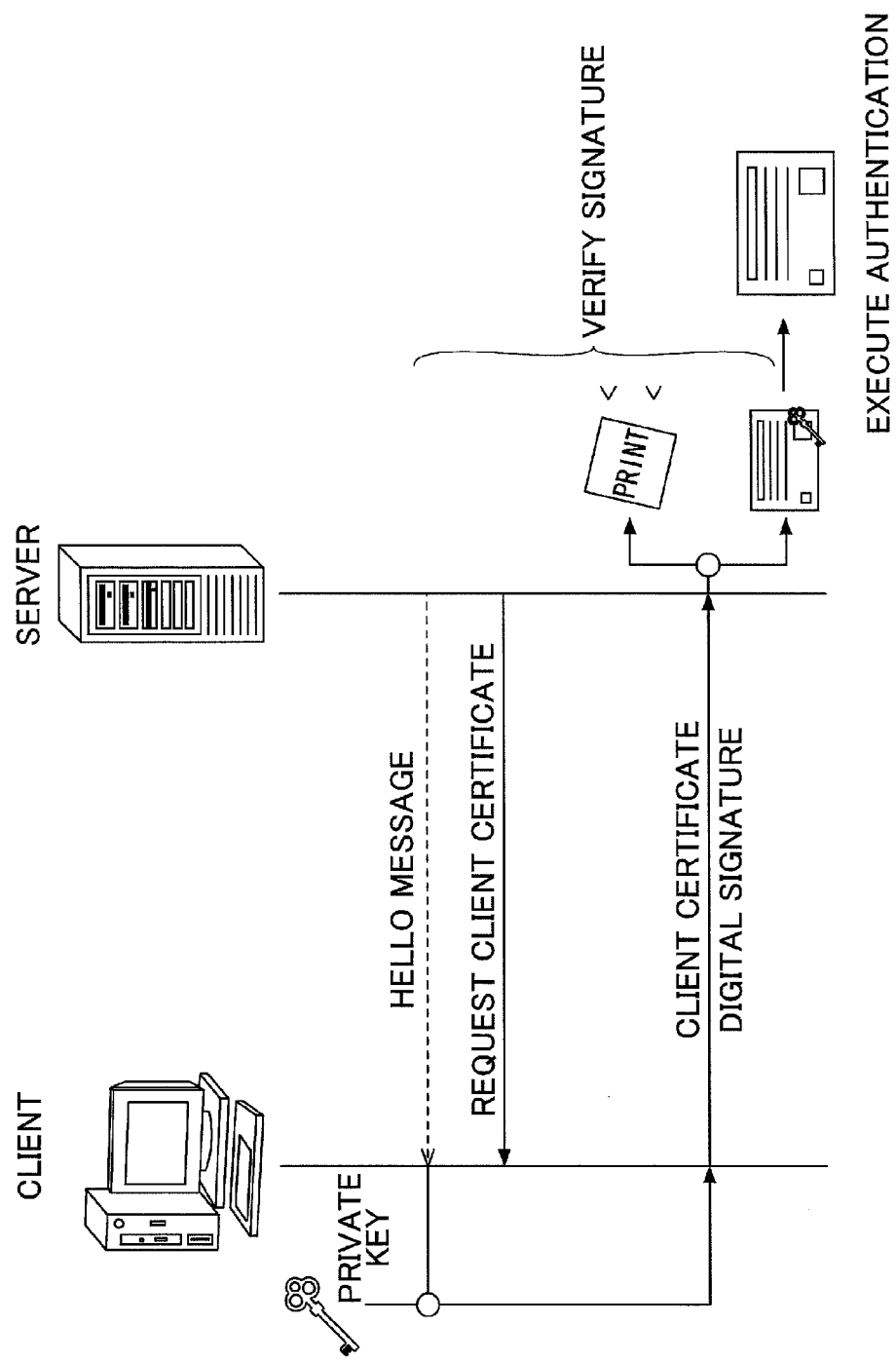
FIG. 11 is a diagram for giving an overview of client authentication according to the first embodiment.

FIG. 11 is a diagram for giving an overview of client authentication. In FIG. 11, the projection server 10 and the projector 15 are illustrated as a server and a client, respectively. The server may request a certificate (a client certificate) from the client by SSL (Secure Sockets Layer) handshaking in order to determine that the other end of a communication is indeed an intended client. Authentication performed from a client certificate (a personal certificate) is referred to as client authentication.

The server requests a client certificate from the client when transmitting a server certificate to the client. The client generates a digital signature from a Hello message using the private key of the client, and transmits the digital signature along with a client certificate to the server. The server verifies the digital signature (determines whether the digital signature is valid) using the public key of the client certificate. If the digital signature is valid, the server may ensure that the client certificate is that of the other end of the communication. Therefore, the server may determine whether the other end of the communication is an intended party from the contents of the client certificate.

FIGS. 12A and 12B are diagrams illustrating the contents of a client certificate. The client certificate correlates a public key with the identity of an individual, a server, or the entity of another subject. For example, FIG. 12A illustrates the information of a client certificate. The client certificate includes identification information (an identification name) and a public key as information on an object of certification. The client certificate further includes the identification and signature of a certificate authority (CA) and the validity period of the certificate.

The identification name is used to provide identification in a particular situation. The information of the identification name is defined as illustrated in FIG. 12B. In this embodiment, the apparatus ID is included in "Common Name" of the identification name item in order to uniquely identify the projector 15 connected to the projection server 10.

Figure 13:
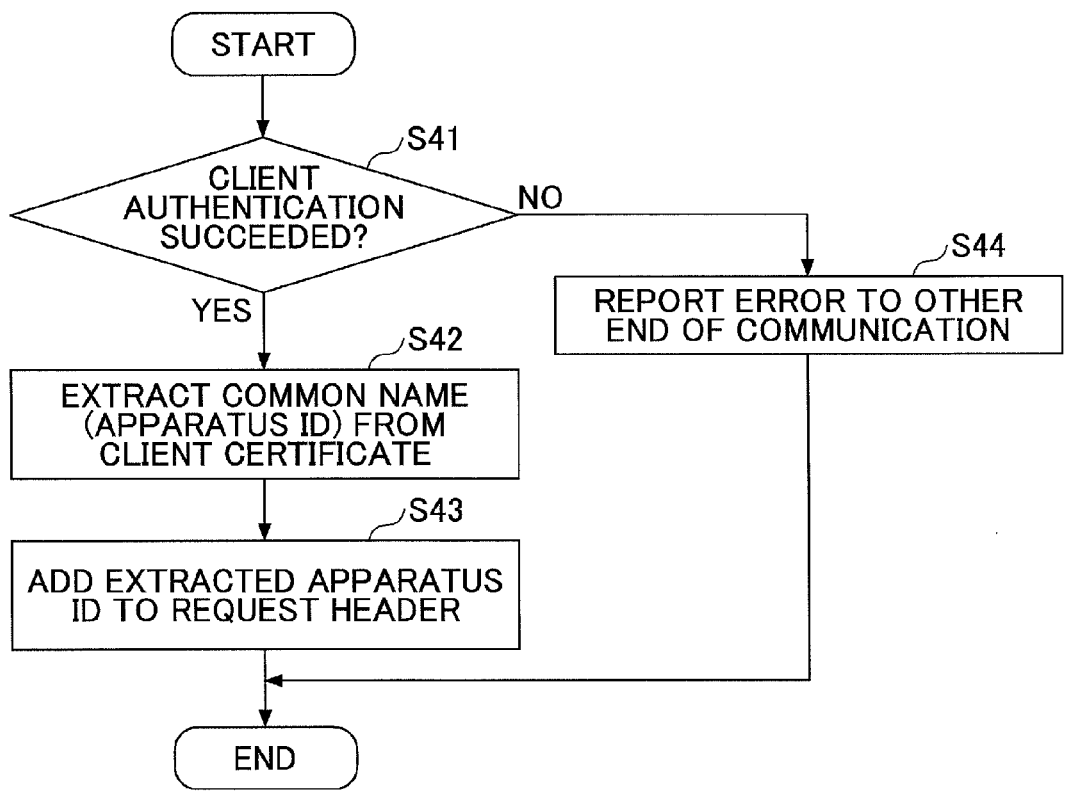
FIG. 13 is a flowchart illustrating a procedure for a process of an HTTP server part according to the first embodiment.

FIG. 13 is a flowchart illustrating a procedure for a process of an HTTP server part. The process of FIG. 13 is executed in response to a request from the projector 15.

Referring to FIG. 13, at step S41, the HTTP server part 31 (FIG. 4) of the projection server 10 determines whether client authentication has succeeded. If client authentication has succeeded (YES at step S41), at step S42, the HTTP server part 31 extracts an apparatus ID included in "Common Name" of the identification name item of a client certificate.

At step S43, the HTTP server part 31 adds the extracted apparatus ID to a request header. The request header to which the apparatus ID is added is forwarded to the dispatcher part 32 or the view part (FIG. 4). If client authentication has not succeeded (NO at step S41), at step S44, the HTTP server part 31 reports an error to the projector 15 without forwarding a request to the next process (the dispatcher part 32 or the view part 33).

The process of extracting an apparatus ID included in "Common Name" of the identification name item of a client certificate at step S42 and the process of adding the extracted apparatus ID to a request header may be common techniques provided with, for example, Apache (an Apache HTTP server) as an example of Web server software.

Referring back to FIG. 4, the dispatcher part 32 receives, for example, a URL as illustrated in FIG. 14 from the HTTP server part 31. FIG. 14 is a diagram illustrating configurations of URLs that may be received by a dispatcher part.

After an operator of the projector 15 gives a START command (a command to project a file list screen) to the projector 15, the dispatcher part 32 receives, for example, the URL of (a) of FIG. 14 from the HTTP server part 31.

After the operator of the projector 15 selects a subdirectory of an internal storage service from the file list screen on the projector 15, the dispatcher part 32 receives, for example, the URL of (b) of FIG. 14 from the HTTP server part 31.

After the operator of the projector 15 selects a subdirectory of an external service from the file list screen on the projector 15, the dispatcher part 32 receives, for example, the URL of (c) or (d) of FIG. 14 from the HTTP server part 31.

After the operator of the projector 15 selects a contents file included in a subdirectory of an external service from the file list screen on the projector 15, the dispatcher part 32 receives, for example, the URL of (e) of FIG. 14 from the HTTP server part 31.

The URL of (a) of FIG. 14 includes a host URL "projection.example.com" and an access number "12345." The URL of (b) of FIG. 14 includes information "local," which indicates an internal storage service, in addition to the URL of (a) of FIG. 14. The URL of (c) of FIG. 14 includes information "ext1," which indicates an external service, in addition to the URL of (a) of FIG. 14. The URL of (d) of FIG. 14 includes information "ext2," which indicates an external service, in addition to the URL of (a) of FIG. 14.

The URL of (e) of FIG. 14 includes information "folder1," which indicates a subdirectory, and information "file1.jpg," which indicates a contents file, in addition to the URL of (c) of FIG. 14. In (e) of FIG. 14, "folder1/file1.jpg" is a URL path in an external service, and "12345/ext1/folder1/file1.jpg" is a URL path in the projection server 10.

The dispatcher part 32 distributes URLs received from the HTTP server part 31 as described below. For example, the URL of (a) of FIG. 14 is delivered to the root controller 44 (FIG. 4), the URL of (b) of FIG. 14 is delivered to the internal storage service controller 45 of the controller part (FIG. 4), and the URLs of (c) through (e) of FIG. 14 are delivered to the external service controller (FIG. 4).

Figure 15:
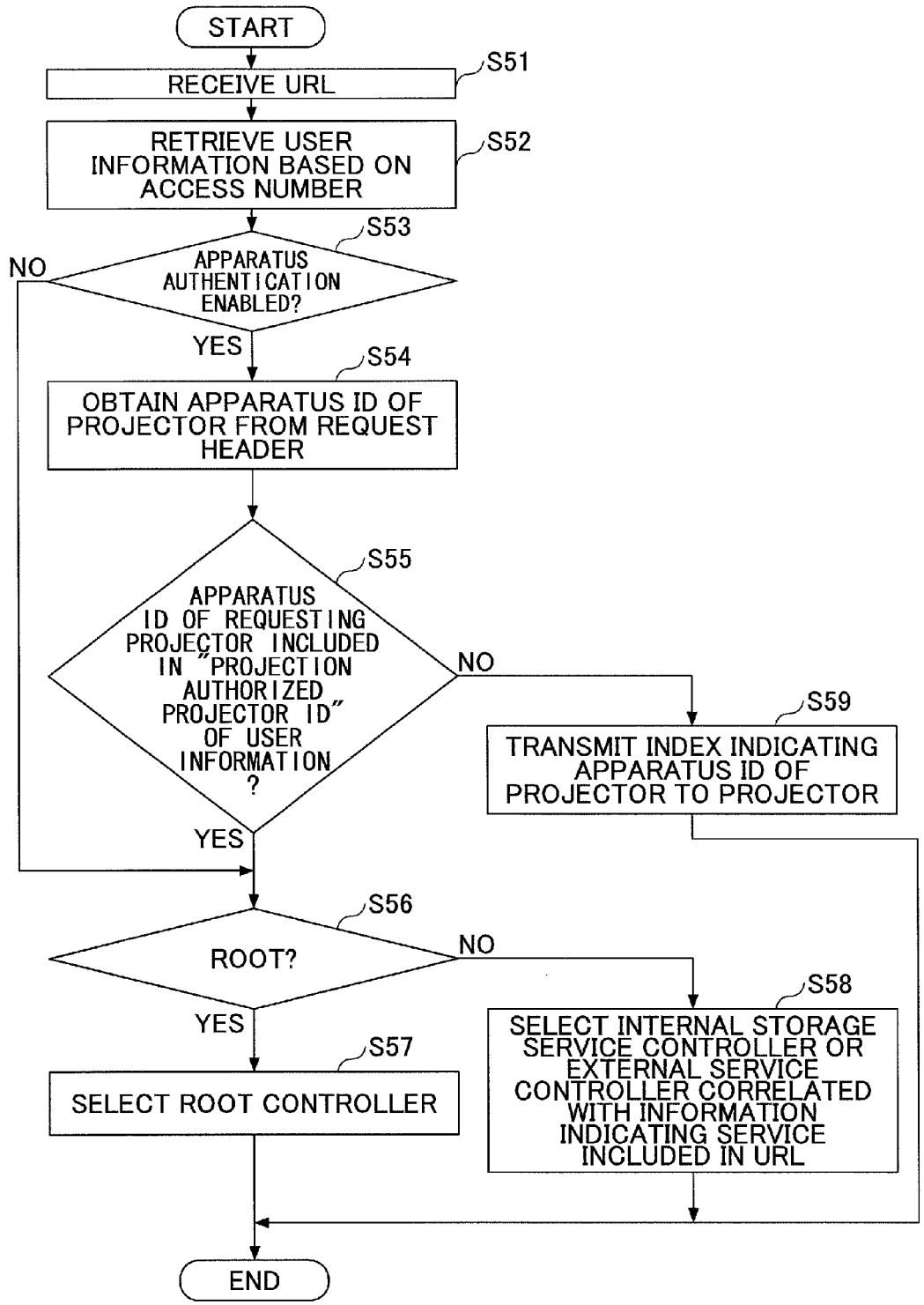
FIG. 15 is a flowchart illustrating a procedure for processes of a dispatcher part and a controller part according to the first embodiment.

FIG. 15 is a flowchart illustrating a procedure for processes of a dispatcher part and a controller part. Referring to FIG. 15, at step S51, the dispatcher part 32 receives a URL as illustrated in FIG. 14 from the HTTP server part 31.

At step S52, the dispatcher part 32 retrieves user information from the user management part 37 (FIG. 4) based on the access number {n} included in the received URL. At step S53, the dispatcher part 32 determines whether the apparatus authentication setting included in the user information is "enabled."

If the apparatus authentication setting is "enabled" (YES at step S53), at step S54, the dispatcher part 32 obtains the apparatus ID of the projector 15 from a request header. At step S55, the dispatcher part 32 determines whether the apparatus ID of the (requesting) projector 15 obtained at step S54 is included in Projection Authorized Projector ID of the user information.

If the dispatcher part 32 determines that the apparatus ID is included (YES at step S55), at step S56, the dispatcher part 32 determines whether the received URL is a root. If the received URL is a root (YES at step S56), at step S57, the dispatcher part 32 selects the root controller 44 (FIG. 4) and delivers the URL to the root controller 44. If the received URL is not a root (NO at step S56), the dispatcher part 32 executes the process of step S58.

At step S58, based on information indicating a service ("local," "ext1," etc.) included in the received URL, the dispatcher part 32 selects the internal storage service controller 45 or the external service controller 46 (FIG. 4) correlated with the information indicating a service, and delivers the URL to the selected internal storage service controller 45 or external service controller 46.

If the apparatus authentication setting is "disabled" at step S53 (NO at step S53), the dispatcher part 32 skips the processes of steps S54 and S55 to proceed to step S56. If the dispatcher part 32 determines at step S55 that the obtained apparatus ID of the projector 15 is not included in Projection Authorized Projector ID of the user information (NO at step S55), at step S59, the dispatcher part 32 notifies the access control part 54 of the apparatus authentication controller 47 (FIG. 4) that the obtained apparatus ID of the projector 15 is not included.

The access control part 54 transmits an index indicating the apparatus ID of the projector 15 as illustrated in FIG. 16 to the projector 15. The process of step S59 is executed when the apparatus ID of the requesting projector 15 is not set in Projection Authorized Projector ID of the user information and projection of contents is therefore prevented. The operator of the projector 15 is enabled to project contents by, for example, registering the apparatus ID of the projector 15 from the apparatus authentication setting screen 500 of FIG. 7.

FIG. 16 is a diagram illustrating a configuration of an index indicating the apparatus ID of a projector. The index of FIG. 16 indicates a message including the apparatus ID of the projector 15 that "REGISTER ID ABC0123456 WITH PROJECTION SERVER TO PERFORM PROJECTION".

Figure 17:
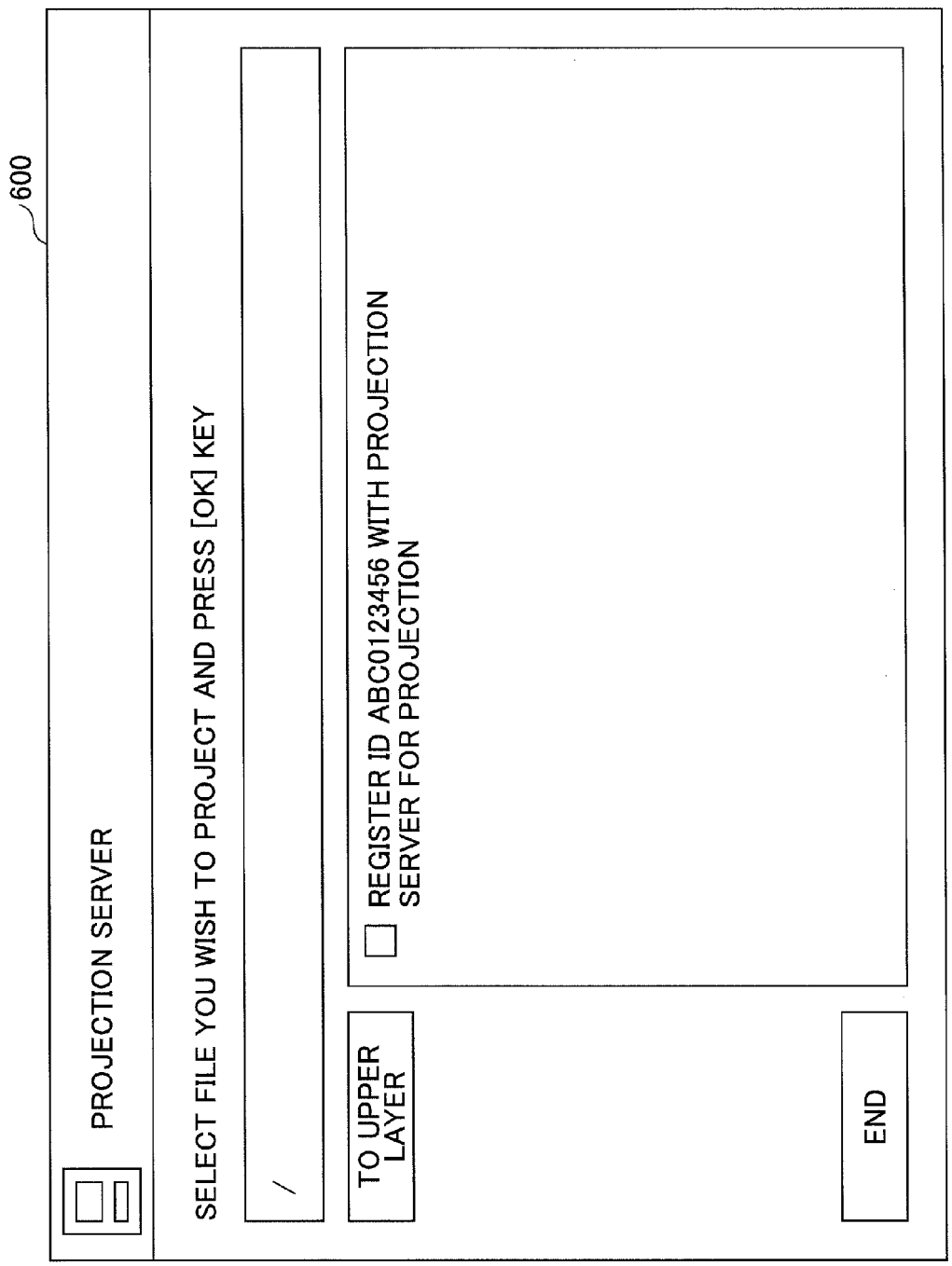
FIG. 17 is a diagram illustrating an image of a file list screen according to the first embodiment.

In response to reception of the index file of FIG. 16, the projector 15 projects, for example, a file list screen 600 as illustrated in FIG. 17. FIG. 17 is a diagram illustrating an image of a file list screen.

The file list screen 600 of FIG. 17 is displayed when the requesting projector 15 is not set in Projection Authorized Projector ID of the user information. The apparatus ID of the projector 15 to be registered is included in an index on the file list screen 600. This allows the operator to determine the apparatus ID of the projector 15 to be registered without checking a certificate of product registration shipped with the product.

The file displayed on the file list screen of FIG. 17 is merely an index without an actual file. Therefore, nothing is displayed in response to its selection. Furthermore, the apparatus ID displayed on the file list screen of FIG. 17 may be a one-time password that is correlated with the apparatus ID of the projector 15 by a projector registration ticket. Furthermore, the process of steps S53 through S55 of FIG. 15 may be added to processes of the root controller 44 and the external service controller 46.

Figure 18:
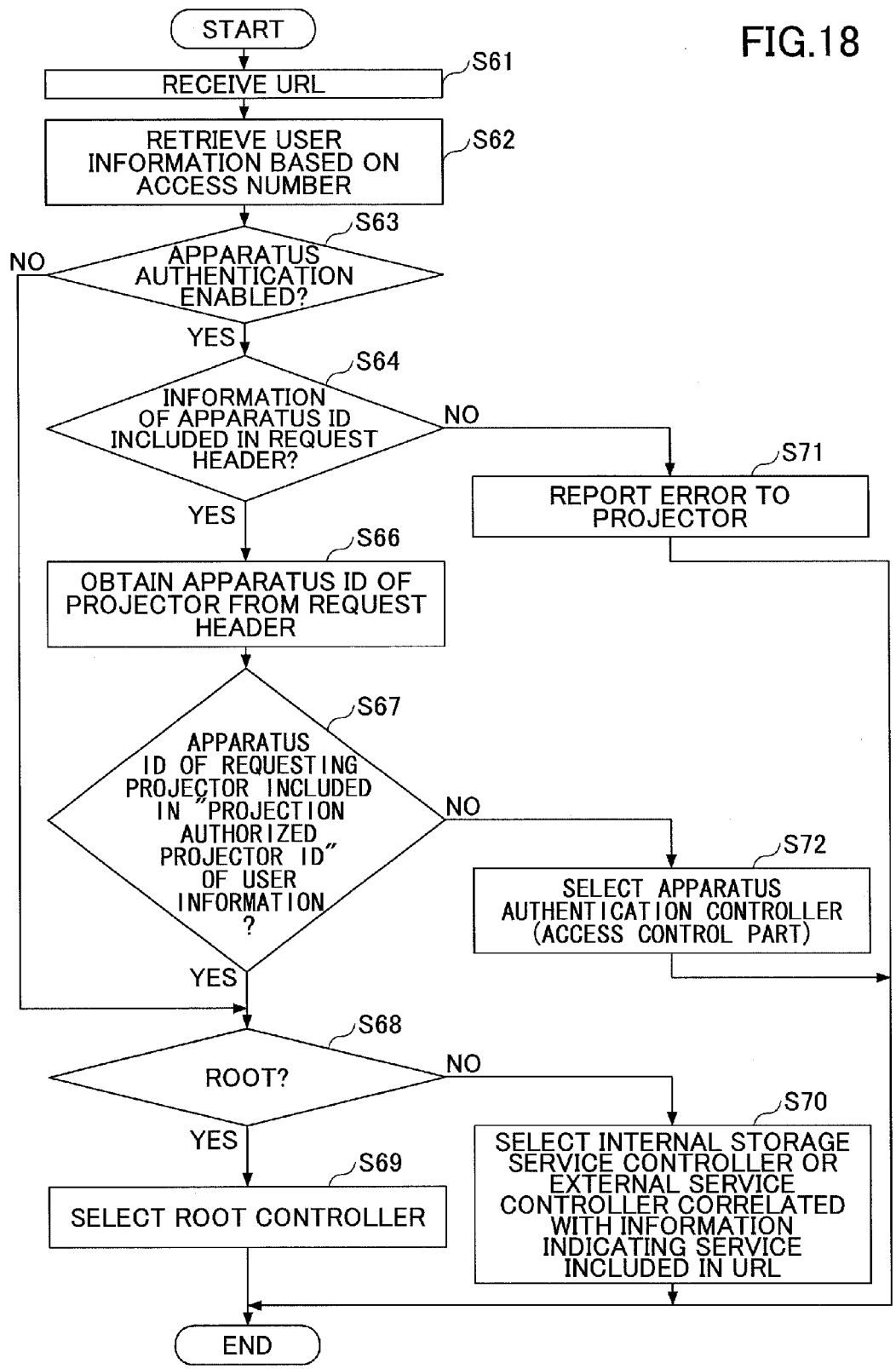
FIG. 18 is a flowchart illustrating another procedure for processes of a dispatcher part and a controller part according to the first embodiment.

FIG. 18 is a flowchart illustrating another procedure for processes of a dispatcher part and a controller part. The process of the flowchart of FIG. 18 is the same as the process of the flowchart of FIG. 15 except for some parts, and accordingly, its description is omitted where appropriate.

The process of steps S61 through S63 is the same as the process of steps S51 through S53 of FIG. 15. If it is determined at step S63 that the apparatus authentication setting is "enabled" (YES at step S63), at step S64, the dispatcher part 32 determines whether the apparatus ID of the projector 15 is included in a request header.

If the dispatcher part 32 determines that the apparatus ID of the projector 15 is included in a request header (YES at step S64), at step S66, the dispatcher part 32 obtains the apparatus ID of the projector 15 from the request header. The process of steps S67 through S70 is the same as the process of steps S55 through S58 of FIG. 15.

If the dispatcher part 32 determines that the apparatus ID of the projector 15 is not included in a request header (NO at step S64), at step S71, the dispatcher part 32 reports an error to the projector 15.

If the dispatcher part 32 determines at step S67 that the obtained apparatus ID of the projector 15 is not included in Projection Authorized Projector ID of the user information (NO at step S67), at step S72, the dispatcher part 32 selects the access control part 54 of the apparatus authentication controller 47 (FIG. 4) and notifies the access control part 54 that the obtained apparatus ID of the projector 15 is not included.

The apparatus authentication controller 47 executes a process as described below in order to cause the operator of the projector 15 to register the apparatus ID of the projector 15 in Projection Authorized Projector ID of the user information. Various forms are possible for the process of step S72 as described below.

Figure 19:
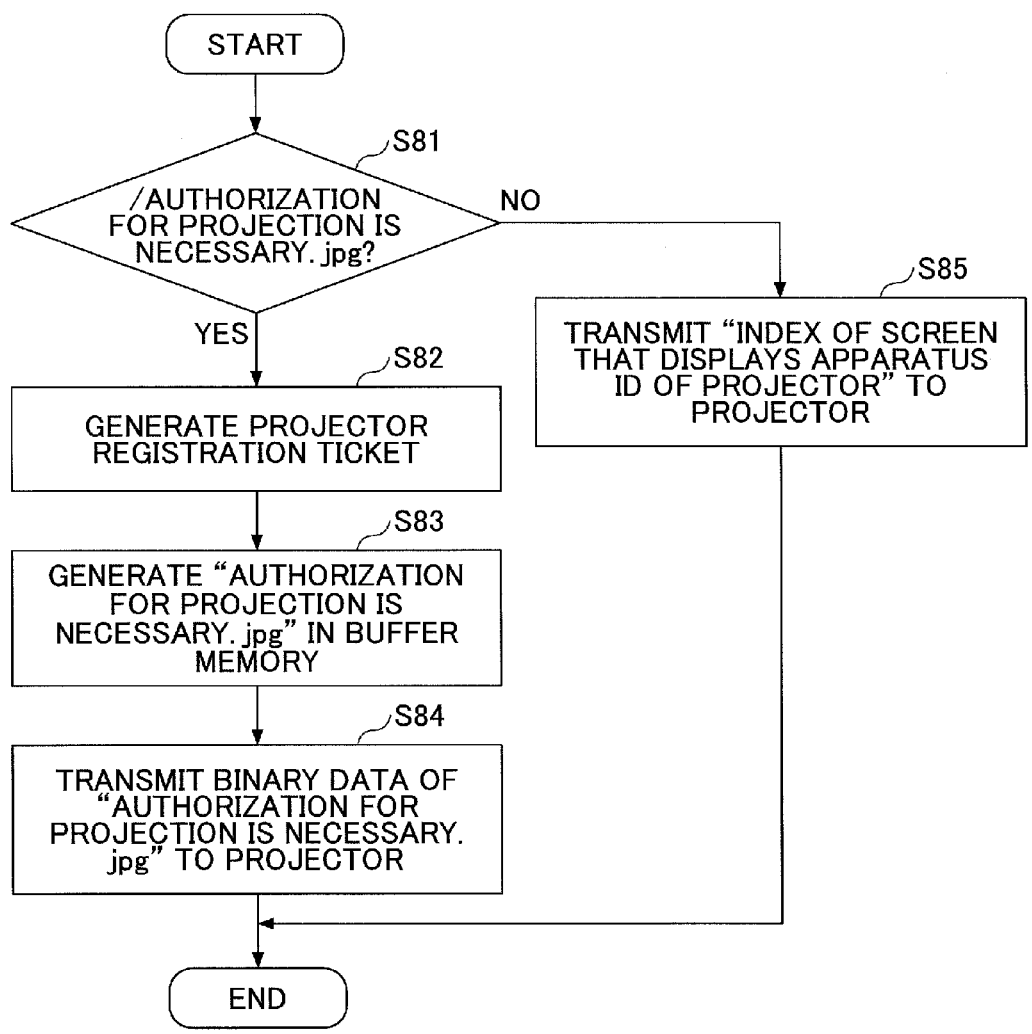
FIG. 19 is a flowchart illustrating a procedure for a process of an apparatus authentication controller according to the first embodiment.

FIG. 19 is a flowchart illustrating a procedure for a process of an apparatus authentication controller. Referring to FIG. 19, at step S81, the access control part 54 of the apparatus authentication controller 47 (FIG. 4) determines whether an input is a request for the projection (selection) of "AUTHORIZATION FOR PROJECTION IS NECESSARY.jpg".

If an input is not a request for the projection (selection) of "AUTHORIZATION FOR PROJECTION IS NECESSARY.jpg" (NO at step S81), at step S85, the access control part 54 transmits the "index of a screen that displays the apparatus ID of a projector" as illustrated in FIG. 20 to the projector 15. FIG. 20 is a diagram illustrating a configuration of the index of a screen that displays the apparatus ID of a projector. The index of FIG. 20 indicates "AUTHORIZATION FOR PROJECTION IS NECESSARY".

Figure 21:
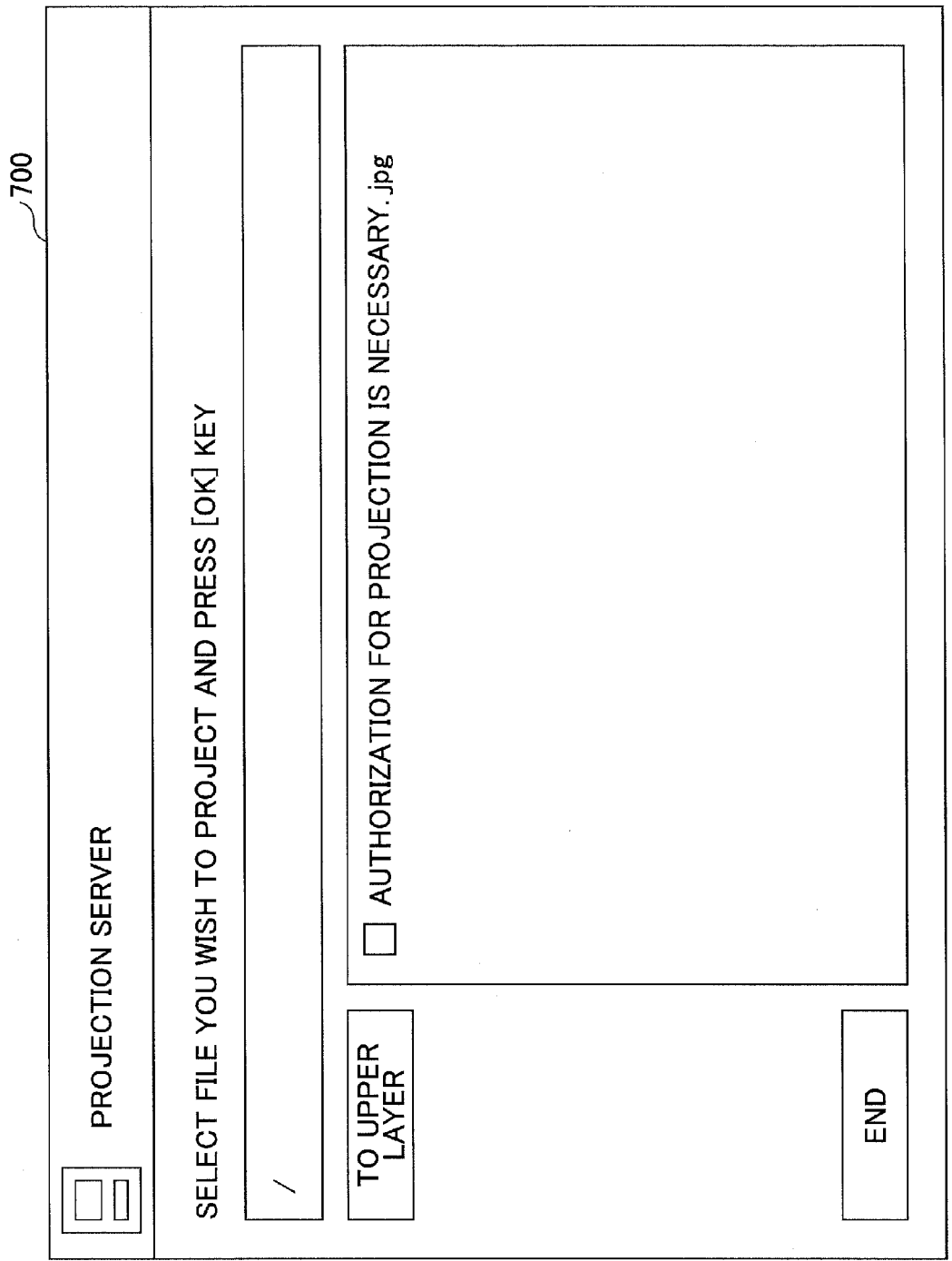
FIG. 21 is a diagram illustrating an image of a file list screen according to the first embodiment.

In response to reception of the index file of FIG. 20, the projector 15 projects, for example, a file list screen 700 as illustrated in FIG. 21. FIG. 21 is a diagram illustrating an image of a file list screen. The file list screen 700 of FIG. 21 is displayed in response to the entering of an access number when the requesting projector 15 is not set in Projection Authorized Projector ID of the user information. Accordingly, it is possible for the operator to determine that authorization for projection is necessary to project contents with the projector 15.

If "AUTHORIZATION FOR PROJECTION IS NECESSARY.jpg" is selected on the file list screen 700 (YES at step S81), at step S82, the registration ticket generation part 52 (FIG. 4) of the apparatus authentication controller 47 executes a process for generating a projector registration ticket (a projector registration ticket generation process) for the projector 15. A description is given in detail below of the projector registration ticket generation process of step S82.

At step S83, the projection screen generation part 53 (FIG. 4) of the apparatus authentication controller 47 generates the binary data of "AUTHORIZATION FOR PROJECTION IS NECESSARY.jpg" in a buffer memory as described below. At step S84, the access control part 54 transmits the binary data of "AUTHORIZATION FOR PROJECTION IS NECESSARY.jpg" to the projector 15.

Figure 22:
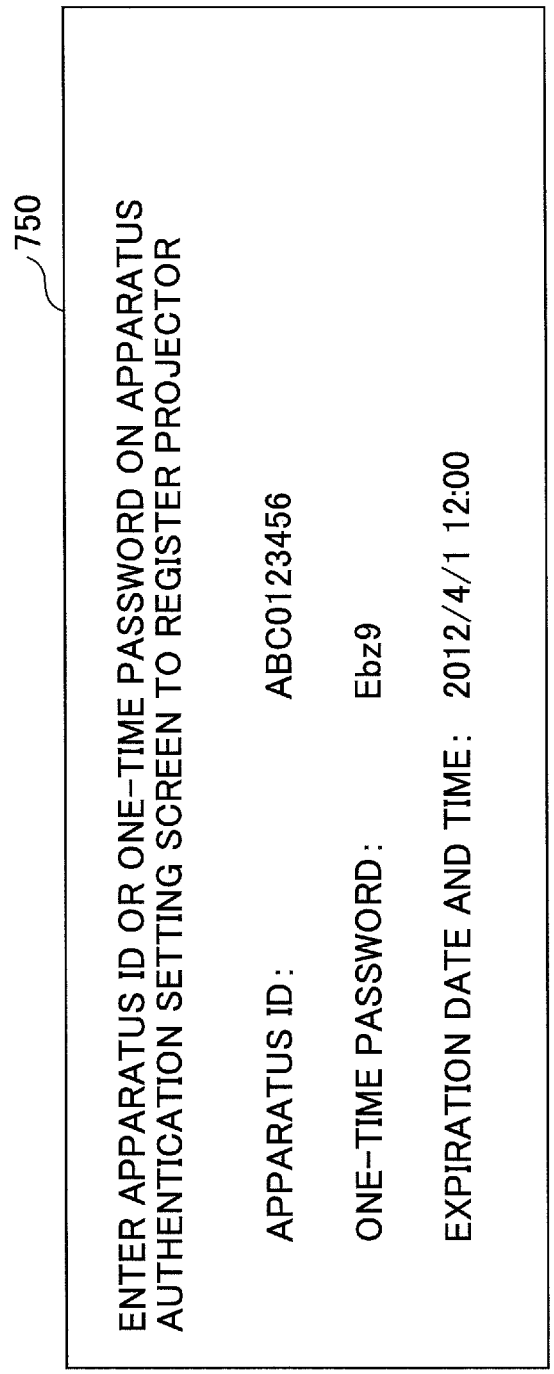
FIG. 22 is a diagram illustrating an image of a notification screen that is projected when "AUTHORIZATION FOR PROJECTION IS NECESSARY.jpg" is selected according to the first embodiment.

In response to reception of the binary data of "AUTHORIZATION FOR PROJECTION IS NECESSARY.jpg", the projector 15 projects, for example, a notification screen 750 as illustrated in FIG. 22.

FIG. 22 is a diagram illustrating an image of a notification screen that is projected when "AUTHORIZATION FOR PROJECTION IS NECESSARY.jpg" is selected. The notification screen 750 of FIG. 22 includes an apparatus ID and a one-time password. Accordingly, it is possible for the operator to easily determine an apparatus ID and/or a one-time password to be registered on the apparatus authentication setting screen 500 (FIG. 7).

Figure 23:
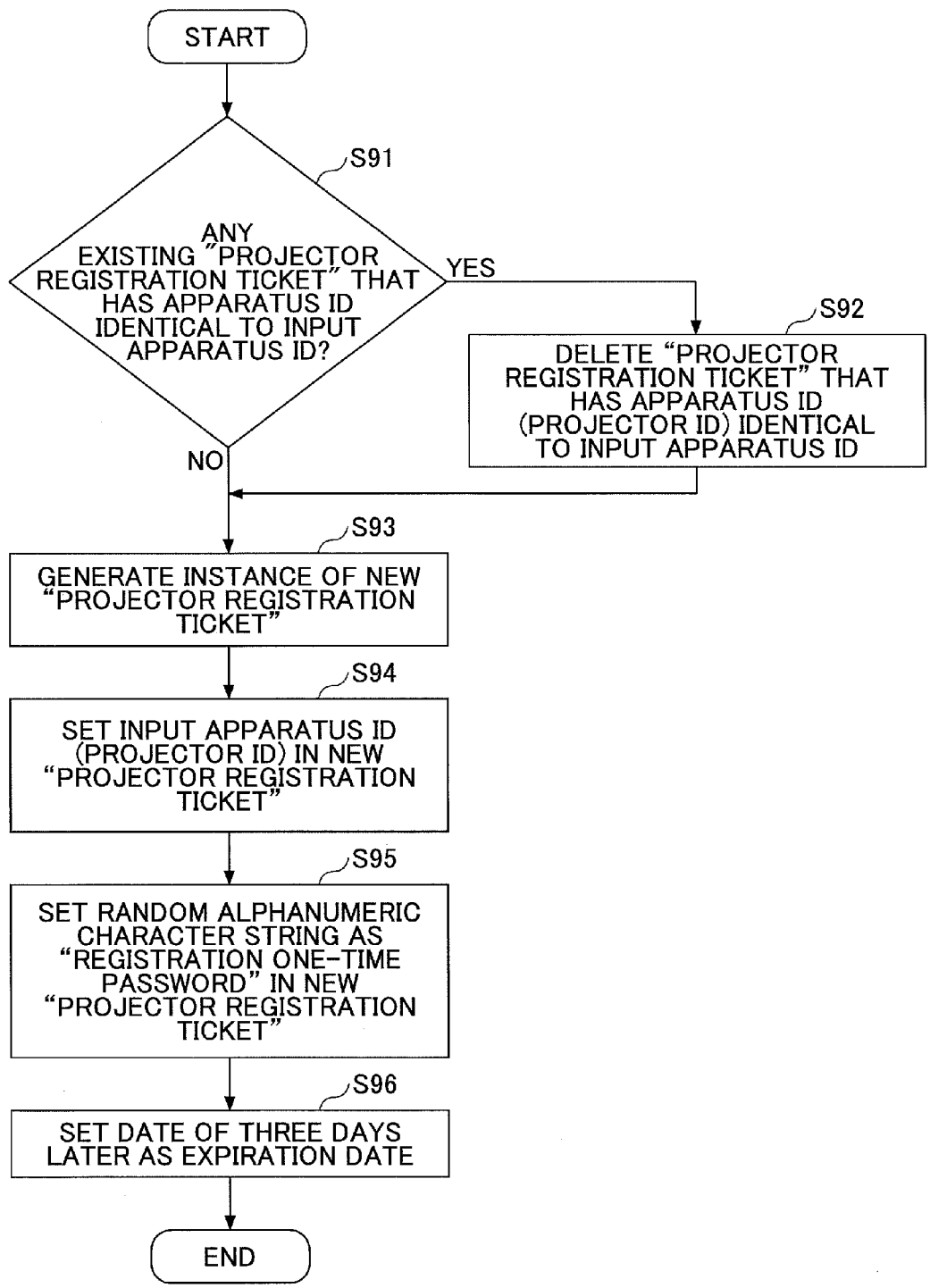
FIG. 23 is a flowchart illustrating a projector registration ticket generation process according to the first embodiment.

FIG. 23 is a flowchart illustrating a projector registration ticket generation process. Referring to FIG. 23, at step S91, the registration ticket generation part 52 determines whether there is a projector registration ticket that has an apparatus ID obtained from a request header as a "projector ID," referring to the existing projector registration tickets managed by the projector registration ticket management part 40 (FIG. 4).

If there is a projector registration ticket that has an apparatus ID obtained from a request header as a "projector ID" (YES at step S91), the registration ticket generation part 52 executes the process of step S93 after execution of the process of step S92. If there is no projector registration ticket that has an apparatus ID obtained from a request header as a "projector ID" (NO at step S91), the registration ticket generation part 52 executes the process of step S93 without execution of the process of step S92.

At step S92, the registration ticket generation part 52 deletes the projector registration ticket that has an apparatus ID obtained from a request header as a "projector ID" from the projector registration ticket management part 40.

At step S93, the registration ticket generation part 52 generates the instance of a new projector registration ticket. At step S94, the registration ticket generation part 52 sets the apparatus ID obtained from the request header in Projector ID of the new projector registration ticket. At step S95, the registration ticket generation part 52 sets a random alphanumeric character string in Registration One-Time Password of the new projector registration ticket. At step S96, the registration ticket generation part 52 sets, for example, the date of three days later in One-Time Password Expiration Date & Time of the new projector registration tickets.

FIG. 24 is a flowchart illustrating a process for generating the binary data of "AUTHORIZATION FOR PROJECTION IS NECESSARY.jpg". FIGS. 25A and 25B are diagrams illustrating a base image and items of notice (notice items). Referring to FIG. 24, at step S101, the projection screen generation part 53 (FIG. 4) makes a copy of, for example, the base image (background image) illustrated in FIG. 25A. At step S102, the projection screen generation part 53 generates character strings of, for example, the notice items illustrated in FIG. 25B. The character strings of the notice items represent an apparatus ID, a one-time password, and an expiration date and time, which correspond to a projector ID, a registration one-time password, and a one-time password expiration date and time, respectively, set in the projector registration ticket.

At step S103, the projection screen generation part 53 combines the copy of the base image and the generated character strings of the notice items. At step S104, the projection screen generation part 53 stores the binary data of the composite notice image (notification screen) 750 (FIG. 22), into which the base image and the character strings of the notice items have been combined, in a buffer memory, and returns an address at which the binary data of the notice image 750 is stored to the access control part 54.

Figures 26, 27:
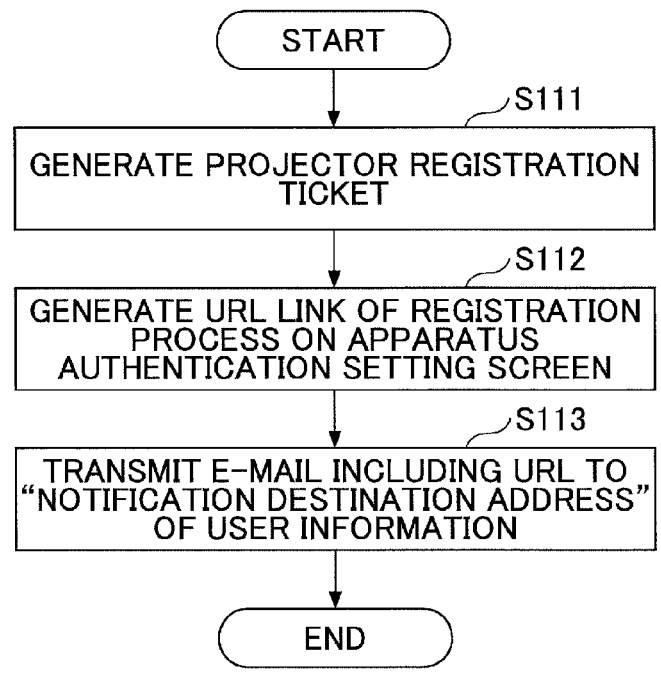
FIG. 26 is a flowchart illustrating another procedure for a process of an apparatus authentication controller according to the first embodiment.
FIG. 27 is a diagram illustrating a URL link of a registration process on an apparatus authentication setting screen according to the first embodiment.

FIG. 26 is a flowchart illustrating another procedure for a process of an apparatus authentication controller. Referring to FIG. 26, at step S111, the registration ticket generation part 52 of the apparatus authentication controller 47 generates a projector registration ticket for the projector 15 as illustrated in FIG. 23.

At step S112, the access control part 54 generates a URL link of a registration process on the apparatus authentication setting screen 500 (FIG. 7). At step S113, the access control part 54 transmits the URL link of a registration process on the apparatus authentication setting screen 500 to the e-mail address of a user set in Notification Destination Address of the user information.

FIG. 27 is a diagram illustrating a URL link of a registration process on an apparatus authentication setting screen. In the URL link of FIG. 27, "product_id=ABC0123456" that represents the apparatus ID of the projector 15 to be registered and "onetime=Ebz9" that represents a registration one-time password are included as parameters. The URL link of a registration process on the apparatus authentication setting screen 500 may include at least one of the apparatus ID of the projector 15 to be registered and a registration one-time password.

A user receives an e-mail that includes a URL link of a registration process on the apparatus authentication setting screen 500 as illustrated in FIG. 27 at a terminal such as a PC, and accesses the URL. In response to access to the URL link of a registration process on the apparatus authentication setting screen 500, the setting part 51 (FIG. 4) of the apparatus authentication controller 47 executes a process as illustrated in FIG. 28.

Figure 28:
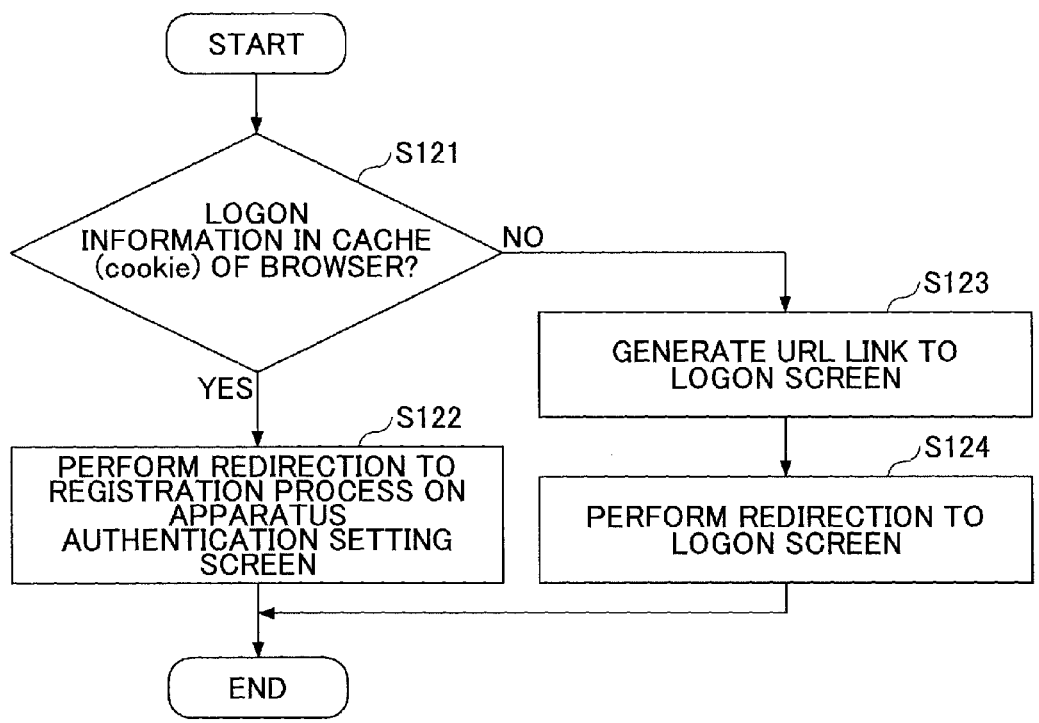
FIG. 28 is a flowchart illustrating a process of a setting part at a time when there is access to a URL link of a registration process on an apparatus authentication setting screen according to the first embodiment.

FIG. 28 is a flowchart illustrating a process of a setting part at a time when there is access to a URL link of a registration process on an apparatus authentication setting screen. Referring to FIG. 28, at step S121, the setting part 51 determines whether logon information is stored in the cache (cookie) of a browser.

If logon information is stored (YES at step S121), at step S122, the setting part 51 redirects to a registration process on the apparatus authentication setting screen 500. A terminal such as a PC that has accessed the URL link of a registration process on the apparatus authentication setting screen 500 displays, for example, a notification screen 800 as illustrated in FIG. 29.

Figures 29, 30:
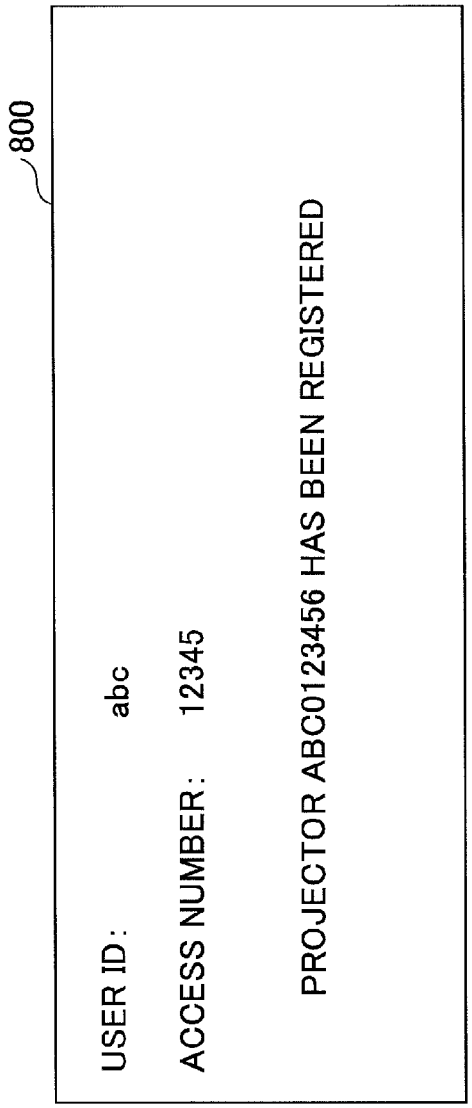
FIG. 29 is a diagram illustrating an image of a notification screen that is displayed after redirection to a registration process on an apparatus authentication setting screen according to the first embodiment.
FIG. 30 is a diagram illustrating a URL link to a logon screen according to the first embodiment.

FIG. 29 is a diagram illustrating an image of a notification screen that is displayed after redirection to a registration process on an apparatus authentication setting screen. A user ID, an access number, and the apparatus ID of the projector 15 that has been registered in "Projection Authorized Projector ID" of the user information are displayed on the notification screen 800 of FIG. 29.

The redirection to a registration process on the apparatus authentication setting screen 500 is the same behavior as entering at least one of the apparatus ID of the projector 15 and a registration one-time password and depressing at least one of the REGISTER buttons 507 and 509 on the apparatus authentication setting screen 500 because the URL link of a registration process on the apparatus authentication setting screen 500 includes at least one of the apparatus ID of the projector 15 to be registered and a registration one-time password.

Accordingly, by the redirection to a registration process on the apparatus authentication setting screen 500, the setting part 51 of the apparatus authentication controller 47 executes the process of FIG. 8 or FIG. 9, so that the apparatus ID of the projector 15 may be added to Projection Authorized Projector ID of the user information.

If it is determined at step S121 that no logon information is stored (NO at step S121), at step S123, the setting part 51 generates a URL link to a logon screen. At step S124, the setting part 51 redirects to the logon screen.

FIG. 30 is a diagram illustrating a URL link to a logon screen. The URL link of FIG. 30 includes "next="http://example.com/register?product_id=ABC0123 456&onetime=Ebz9"" that represents a transition destination after successful logon as a parameter.

Figure 31:
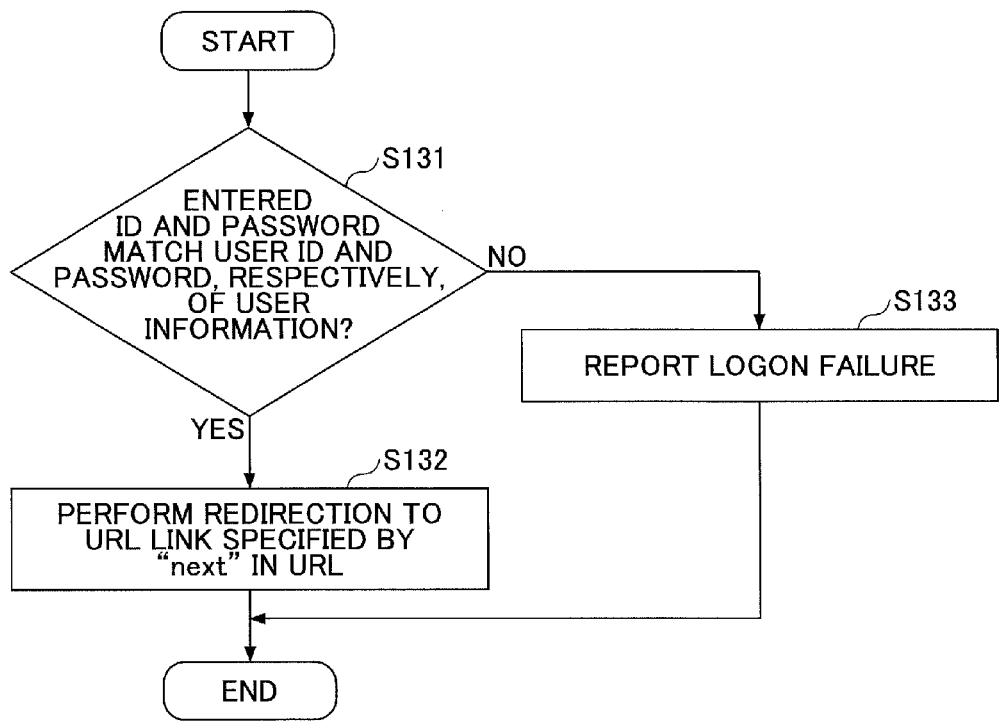
FIG. 31 is a flowchart illustrating a process executed after redirection to a logon screen according to the first embodiment.
Figure 32:
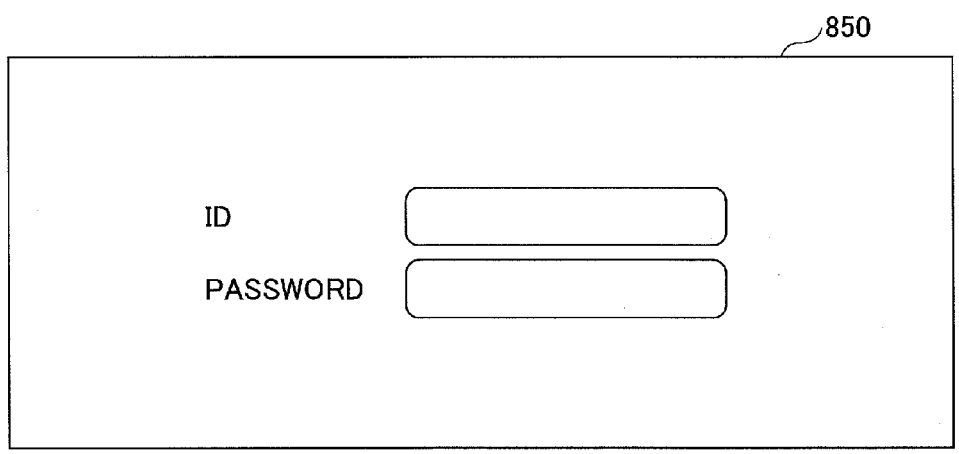
FIG. 32 is a diagram illustrating an image of logon information according to the first embodiment.

FIG. 31 is a flowchart illustrating a process executed after redirection to a logon screen. Referring to FIG. 31, at step S131, the setting part 51 of the apparatus authentication controller 47 determines whether an ID and a password entered on a logon screen 850 as illustrated in FIG. 32 match the user ID and the password, respectively, of the user information. FIG. 32 is a diagram illustrating an image of logon information.

If an ID and a password entered on the logon screen 850 match the user ID and the password, respectively, of the user information (YES at step S131), at step S132, the setting part 51 redirects to the transfer destination after successful logon specified by "next" included in the URL link of FIG. 30. If an ID or a password entered on the logon screen 850 does not match the user ID or the password of the user information (NO at step S131), at step S133, the setting part 51 reports a logon failure to a terminal such as a PC.

Figure 33:
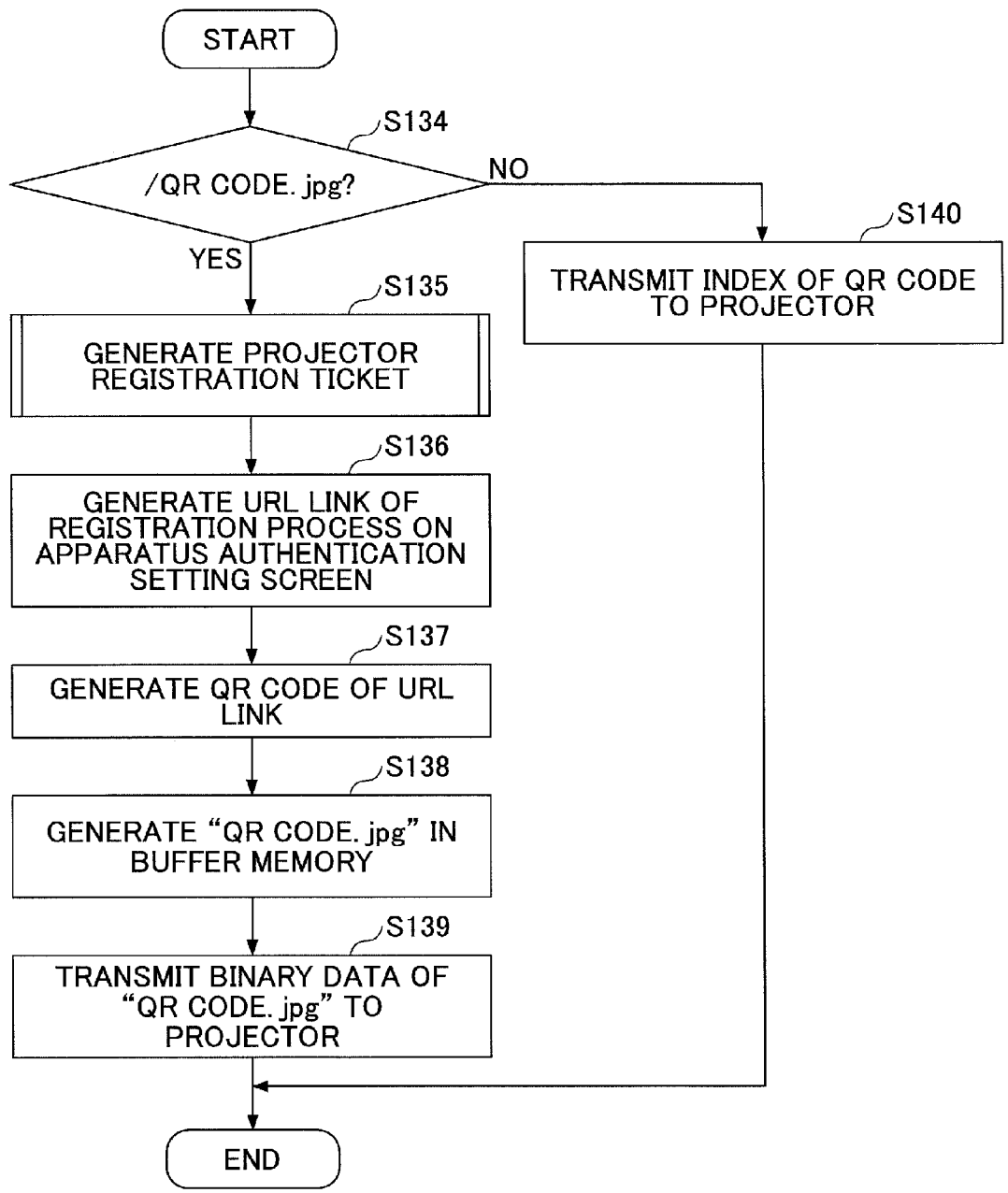
FIG. 33 is a flowchart illustrating another procedure for a process of an apparatus authentication controller according to the first embodiment.

FIG. 33 is a flowchart illustrating another procedure for a process of an apparatus authentication controller. Referring to FIG. 33, at step S134, the access control part 54 determines whether an input is a request for projection of "QR CODE.jpg".

Figure 34:
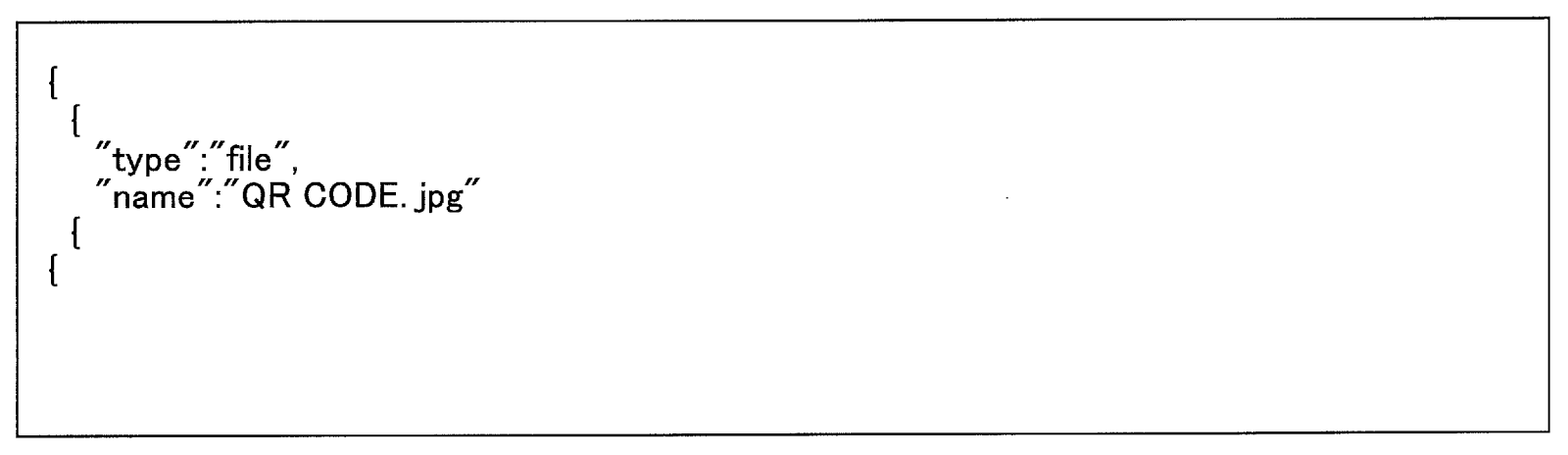

If an input is not a request for projection of "QR CODE.jpg" (NO at step S134), at step S140, the access control part 54 transmits an index of a QR code as illustrated in FIG. 34 to the projector 15. FIG. 34 is a diagram illustrating a configuration of an index of a QR code.

Figure 35:
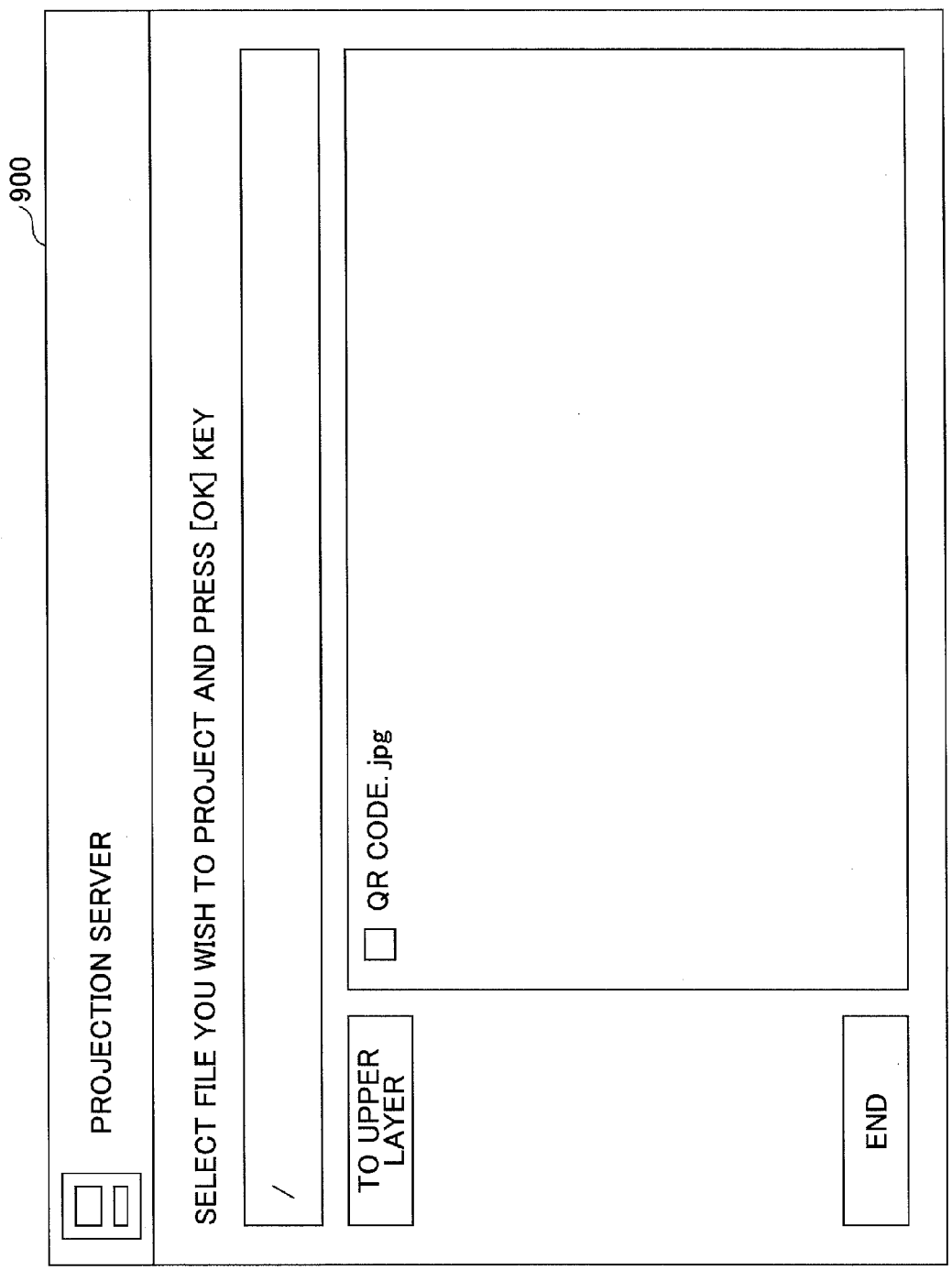
FIG. 35 is a diagram illustrating an image of a file list screen according to the first embodiment.

In response to reception of the index file of FIG. 34, the projector 15 projects, for example, a file list screen 900 as illustrated in FIG. 35. FIG. 35 is a diagram illustrating an image of a file list screen. The file list screen 900 of FIG. 34 is displayed in response to the entering of an access number when the requesting projector 15 is not set in Projection Authorized Projector ID of the user information. Accordingly, it is possible for the operator to determine that authorization for projection is necessary to project contents with the projector 15.

When "QR CODE.jpg" is selected on the file list screen 900, at step S135, the registration ticket generation part 52 of the apparatus authentication controller 47 generates a projector registration ticket for the projector 15 as illustrated in FIG. 23.

At step S136, the access control part 54 generates a URL link of a registration process on the apparatus authentication setting screen 500 as illustrated in FIG. 27, for example. At step S137, the access control part 54 generates a QR code of the URL link of a registration process on the apparatus authentication setting screen 500. At step S138, the projection screen generation part 53 of the apparatus authentication controller 47 generates the binary data of "QR CODE.jpg" in a buffer memory.

The process of generating the binary data of "QR CODE.jpg" in a buffer memory is executed, following the procedure of making a copy of a base image (background image), storing the binary data of a notice image into which the copy of the base image and a QR code image have been combined in the buffer memory, and returns an address at which the binary data of the notice image is stored to the access control part 54. At step S139, the access control part 54 transmits the binary data of "QR CODE.jpg" to the projector 15.

Figure 36:
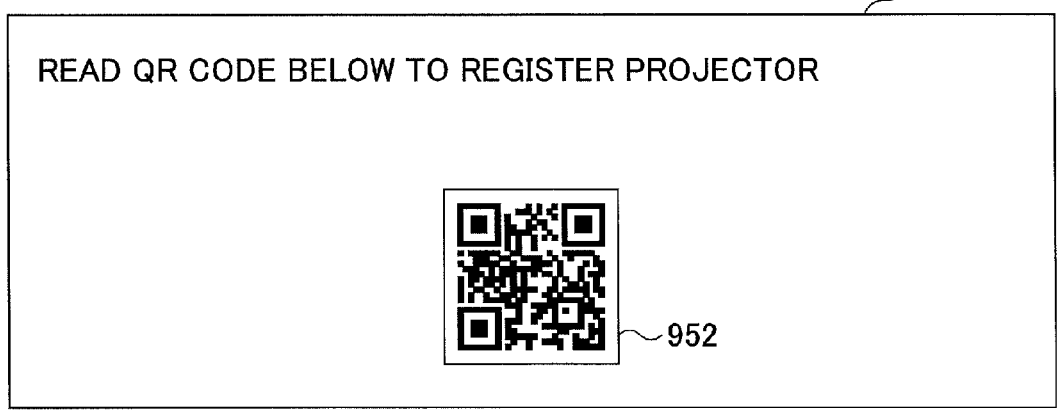
FIG. 36 is a diagram illustrating an image of a notification screen that is projected when "QR CODE.jpg" is selected according to the first embodiment.

In response to reception of the binary data of "QR CODE.jpg", the projector 15 projects, for example, a notification screen 950 as illustrated in FIG. 36. FIG. 36 is a diagram illustrating an image of a notification screen that is projected when "QR CODE.jpg" is selected.

The notification screen 950 of FIG. 36 includes a QR code 952 of a URL link of a registration process on the apparatus authentication setting screen 500. By reading the QR code 952 with a terminal with a camera function, the operator may easily access the URL link of a registration process on the apparatus authentication setting screen 500.

The QR code 952 includes a URL link of a registration process on the apparatus authentication setting screen 500 as illustrated in FIG. 27. Accordingly, the QR code 952 includes "product_id=ABC0123456" that represents the apparatus ID of the projector 15 to be registered and "onetime=Ebz9" that represents a registration one-time password.

By accessing a URL link of a registration process on the apparatus authentication setting screen 500, a user may add the apparatus ID of the projector 15 to Projection Authorized Projector ID of the user information as described above.

Figure 37:
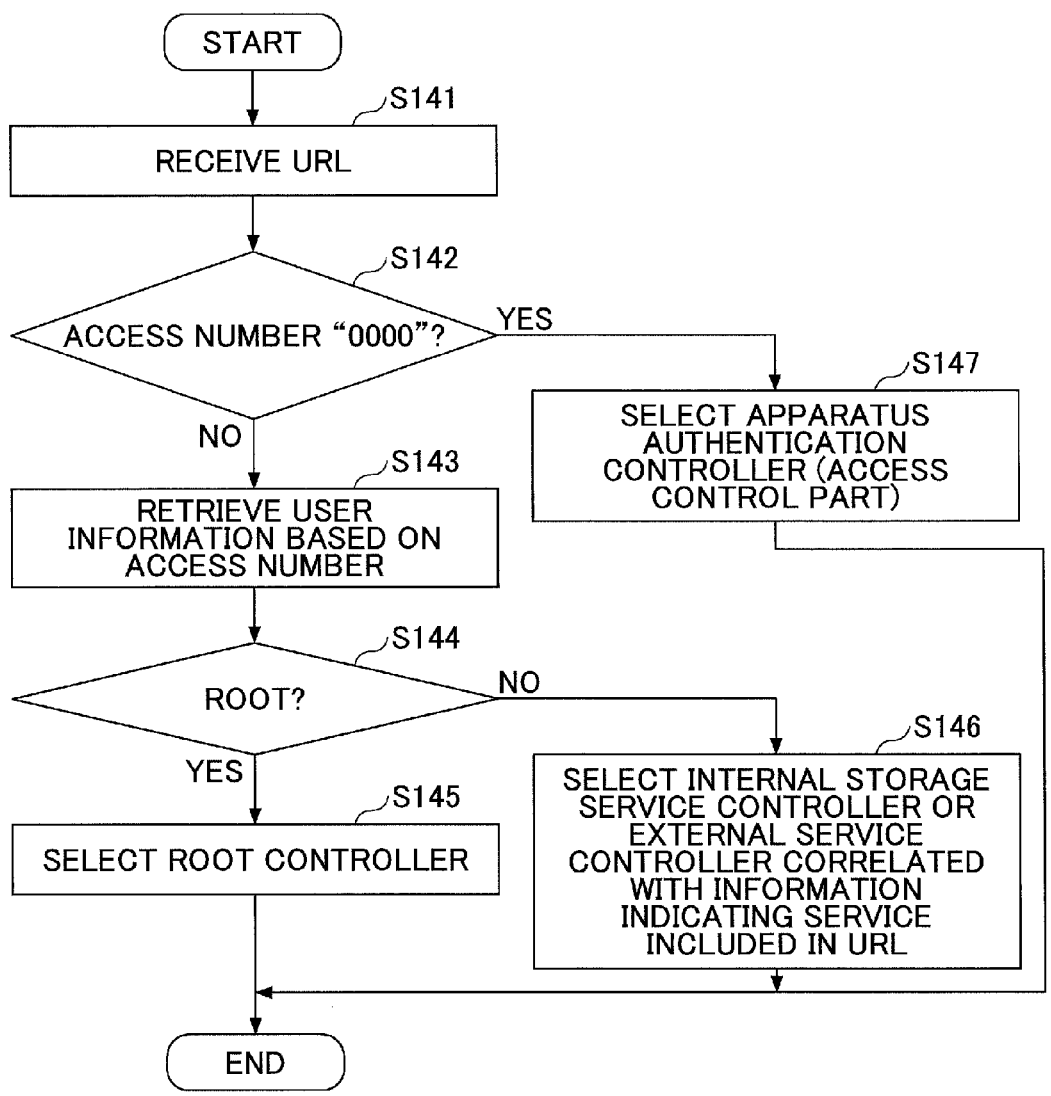
FIG. 37 is a flowchart illustrating another procedure for processes of a dispatcher part and a controller part according to the first embodiment.

FIG. 37 is a flowchart illustrating another procedure for processes of a dispatcher part and a controller part. The process of the flowchart of FIG. 37 is the same as the process of the flowchart of FIG. 15 except for some parts, and accordingly, its description is omitted where appropriate.

Referring to FIG. 37, at step S141, the dispatcher part 32 receives a URL as illustrated in FIG. 14 from the HTTP server part 31. At step S142, the dispatcher part 32 determines whether the access number included in the received URL is "0000."

If the access number included in the received URL is not "0000" (NO at step S142), at step S143, the dispatcher part 32 retrieves user information from the user management part 37 based on the access number.

At step S144, the dispatcher part 32 determines whether the received URL is a root. If the received URL is a root (YES at step S144), at step S145, the dispatcher part 32 selects the root controller 44 and delivers the URL to the root controller 44. If the received URL is not a root (NO at step S144), the dispatcher part 32 executes the process of step S146.

At step S146, based on information indicating a service ("local," "ext1," etc.) included in the received URL, the dispatcher part 32 selects the internal storage service controller 45 or the external service controller 46 correlated with the information indicating a service, and delivers the URL to the selected internal storage service controller 45 or external service controller 46.

If the access number included in the received URL is "0000" (YES at step S142), at step S147, the dispatcher part 32 selects the access control part 54 of the apparatus authentication controller 47 and notifies the access control part 54 that the access number included in the received URL is "0000." The apparatus authentication controller 47 executes any of the above-described forms of the process of step S72 of FIG. 18, such as the process illustrated in FIG. 19 or the process illustrated in FIG. 33, in order to cause an operator of the projector 15 to register the apparatus ID of the projector 15 in Projection Authorized Projector ID of the user information.

A description is given of a process of the root controller 44.

Figure 38:
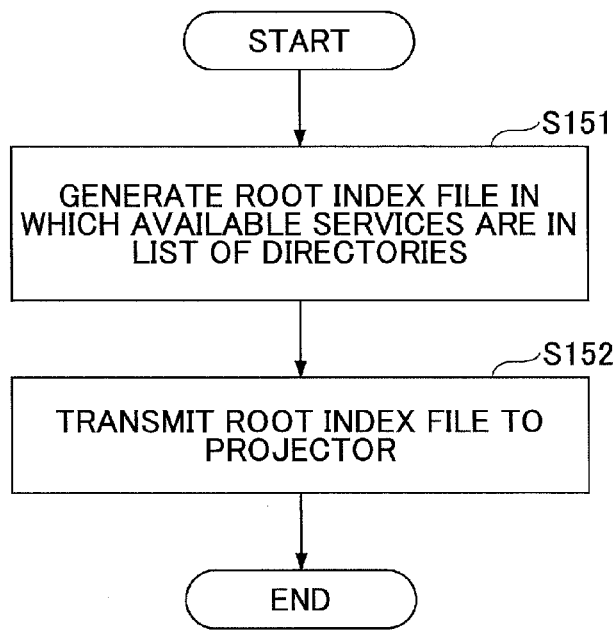
FIG. 38 is a flowchart illustrating a procedure for a process of a root controller according to the first embodiment.

The root controller 44 executes a process in a procedure as illustrated in FIG. 38. FIG. 38 is a flowchart illustrating a procedure for a process of a root controller.

Referring to FIG. 38, at step S151, the root controller 44 generates a root index file, in which an internal storage service and external services available to a user are in a list of directories, based on the available services of the user information retrieved in, for example, step S52 of FIG. 15.

At step S152, the root controller 44 transmits the generated root index file to the projector 15 via the HTTP server part 31. The projector 15 displays a file list screen based on the received root index file. The file list screen displays information on directories and files included in the root index file in a file list display area.

A description is given of a process of the external service controller 46.

Figure 39:
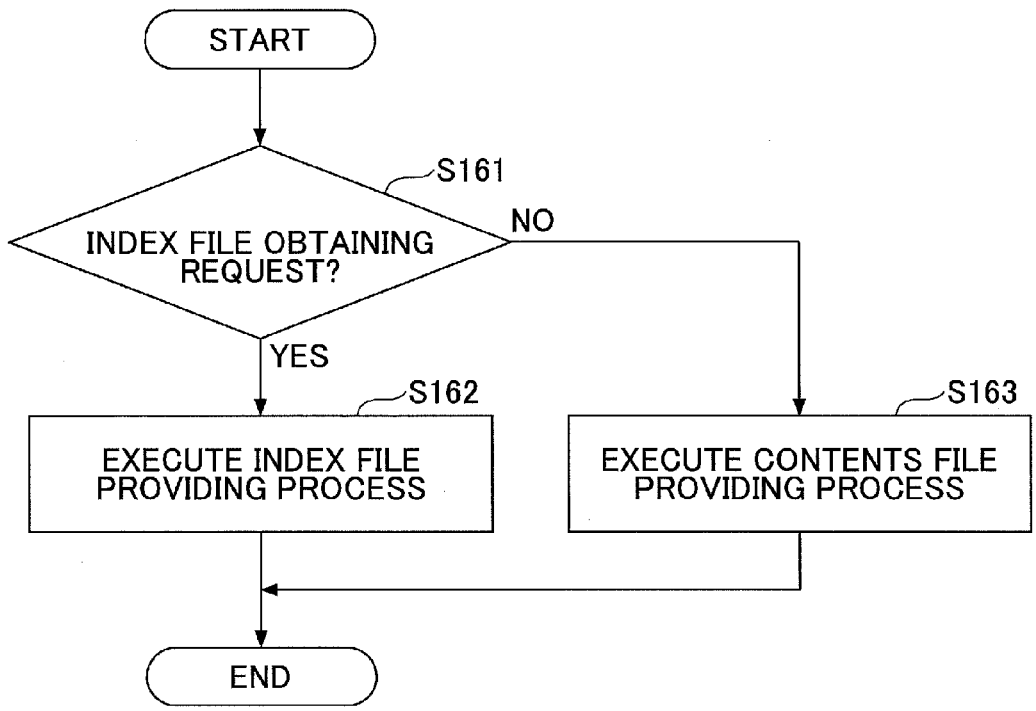
FIG. 39 is a flowchart illustrating an overview of a procedure for a process of an external service controller according to the first embodiment.

The process of the external service controller 45 differs depending on the external service. FIG. 39 is a flowchart illustrating an overview of a procedure for a process of an external service controller.

Referring to FIG. 39, at step S161, in response to reception of a URL from the dispatcher part 32, the external service controller 46 determines from the received URL whether the obtaining of an index file is requested. For example, if the end of the received URL is "/", the external service controller 46 determines that the obtaining of an index file is requested.

In response to determining that the obtaining of an index file is requested (YES at step S161), at step S162, the external service controller 46 executes a process for providing an index file (an index file providing process). In response to determining that the obtaining of an index file is not requested (NO at step S161), at step S163, the external service controller 46 executes a process for providing a contents file (a contents file providing process).

The index file providing process of step S162 is executed in conjunction with the projector 15 and an external service. Here, the index file providing process of step S162 is described using the sequence diagram of FIG. 40.

Figure 40:
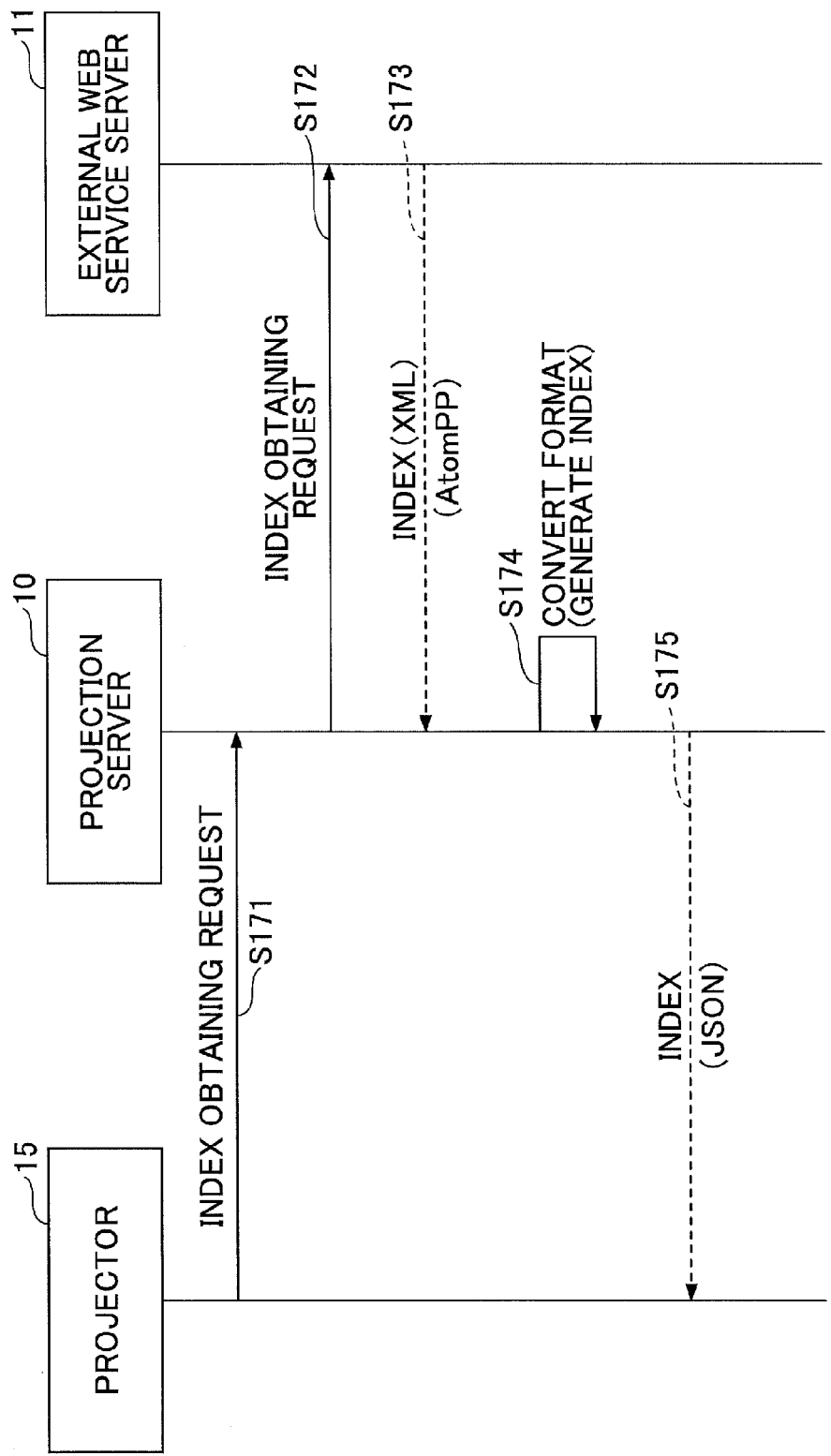
FIG. 40 is a sequence diagram illustrating an index file providing process according to the first embodiment.

FIG. 40 is a sequence diagram illustrating an index file providing process. FIG. 40 illustrates the external Web service server 11 (FIG. 1) as an apparatus that provides an external service.

Referring to FIG. 40, at step S171, the projection server 10 receives a request to obtain an index file of the external Web service server 11 by receiving a URL as illustrated in (c) of FIG. 14, for example. At step S172, the projection server 10 makes a request to obtain an index file to the external Web service server 11.

At step S173, the projection server 10 receives an index file written in, for example, XML (eXtensible Markup Language) format from the external Web service server 11.

At step S174, the projection server 10 converts the format of the index file of the external Web service server 11 from XML format to JSON (JavaScript Object Notation) format. If the format of the index file received at step S173 is JSON format, the process of step S174 is omitted. At step S175, the projection server 10 provides the projector 15 with the index file of the external Web service server 11 written in JSON format.

The contents file providing process of step S163 of FIG. 39 is executed in conjunction with the projector 15 and an external service. Here, the contents file providing process of step S163 is described using the sequence diagram of FIG. 41.

Figure 41:
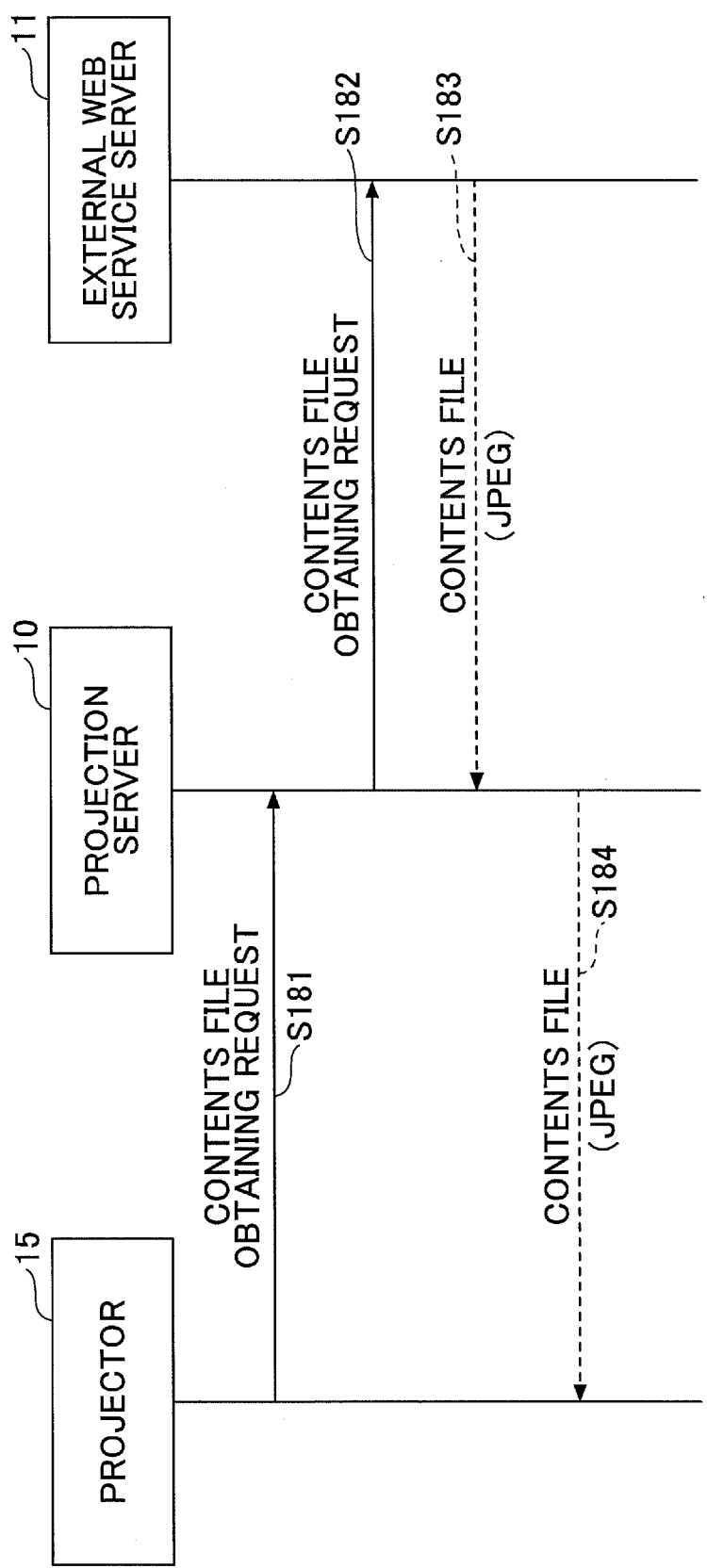
FIG. 41 is a sequence diagram illustrating a contents file providing process according to the first embodiment.

FIG. 41 is a sequence diagram illustrating a contents file providing process. FIG. 41 illustrates the external Web service server 11 (FIG. 1) as an apparatus that provides an external service. FIG. 41 illustrates a case where a contents file is stored in the external Web service server 11 in such format as to allow direct projection of contents by the projector 15 (for example, JPEG format).

Referring to FIG. 41, at step S181, the projection server 10 receives a request to obtain a contents file of the external Web service server 11 by receiving a URL as illustrated in (e) of FIG. 14, for example. At step S182, the projection server 10 makes a request to obtain a contents file to the external Web service server 11.

At step S183, the projection server 10 receives a contents file written in, for example, JPEG format from the external Web service server 11. At step S184, the projection server 10 provides the projector 15 with the contents file in JPEG format received from the external Web service server 11.

In the contents file providing process in a case where a contents file is stored in the external Web service server 11 in a format that prevents direct projection of contents by the projector 15 (for example, GIF format or PNG format), the format conversion part 36 (FIG. 4) of the projection server 10 converts the format of the contents file into a format that allows direct projection of contents by the projector 15.

When a contents file stored in an internal storage is selected on a file list screen, the contents file providing process of step S163 is executed, for example, as follows.

The projection server 10 receives a request to obtain a contents file stored in an internal storage from the projector 15. The projection server 10 searches contents files stored in the internal storage, and reads the requested contents file from the internal storage. Then, the projection server 10 provides the projector 15 with the contents file in JPEG format read from the internal storage.

According to the projection system 1 of this embodiment, by pre-specifying the projector 15 that is authorized to obtain contents, it is possible to prevent projectors other than the pre-specified projector 15 from obtaining the contents even when a passcode that removes access restriction, such as an access number, is brought to the knowledge of a malicious third party or an IC card that removes a restriction placed by an access code is obtained by a malicious third party.

Furthermore, according to the projection system 1 of this embodiment, even when the projector 15 that is desired to be caused to obtain contents is not specified, a user whose user information is managed by the user management part 37 may easily specify the projector 15 as a projector authorized to obtain contents.

Thus, according to the projection system 1 of this embodiment, it is possible to improve the convenience of the projector 15.

[Second Embodiment]

A description is given of a second embodiment. According to the first embodiment, the projector 15 authorized to perform projection may be set (determined) user by user (on a user basis). According to the second embodiment, the projector 15 authorized to perform projection may be set (determined) user by user and file by file.

The second embodiment has the same system configuration and hardware configuration as those of the first embodiment. Accordingly, a description of the same parts as those of the first embodiment is omitted.

Figure 42:
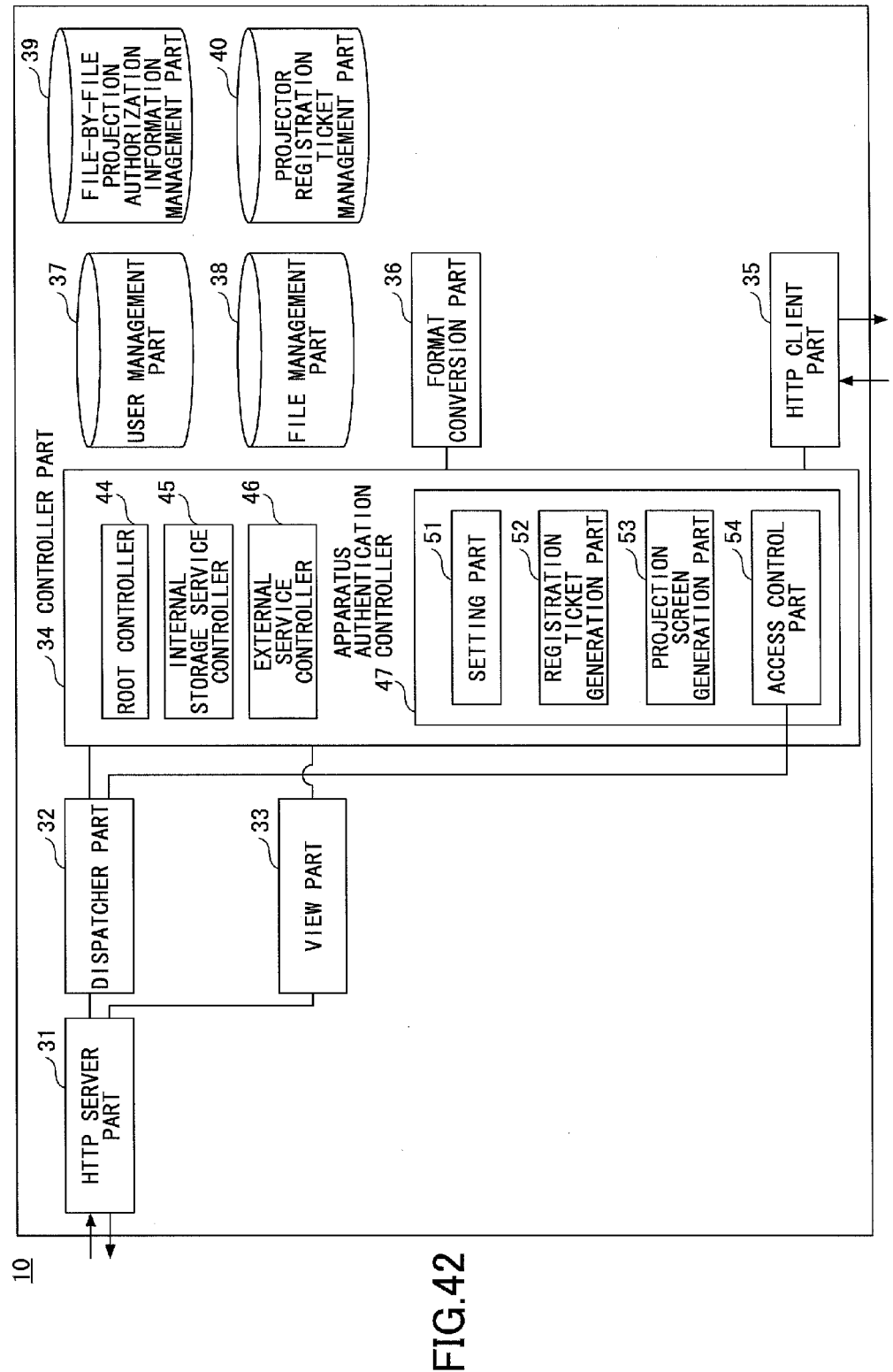
FIG. 42 is a diagram illustrating a software configuration of a projection server according to a second embodiment.

FIG. 42 is a diagram illustrating a software configuration of a projection server according to the second embodiment. In addition to the configuration of the projection server 10 of FIG. 4, the projection server 10 of FIG. 42 implements a file-by-file projection authorization information management part 39 by executing a program. The file-by-file projection authorization information management part 39 manages below-described file-by-file projection authorization information. Furthermore, the user management part 37 manages below-described user information in place of the user information of FIG. 5.

FIG. 43 is a diagram illustrating a configuration of user information. The user information of FIG. 43 is the same as the user information of FIG. 5 except for deleting (excluding) the item of Projection Authorized Projector ID. It is assumed that a user of a user ID "abc" has two files of respective filenames "abc.jpg" and "bcd.ppt". In this case, as illustrated in FIG. 44, the file-by-file projection authorization information management part 39 contains two pieces of file-by-file projection authorization information correlated with the user.

FIG. 44 is a diagram illustrating a configuration of file-by-file projection authorization information. The file-by-file projection authorization information includes the items of File Path, Filename, User ID, and Projection Authorized Projector ID. The file-by-file projection authorization information sets the item of Projection Authorized Projector ID file by file and user by user. That is, the file-by-file projection authorization information enumerates and sets the apparatus IDs of projectors 15 that are authorized to perform projection when the apparatus authentication setting is enabled file by file and user by user.

For example, the file-by-file projection authorization information of FIG. 44 indicates that a user of a user ID "abc" is authorized to project a file of a filename "abc.jpg" with the projectors 15 of respective apparatus IDs of "ABC0123456," "BCD1234567," and "CDE2345678" and that the user of the user ID "abc" is authorized to project a file of a filename "bcd.ppt" with the projectors 15 of respective apparatus IDs of "ABC0123456" and "BCD1234567." FIG. 44 illustrates an example, and the projection authorization information may be provided for each file type, for example.

A description is given of a process flow. First, a description is given of an apparatus authentication setting process.

Figure 45:
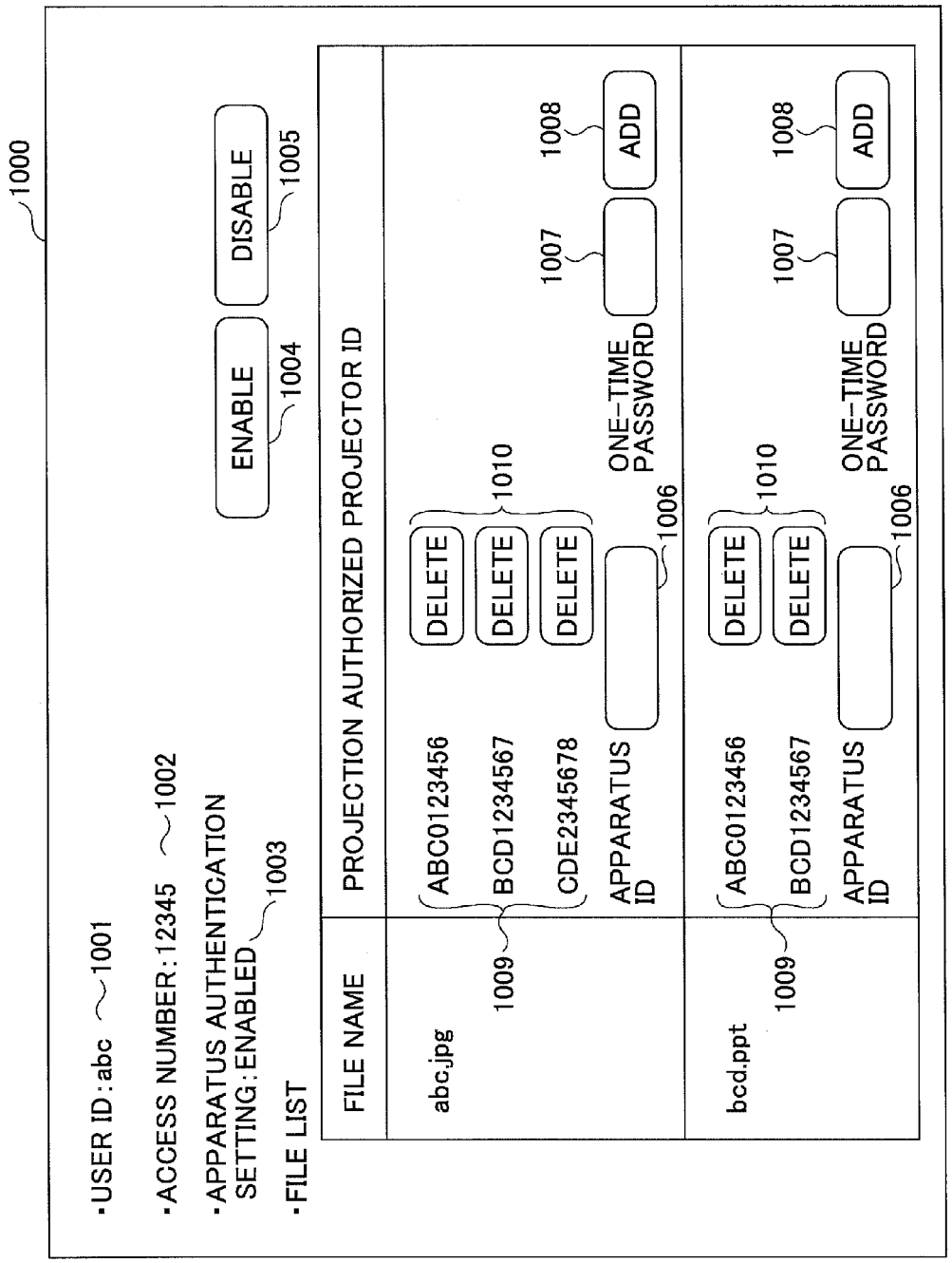
FIG. 45 is a diagram illustrating an image of an apparatus authentication setting screen according to the second embodiment.

FIG. 45 is a diagram illustrating an image of an apparatus authentication setting screen. Referring to FIG. 45, an apparatus authentication setting screen 1000 is generated by the apparatus authentication controller 47 of the projection server (FIG. 4). The apparatus authentication setting screen 1000 may be displayed by the projector 15 that has accessed the projection server 10 or may be displayed on a terminal such as a PC operated by an operator.

The apparatus authentication setting screen 1000 is displayed after an operator of the projector 15 is subjected to user authentication in the projector server 10. The apparatus authentication setting screen 1000 reflects the user information illustrated in FIG. 43 and the file-by-file projection authorization information of FIG. 44.

The apparatus authentication setting screen 1000 includes a user ID 1001, an access number 1002, and an apparatus authentication setting 1003 of the user information. The apparatus authentication setting 1003 is "enabled" by the operator depressing an ENABLE button 1004, and is "disabled" by the operator depressing a DISABLE button 1005.

The apparatus authentication setting screen 1000 includes a file list, where the IDs of projectors authorized to perform projection are set for each filename (filename by filename). For each filename, the file list includes an ID entry field 1006, where the operator enters an apparatus ID. By the operator depressing an ADD button 1008, the projector 15 of the apparatus ID entered in the ID entry field 1006 is registered as a projector authorized to perform projection when the apparatus authentication setting is enabled.

For each filename, the file list includes a one-time password entry field 1007, where the operator enters a one-time password. By the operator depressing the ADD button 1008, the projector 15 correlated with the one-time password entered in the one-time password entry field 1007 is registered as a projector authorized to perform projection when the apparatus authentication setting is enabled.

For each file name, the file list includes a registered projector list 1009, which is Projection Authorized Projector ID of the file-by-file projection authorization information. A DELETE button 1010 is provided for each of the apparatus IDs of the projectors 15 displayed in the registered projector list 1009. By the operator depressing the DELETE button 1010, the apparatus ID of the projector 15 corresponding to the DELETE button 1010 is deleted from Projection Authorized Projector ID of the file-by-file projection authorization information.

Next, a description is given of a file transmission process.

Figure 46:
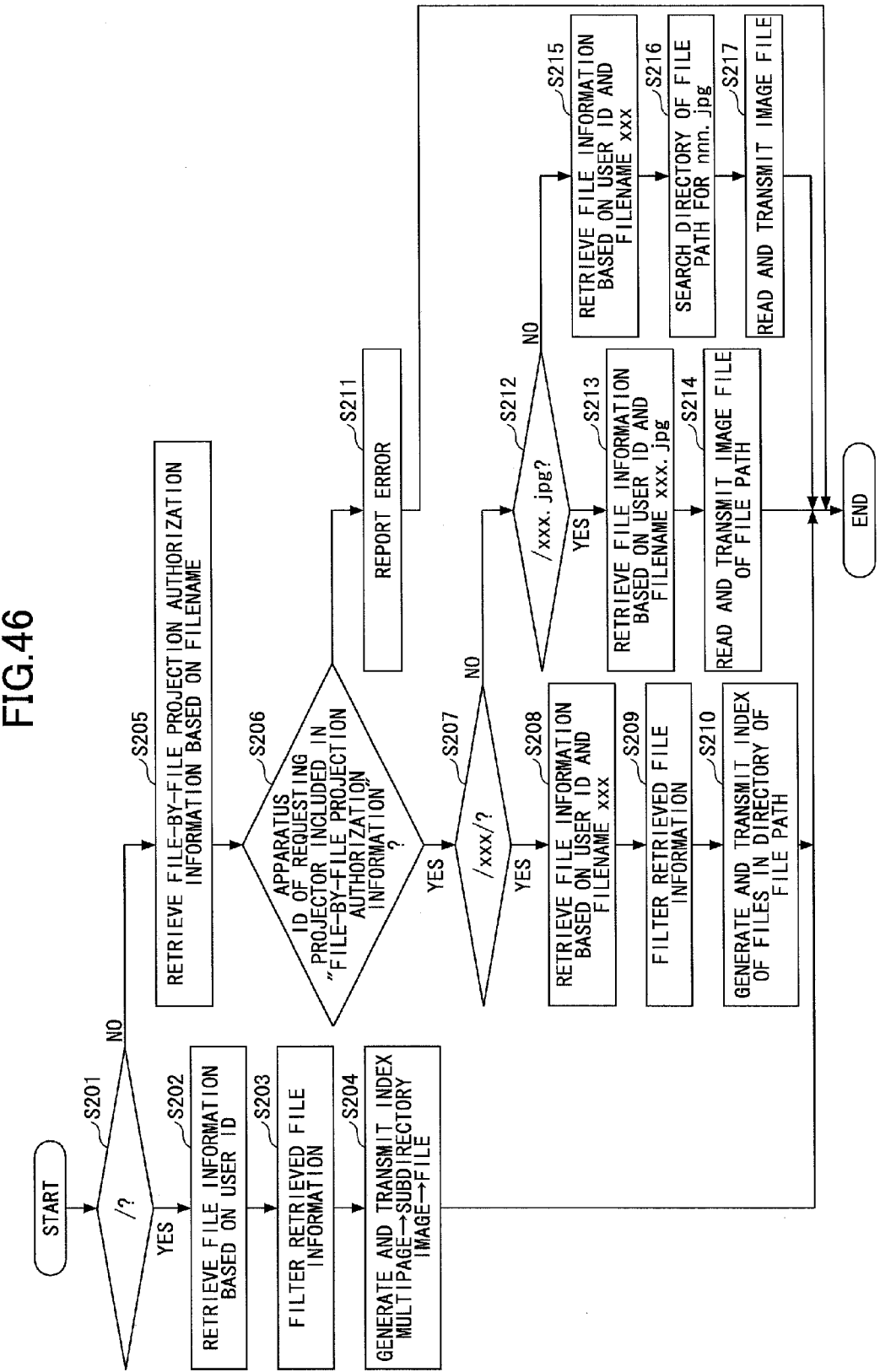
FIG. 46 is a flowchart illustrating a file transmission process according to the second embodiment.

FIG. 46 is a flowchart illustrating a file transmission process. For example, the projector 15 may request transmission of a file by making a file GET request to a URL (for example, http://projection.example.com/12345/local/presentation-.ppt/file001.jpeg).

In the above-described URL, a portion of "/presentation-.ppt/file001.jpeg" is referred to as a URL path in an internal storage. At step S201 of FIG. 46, the internal storage service controller 45 of the controller part 34 determines whether a URL path in an internal storage included in the received URL is "/".

If the URL path in an internal storage included in the received URL is "/" (YES at step S201), at step S202, the internal storage service controller 45 retrieves file information based on a user ID. The user ID may be obtained by searching user information based on an access number.

At step S203, the internal storage service controller 45 filters the retrieved file information. The process of step S203 will be described in detail below using FIG. 47.

At step S204, the internal storage service controller 45 generates an index file of a list in which, of the files in the internal storage, multipage files are shown as subdirectories and non-multipage files are shown as files based on the file information filtered at step S203.

The internal storage service controller 45 provides the projector 15 with the generated index file. The index file does not include files deleted by the filtering of step S203.

On the other hand, if it is determined at step S201 that the URL path in an internal storage included in the received URL is not "/" (NO at step S201), the internal storage service controller 45 executes the process of step S205.

At step S205, the internal storage service controller 45 retrieves file-by-file projection authorization information from the file-by-file projection authorization management part 39 using a filename. At step S206, the internal storage service controller 45 determines whether the apparatus ID of the projector 15 that has made the file GET request is included in the file-by-file projection authorization information retrieved at step S205.

If it is determined at step S206 that the apparatus ID of the projector 15 that has made the file GET request is included in the retrieved file-by-file projection authorization information (YES at step S206), at step S207, the internal storage service controller 45 determines whether the URL path in an internal storage included in the received URL matches a pattern including a subdirectory indicating a multipage file (/xxx/ in FIG. 46). If it is determined at step S207 that the URL path in an internal storage matches a pattern including a subdirectory (YES at step S207), at step S208, the internal storage service controller 45 retrieves file information based on a user ID and the filename.

At step S209, like at step S203, the internal storage service controller 45 filters the retrieved file information. At step S210, the internal storage service controller 45 generates an index file listing files in a directory specified by a file path included in the retrieved file information, and transmits the generated index file to the projector 15.

If it is determined at step S207 that the URL path in an internal storage does not match a pattern including a subdirectory (NO at step S207), at step S212, the internal storage service controller 45 determines whether the URL path in an internal storage included in the received URL matches a pattern including an image file (/xxx.jpg in FIG. 46).

If it is determined at step S212 that the URL path in an internal storage matches the pattern (YES at step S212), at step S213, the internal storage service controller 45 retrieves file information based on the user ID and the filename. At step S214, the internal storage service controller 45 reads an image file specified by a file path included in the retrieved file information, and transmits the read image file to the projector 15.

If it is determined at step S212 that the URL path in an internal storage does not match the pattern "/xxx.jpg", that is, if the URL path in an internal storage is information indicating an image file (page) in a multipage file (for example, /xxx/nnn.jpg) (NO at step S212), at step S215, the internal storage service controller 45 retrieves file information based on a user ID and the filename "xxx".

At step S216, the internal storage service controller 45 searches a directory specified by a file path included in the retrieved file information for an image file "nnn.jpg". At step 217, the internal storage service controller 45 reads the requested image file from the internal storage, and provides the projector 15 with the read image file.

If it is determined at step S206 that the apparatus ID of the projector 15 that has made the file GET request is not included in the retrieved file-by-file projection authorization information, in step S211, the internal storage service controller 45 reports an error to the projector 15.

Figure 47:
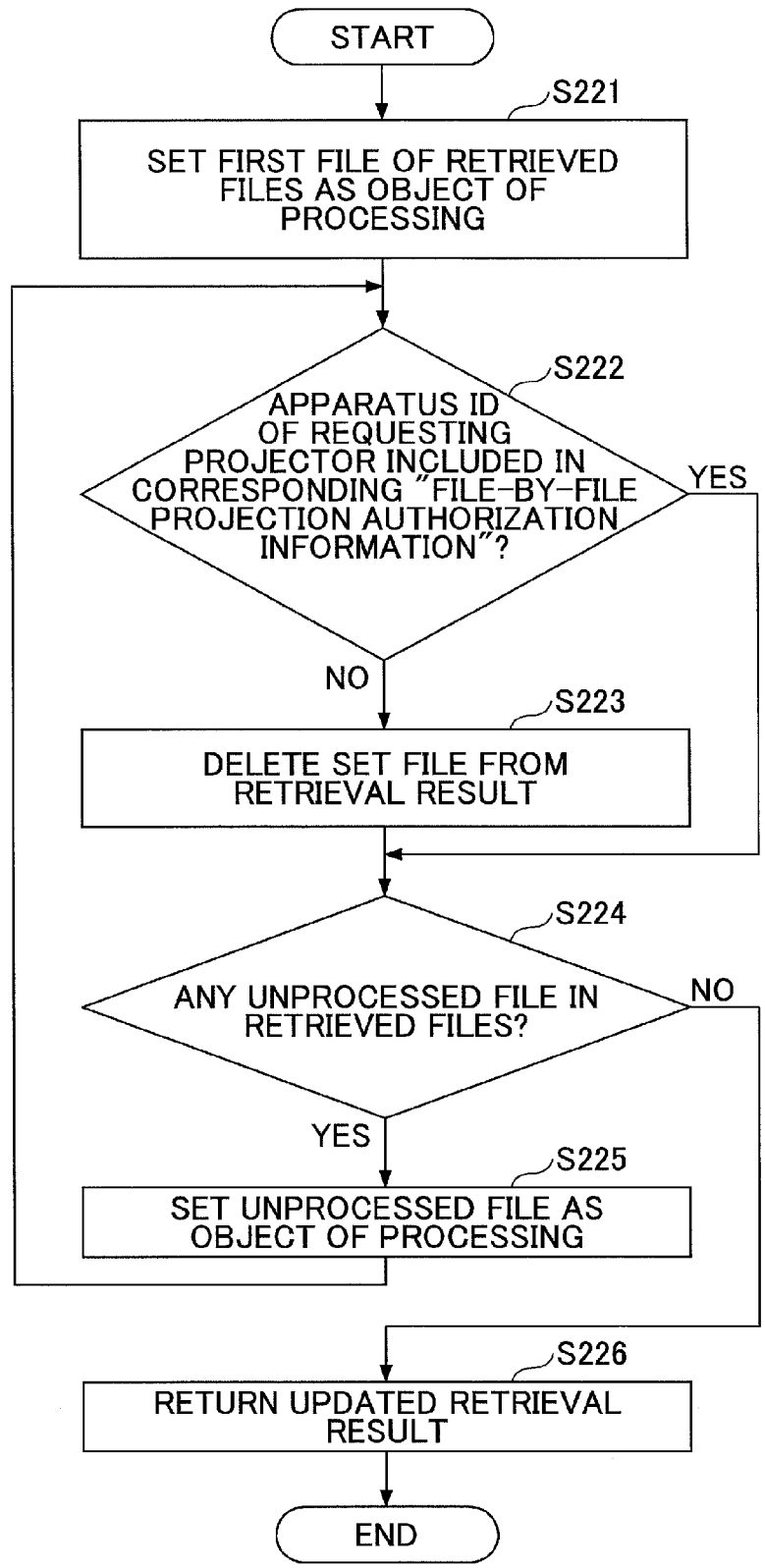
FIG. 47 is a flowchart illustrating a process for filtering file information according to the second embodiment.

FIG. 47 is a flowchart illustrating a process for filtering file information. Referring to FIG. 47, at step S221, the internal storage service controller 45 sets the first file in retrieved file information as an object of processing.

At step S222, the internal storage service controller 45 determines whether the apparatus ID of the projector 15 that has made a file GET request is included in Projection Authorized Projector ID of the file-by-file projection authorization information of the file set as an object of processing.

If the apparatus ID of the projector 15 that has made a file GET request is not included in Projection Authorized Projector ID of the file-by-file projection authorization information of the file set as an object of processing (NO at step S222), the internal storage service controller 45 proceeds to step S224 after execution of the process of step S223. At step S223, the internal storage service controller 45 deletes the file set as an object of processing from the retrieved file information.

If the apparatus ID of the projector 15 that has made a file GET request is included in Projection Authorized Projector ID of the file-by-file projection authorization information of the file set as an object of processing (YES at step S222), the internal storage service controller 45 proceeds to step S224 without execution of the process of step S223.

At step S224, the internal storage service controller 45 determines whether there is any unprocessed file in the retrieved file information. If there is an unprocessed file (YES at step S224), at step S225, the internal storage service controller 45 sets the unprocessed file as an object of processing. Then, the internal storage service controller 45 returns to step S222 and continues the process.

If the internal storage service controller 45 determines that there is no unprocessed file left in the retrieved information (NO at step S224), at step S226, the internal storage service controller 45 returns an undeleted (remaining) portion of the retrieved file information (the filtered file information).

According to the projection system 1 of the second embodiment, the projector 15 that is authorized to perform projection may be set (determined) user by user and file by file. Furthermore, according to the projection system 1 of the second embodiment, the file information of a file that the projector 15 that has made a file GET request is not authorized to project may be deleted when executing a file transmission process.

[Third Embodiment]

A description is given of a third embodiment. The third embodiment has the same system configuration and hardware configuration as those of the first embodiment. Accordingly, a description of the same parts as those of the first embodiment is omitted.

The third embodiment may have the same software configuration as the first embodiment except that the user management part 37 manages apparatus authentication setting information based on an access number in addition to user information and the authentication information of the external service. According to the third embodiment, the user information may be the same as the user information of FIG. 5 except for deleting (excluding) the items of Apparatus Authentication Setting and Projection Authorized Projector ID.

FIG. 48 is a diagram illustrating a configuration of apparatus authentication setting information based on an access number (access number-based apparatus authentication setting information). The access number-based apparatus authentication setting information of FIG. 48 includes the items of Access Number, Apparatus Authentication Setting, and Projection Authorized Projector ID. The item of Apparatus Authentication Setting may be omitted. In the case of FIG. 48, the ID (apparatus ID) of a projector authorized to perform projection is tied to an access number, that is, recorded (registered) in correlation with an access number.

For example, in the case of FIG. 48, a content of an access number "12345" is authorized to be projected by the projector 15 of an apparatus ID "ABC0123456." The item of Apparatus Authentication Setting provides a setting as to whether the apparatus authentication setting for authorizing a specific projector 15 to perform projection is enabled or disabled. The item of Projection Authorized Projector ID sets, in the form of a list, the apparatus ID of one or more projectors 15 authorized to perform projection when the apparatus authentication setting is enabled.

FIG. 49 is a diagram illustrating a configuration of file information. The file information of FIG. 49 includes the items of Filename, Access Number, Registration Date & Time, Projection Restriction, Start of Validity Period, End of Validity Period, Multipage Identification, and File Path. The item of Projection Restriction indicates whether the projection is authorized for only one time, for a limited period, or the like. The items of Start of Validity Period and End of Validity Period set, for example, a validity period of one week from a registration date and time in the case of one-time only projection, and set a validity period (date and time) specified at the time of uploading in the case of limited period projection. The item of multipage identification indicates whether a file is a multipage file. The item of File Path indicates the path of a file. In the case of a multipage file, the file path is a directory path.

FIG. 50 is a diagram illustrating a configuration of a projection registration ticket. The projection registration ticket is used at the time of registering the projector 15 in the item of Projection Authorized Projector ID of the access number-based apparatus authentication setting information.

The projector registration ticket includes the items of Projector ID, Registration One-Time Password, and One-Time Password Expiration Date & Time. The item of Projector ID sets the apparatus ID of the projector 15 to be registered. The item of Registration One-Time Password sets a password for registration of the projector 15. The access number-based apparatus authentication setting information of FIG. 48 is correlated with one or more projector registration tickets.

Figure 51:
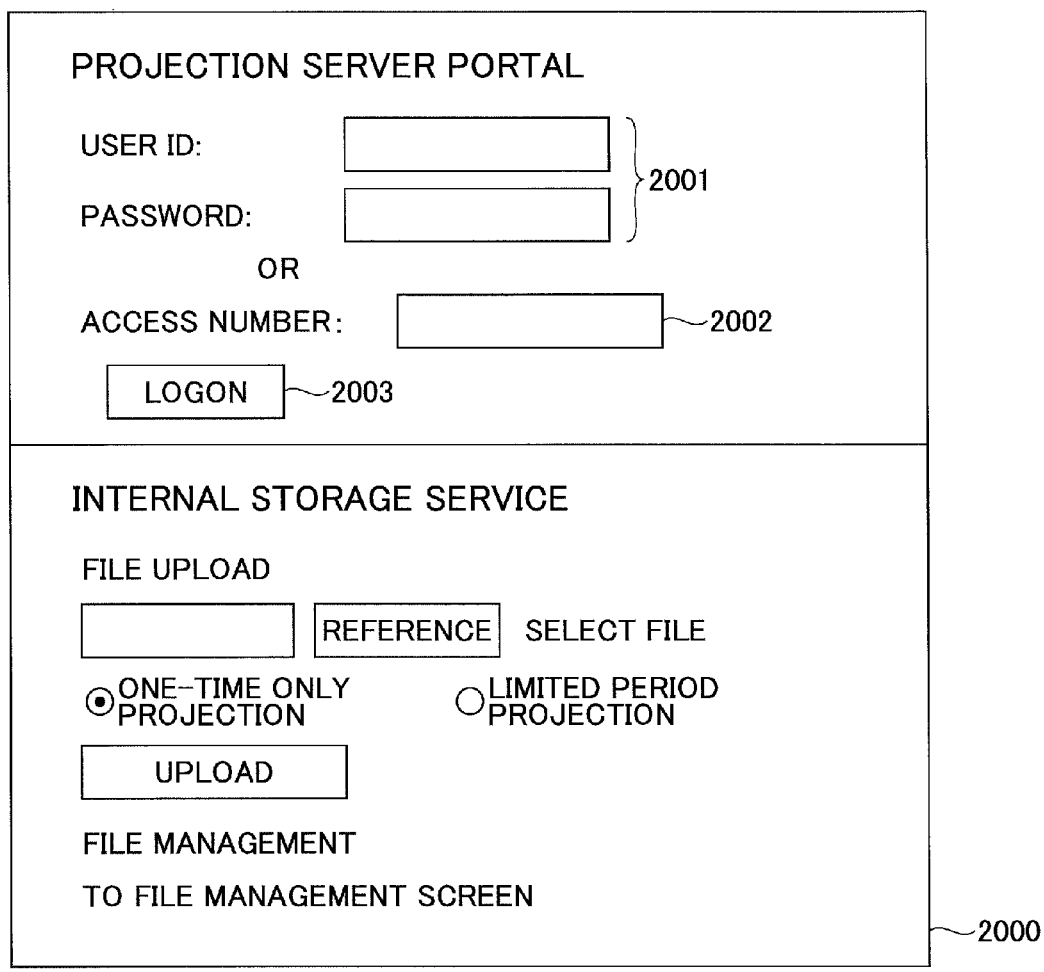
FIG. 51 is a diagram illustrating an image of a portal screen according to the third embodiment.

A description is given of a process flow. FIG. 51 is a diagram illustrating an image of a portal screen. FIG. 51 illustrates a portal screen 2000 before logon. An operator may log on by entering a user ID and a password in fields 2001 and depressing a logon button 2003 if the operator has his/her user information registered. This embodiment is directed to a case without log on. Accordingly, a description of registration of user information or a logon process based on a user ID and a password is omitted.

Figure 52:
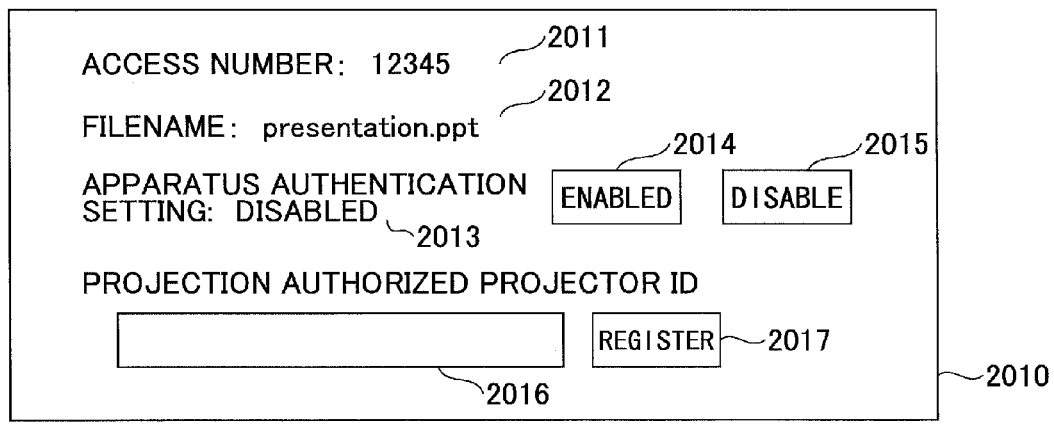
FIG. 52 is a diagram illustrating an image of an access number-based apparatus authentication setting screen according to the third embodiment.

In the case without logon, to which this embodiment is directed, the operator may cause a screen transition to an access number-based apparatus authentication setting screen as illustrated in FIG. 52 by entering an issued access number in a field 2002 and depressing the logon button 2003.

FIG. 52 is a diagram illustrating an image of an access number-based apparatus authentication setting screen. An access number-based apparatus authentication setting screen 2010 is generated by the apparatus authentication controller 47 of the projection server (FIG. 4). The access number-based apparatus authentication setting screen 2010 may be displayed by the projector 15 that has accessed the projection server 10 or by a terminal operated by an operator, such as the PC 13 (FIG. 1).

The access number-based apparatus authentication setting screen 2010 includes an issued access number 2011 entered in the field 2002 of the portal screen 2000 and a filename 2012 of an uploaded file tied to (correlated with) the access number 2011. Furthermore, the access number-based apparatus authentication setting screen 2010 displays a value 2013 (for example, "enabled" or "disabled") of Apparatus Authentication Setting of the access-number based apparatus authentication setting information (FIG. 48)

The value 2013 of Apparatus Authentication Setting of the access-number based apparatus authentication setting information may be changed to "enabled" by depressing an ENABLE button 2014 included in the access number-based apparatus authentication setting screen 2010. On the other hand, the value 2013 of Apparatus Authentication Setting of the access-number based apparatus authentication setting information may be changed to "Disabled" by depressing a DISABLE button 2015 included in the access number-based apparatus authentication setting screen 2010.

The access number-based apparatus authentication setting screen 2010 further includes a field 2016 in which the operator enters the ID of a projector to be authorized to perform projection. The ID (apparatus ID) of a projector entered in the field 2016 is registered as the ID of a projector authorized to perform projection in the access number-based apparatus authentication setting information by the operator depressing a REGISTER button 2017.

Figure 53:
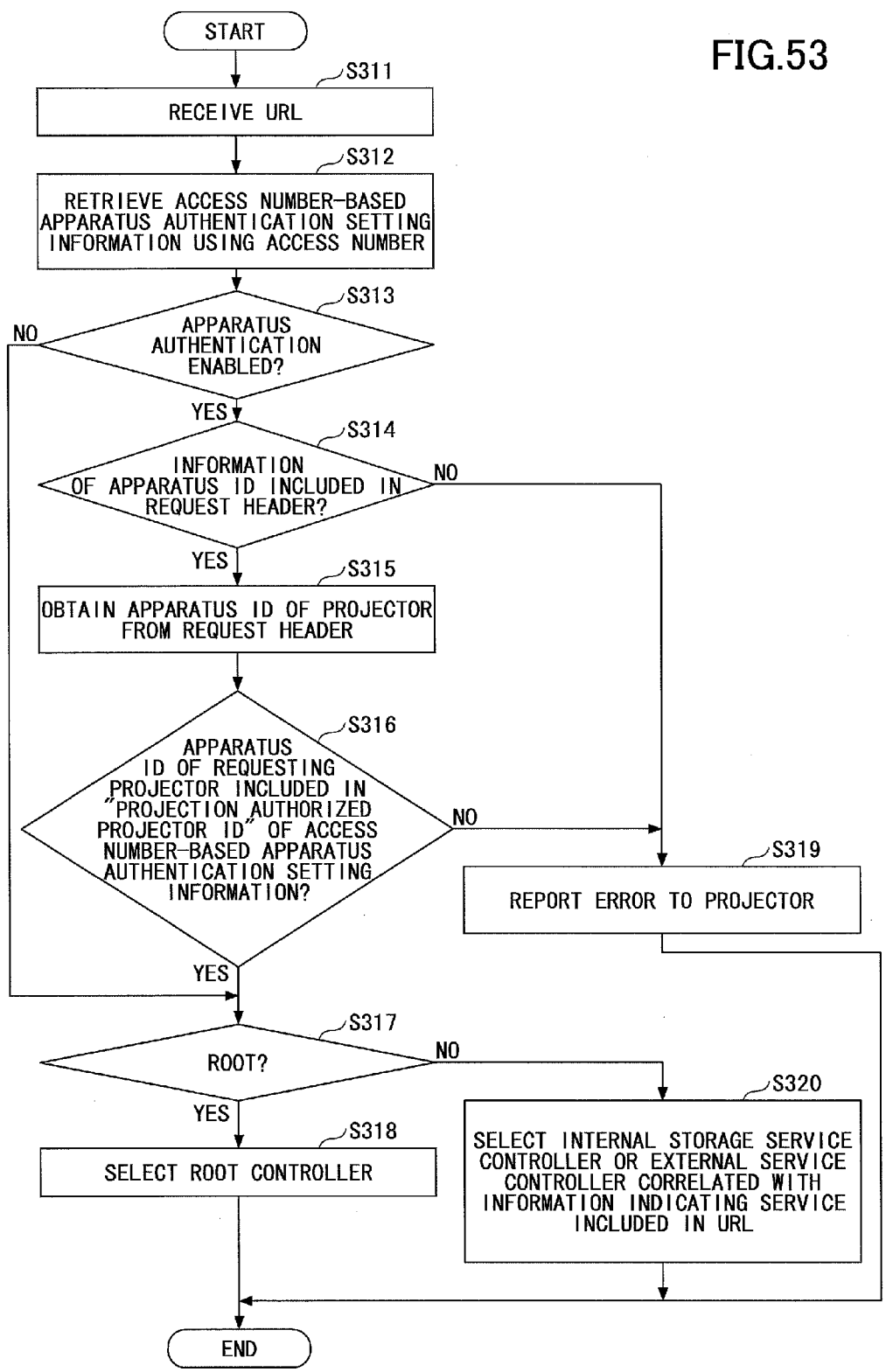
FIG. 53 is a flowchart illustrating a procedure for processes of a dispatcher part and a controller part according to the third embodiment.

FIG. 53 is a flowchart illustrating a procedure for processes of a dispatcher part and a controller part. Referring to FIG. 53 as well as FIG. 4, at step S311, the dispatcher part 32 receives a URL from the HTTP server part 31.

At step S312, the dispatcher part 32 retrieves access-number based apparatus authentication setting information from the user management part 37 based on the access number {n} included in the received URL. At step S313, the dispatcher part 32 determines whether the apparatus authentication setting included in the access-number based apparatus authentication setting information is "enabled."

If the apparatus authentication setting is "enabled" (YES at step S313), at step S314, the dispatcher part 32 determines whether the apparatus ID of the projector 15 is included in a request header. If the dispatcher part 32 determines that the apparatus ID of the projector 15 is included in a request header (YES at step S314), at step S315, the dispatcher part 32 obtains the apparatus ID of the projector 15 from the request header.

If the dispatcher part 32 determines that the apparatus ID of the projector 15 is not included in a request header (NO at step S314), at step S319, the dispatcher part 32 reports an error to the projector 15. At step S316, the dispatcher part 32 determines whether the apparatus ID of the (requesting) projector 15 obtained at step S315 is not included in Projection Authorized Projector ID of the access-number based apparatus authentication setting information.

If the dispatcher part 32 determines that the apparatus ID is included (YES at step S316), at step S317, the dispatcher part 32 determines whether the received URL is a root. If the received URL is a root (YES at step S317), at step S318, the dispatcher part 32 selects the root controller 44 and delivers the URL to the root controller 44. If the received URL is not a root (NO at step S317), the dispatcher part 32 executes the process of step S320.

At step S320, based on information indicating a service ("local," "ext1," etc.) included in the received URL, the dispatcher part 32 selects the internal storage service controller 45 or the external service controller 46 correlated with the information indicating a service, and delivers the URL to the selected internal storage service controller 45 or external service controller 46.

If the apparatus authentication setting is "disabled" at step S313 (NO at step S313), the dispatcher part 32 skips the processes of steps S314 through S316 to proceed to step S317. If the dispatcher part 32 determines at step S316 that the obtained apparatus ID of the projector 15 is not included in Projection Authorized Projector ID of the access-number based apparatus authentication setting information (NO at step S316), at step S319, the dispatcher part 32 reports an error to the projector 15.

FIG. 54 is a diagram illustrating another configuration of access-number based apparatus authentication setting information. The access-number based apparatus authentication setting information of FIG. 54 includes the items of Access Number and Apparatus Authentication Setting. The item of Apparatus Authentication Setting may be omitted. The access-number based apparatus authentication setting information of FIG. 54 sets (determines) initial values so that the value of Apparatus Authentication Setting is set to "enabled" and there is no ID of a projector authorized to perform projection.

In the case of FIG. 48, after uploading a file and providing an apparatus authentication setting based on an access number, the projection of the file using a random projector 15 is prevented. According to the access-number based apparatus authentication setting information of FIG. 54, even between the uploading of a file and the provision of an apparatus authentication setting, the projection of the file using a random projector 15 is prevented.

FIG. 55 is a diagram illustrating an image of another portal screen. A portal screen 2020 of FIG. 55 is a combination of the portal screen 2000 of FIG. 51 and a field 2021 for enabling or disabling the apparatus authentication setting. For example, the operator may request the uploading of a file by determining an apparatus authentication setting and depressing an UPLOAD button after selecting the file and a projection restriction.

In the case of uploading a file with the apparatus authentication setting being disabled, the apparatus authentication setting is disabled when the access number-based apparatus authentication setting information of FIG. 48 is registered (recorded). In the case of uploading a file with the apparatus authentication setting being enabled, the apparatus authentication setting is enabled when the access number-based apparatus authentication setting information of FIG. 48 is registered (recorded).

FIG. 56 is a diagram illustrating an image of another access number-based apparatus authentication setting screen. An access number-based apparatus authentication setting screen 2030 of FIG. 56 is a combination of the access number-based apparatus authentication setting screen 2010 of FIG. 52 and a function of importing another access number-based apparatus authentication setting.

The access number-based apparatus authentication setting screen 2030 of FIG. 56 provides a function of importing another access number-based apparatus authentication setting when it is desired, for example, to save the trouble of registering the same apparatus authentication setting. For example, the operator may import the access number-based apparatus authentication setting of another access number by entering the other access number whose apparatus authentication setting is to be imported in a field 2031 and depressing an IMPORT button 2032 on the access number-based apparatus authentication setting screen 2030.

Figure 57:
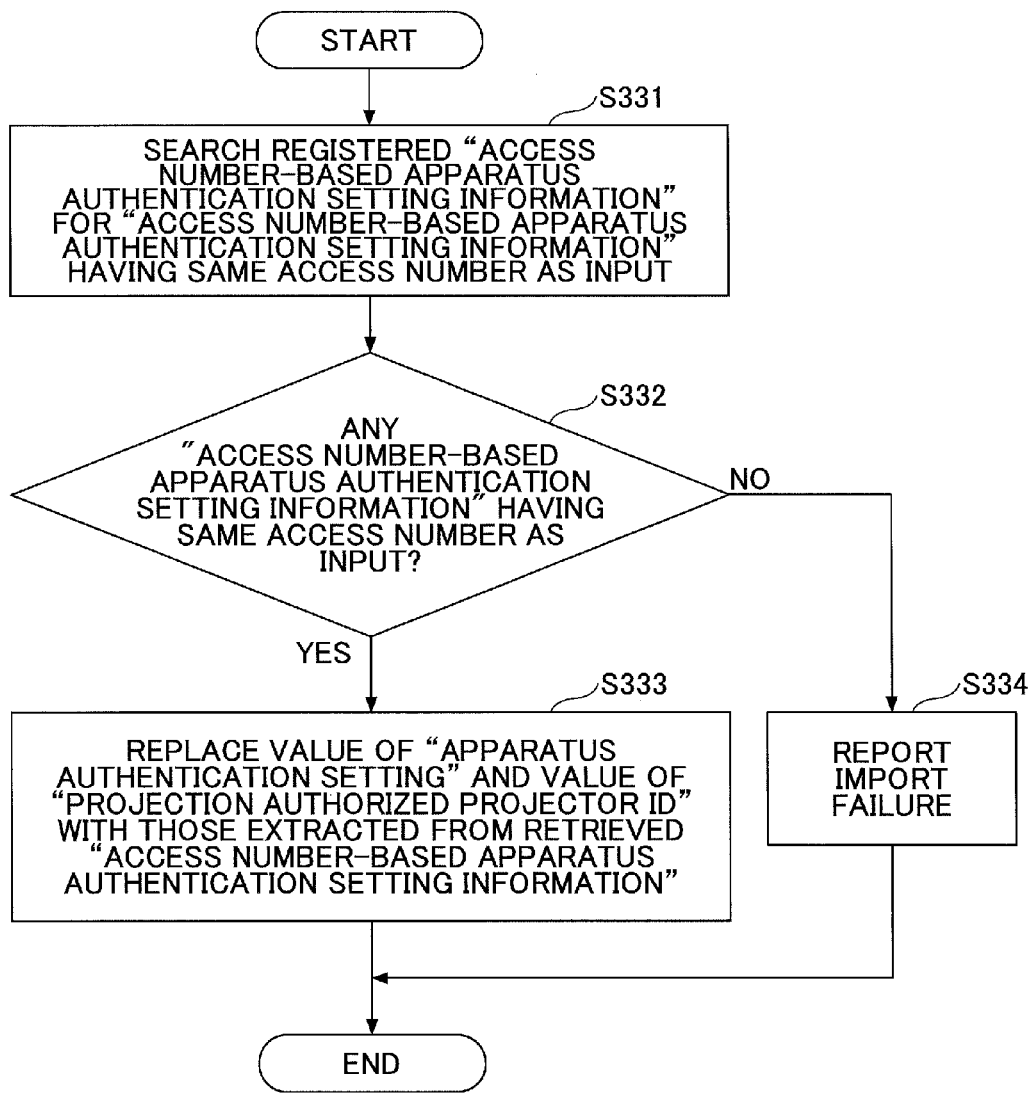
FIG. 57 is a flowchart illustrating a procedure for a process of importing another access number-based apparatus authentication setting according to the third embodiment.

FIG. 57 is a flowchart illustrating a procedure for a process of importing another access number-based apparatus authentication setting. When an operator depresses the IMPORT button 2032 of the access number-based apparatus authentication setting screen 2030, another access number entered in the field 2031 is transmitted from the dispatcher part 32 to the apparatus authentication controller 47 (FIG. 4).

At step S331, the setting part 51 of the apparatus authentication controller 47 searches the access number-based apparatus authentication setting information registered with the user management part 37 using the other access number (hereinafter referred to as "input") entered in the field 2031 as a key. That is, the setting part 51 searches the access number-based apparatus authentication setting information registered with the user management part 37 for a record having the same access number as the input.

At step S332, the setting part 51 determines whether there is a record having the same access number as the input in the user management part 37. If there is such a record (YES at step S332), at step S333, the setting part 51 extracts the value of Apparatus Authentication Setting and the value of Projection Authorized Projector ID from the record having the same access number as the input, searched for at step S331. The setting part 51 may register the apparatus authentication setting of the access number (the issued access number displayed at the top of the access number-based apparatus authentication setting screen 2030 of FIG. 13) using the extracted values of Apparatus Authentication Setting and Projection Authorized Projector ID.

If there is no record having the same access number as the input in the user management part 37 (NO at step S332), at step S334, the setting part 334 reports the failure of importing another access number-based apparatus authentication setting by causing the PC 13 or the projector 15 operated by the operator to display a message to that effect.

FIGS. 58A, 58B, and 58C are image diagrams for illustrating a process of importing another access number-based apparatus authentication setting. FIGS. 58A through 58C are examples of access number-based apparatus authentication setting information. For example, the access number-based apparatus authentication setting information of FIG. 58A is updated to the access number-based apparatus authentication setting information of FIG. 58C as a result of importing the access number-based apparatus authentication setting information of FIG. 58B.

FIG. 59 is a diagram illustrating another configuration of access number-based apparatus authentication setting information. The access number-based apparatus authentication setting information of FIG. 59 includes the items of Access Number, Apparatus Authentication Setting, Apparatus Authentication Lock, and Projection Authorized Projector ID. The access number-based apparatus authentication setting information of FIG. 59 includes the item of Apparatus Authentication Lock in addition to the items of the access number-based apparatus authentication setting information of FIG. 48.

The access number-based apparatus authentication setting information of FIG. 59 supports the case where it is desired to fix (lock) the once determined access number-based apparatus authentication setting (for example, where it is desired to prevent indiscriminate addition of the IDs of projectors authorized to perform projection). For example, the access number-based apparatus authentication setting information of FIG. 59 may be modified (updated) when the value of Apparatus Authentication Lock is "disabled" and is prevented from being modified (updated) when the value of Apparatus Authentication Lock is "enabled."

Figure 60:
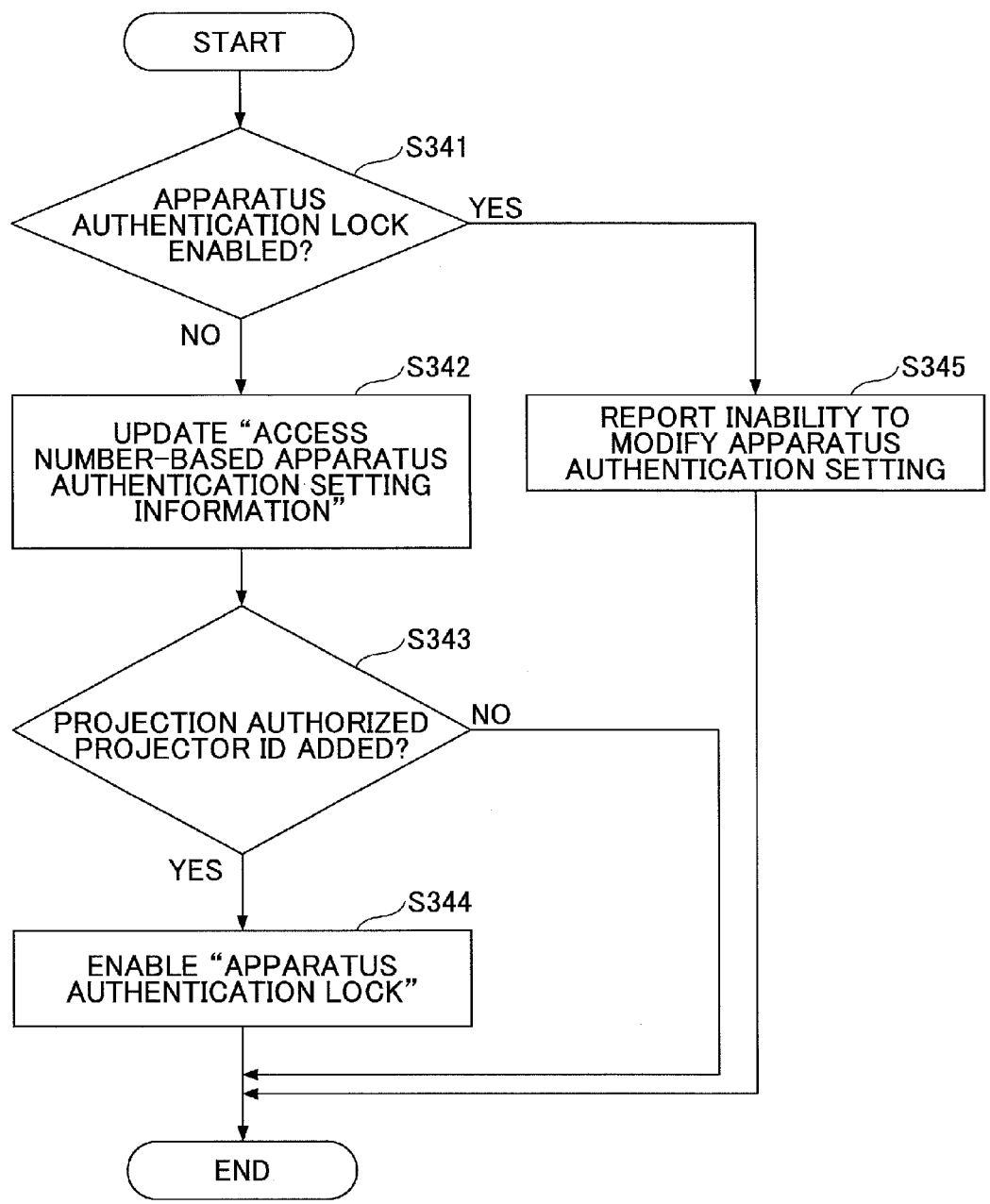
FIG. 60 is a flowchart illustrating a procedure for a process of fixing an access number-based apparatus authentication setting according to the third embodiment.

FIG. 60 is a flowchart illustrating a procedure for a process of fixing an access number-based apparatus authentication setting. For example, in response to an operator's request for registration of the ID of a projector authorized to perform projection, at step S341, the setting part 51 of the apparatus authentication controller 47 searches the access number-based apparatus authentication setting information registered with the user management part 37 using an access number as a key. The setting part 51 determines whether the value of Apparatus Authentication Lock of retrieved access number-based apparatus authentication setting information is "enabled."

If the value of Apparatus Authentication Lock is not "enabled" (NO at step S341), at step S342, the setting part 51 updates the access number-based apparatus authentication setting information in accordance with the operator's request. Then, at step S343, the setting part 51 determines whether a "projection authorized projector ID" has been added.

If a "projection authorized projector ID" has been added (YES at step S343), at step S344, the setting part 51 sets the value of Apparatus Authentication Lock of the access number-based apparatus authentication setting information to "enabled." If it is determined at step S341 that the value of Apparatus Authentication Lock is "enabled" (YES at step S341), at step S345, the setting part 51 reports the inability to modify (update) the access number-based apparatus authentication setting by causing the PC 13 or the projector 15 operated by the operator to display a message to that effect.

According to the process of the flowchart of FIG. 60, the value of Apparatus Authentication Lock is automatically set to "enabled" in response to addition to Projection Authorized Projector ID of the access number-based apparatus authentication setting information.

FIG. 61 is a diagram illustrating an image of another access number-based apparatus authentication setting screen. An access number-based apparatus authentication setting screen 2040 of FIG. 61 is a combination of the access number-based apparatus authentication setting screen 2030 of FIG. 56 and a function of locking an apparatus authentication setting (a function of enabling or disabling the value of Apparatus Authentication Lock).

For example, an operator may set the value of Apparatus Authentication Lock of access number-based apparatus authentication setting information to "enabled" by depressing an ENABLE button 2041 of the access number-based apparatus authentication setting screen 2040. On the other hand, the operator may set the value of Apparatus Authentication Lock of access number-based apparatus authentication setting information to "disabled" by depressing a DISABLE button 2042 of the access number-based apparatus authentication setting screen 2040.

It is also possible to prevent the apparatus authentication lock from being disabled once the apparatus authentication lock is enabled. In this case, the DISABLE button 2042 is omitted from the access number-based apparatus authentication setting screen 2040.

Figure 62:
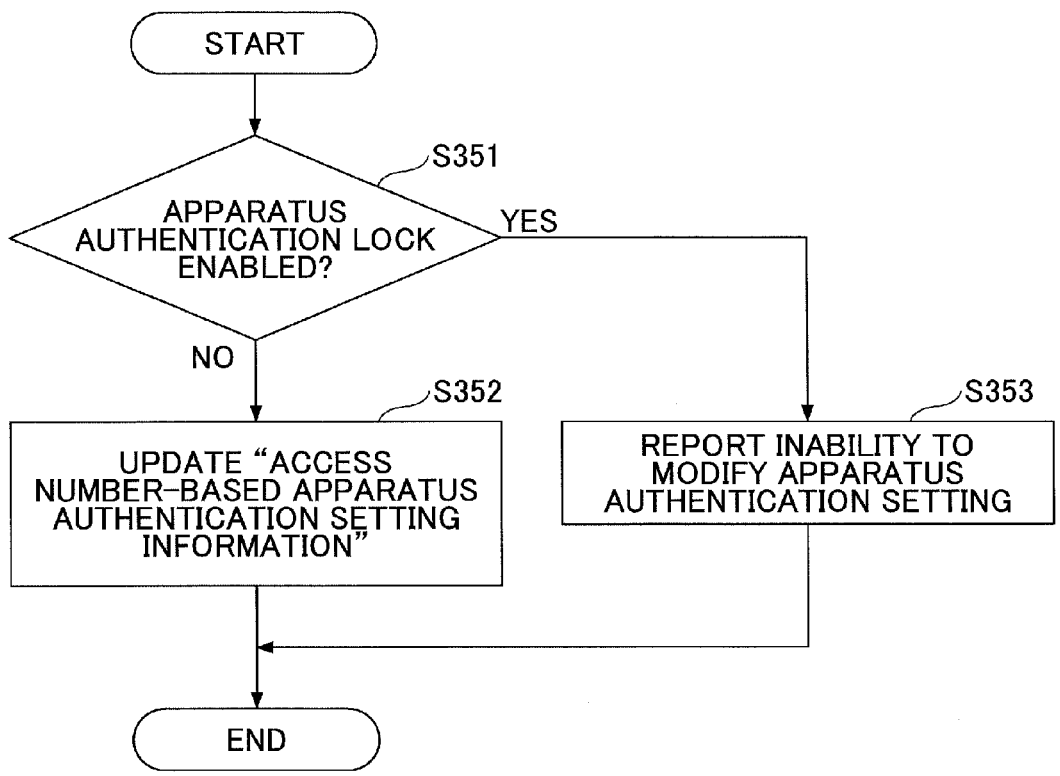
FIG. 62 is a flowchart illustrating another procedure for a process of fixing an access number-based apparatus authentication setting according to the third embodiment.

FIG. 62 is a flowchart illustrating another procedure for a process of fixing an access number-based apparatus authentication setting. For example, in response to an operator's request for registration of the ID of a projector authorized to perform projection, at step S351, the setting part 51 of the apparatus authentication controller 47 searches the access number-based apparatus authentication setting information registered with the user management part 37 using an access number as a key. The setting part 51 determines whether the value of Apparatus Authentication Lock of retrieved access number-based apparatus authentication setting information is "enabled."

If the value of Apparatus Authentication Lock is not "enabled" (NO at step S351), at step S352, the setting part 51 updates the access number-based apparatus authentication setting information in accordance with the operator's request. If it is determined at step S351 that the value of Apparatus Authentication Lock is "enabled" (YES at step S351), at step S353, the setting part 51 reports the inability to modify (update) the access number-based apparatus authentication setting by causing the PC 13 or the projector 15 operated by the operator to display a message to that effect.

According to the process of the flowchart of FIG. 62, the value of Apparatus Authentication Lock is not automatically set to "enabled" in response to addition to Projection Authorized Projector ID of the access number-based apparatus authentication setting information. Accordingly, if the operator intends to lock (fix) the access number-based apparatus authentication setting, the operator enables the apparatus authentication lock from the access number-based apparatus authentication setting screen 2040 of FIG. 61.

FIG. 63 is a diagram illustrating an image of another portal screen. A portal screen 2050 of FIG. 63 is a combination of the portal screen 2000 of FIG. 51 and a field 2051 for setting an access number at the time of uploading a file. An operator may specify an access number and request uploading of a file by entering the access number in the filed 2051 and depressing an UPLOAD button after selecting the file and a projection restriction.

If the specified access number has been issued, the setting part 51 of the apparatus authentication controller 47 may register the "access number-based apparatus authentication setting information" of the file whose uploading has been requested, using the "access number-based apparatus authentication setting information" tied to (correlated with) the specified access number.

Figure 64:
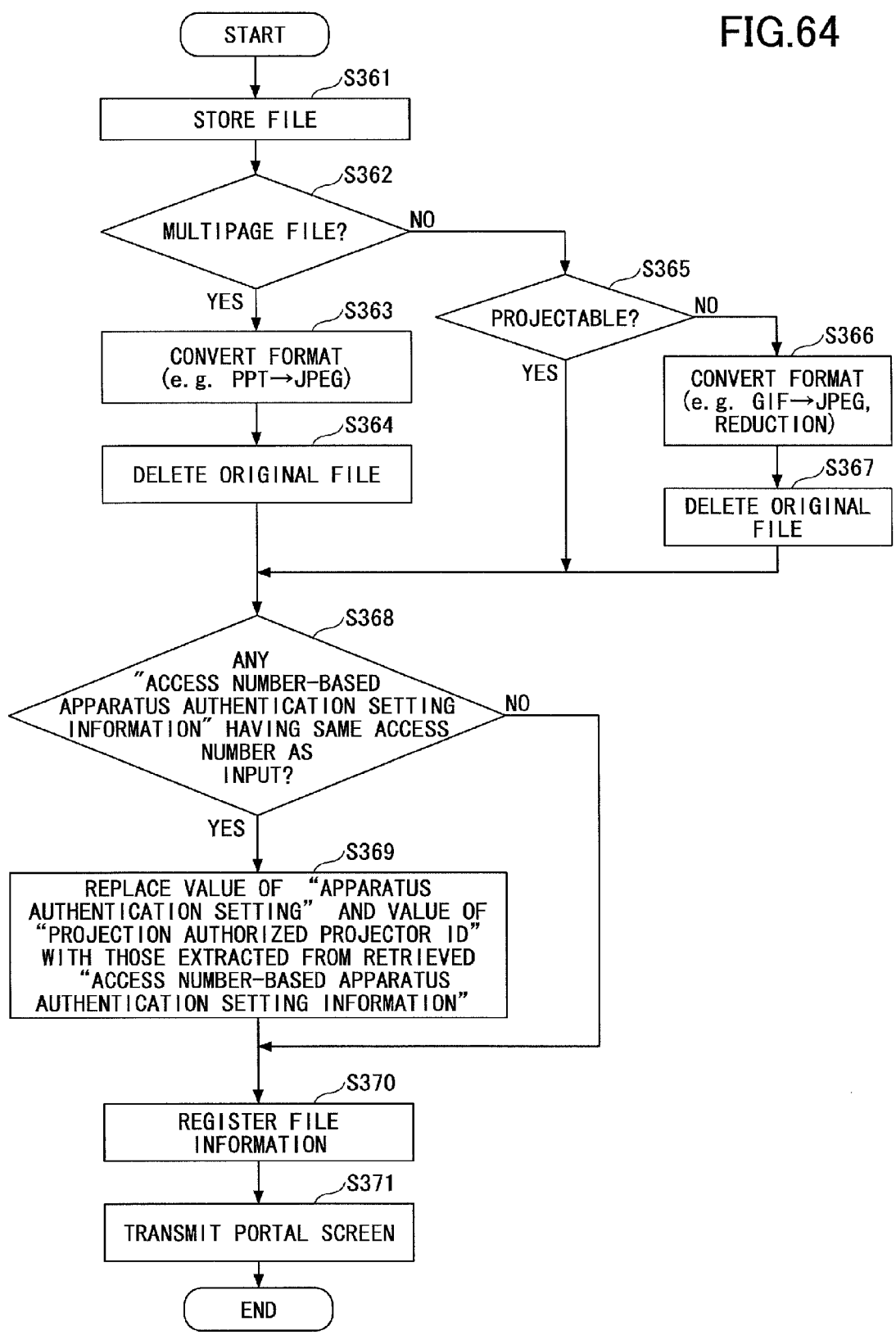
FIG. 64 is a flowchart illustrating a file uploading process according to the third embodiment.

FIG. 64 is a flowchart illustrating a process for uploading a file (a file uploading process). The internal storage service controller 45 (FIG. 4) includes a function of uploading a file and may store, for example, a file uploaded from the browser of the PC 13 in an internal storage.

For example, the browser of the PC 13 may request uploading of a file by making a file POST request to a URL for uploading (for example, http://projectionportal. example.com/upload). For example, an operator requests uploading of a file from the portal screen 2050 of FIG. 63.

Referring to FIG. 64, in response to reception of a URL for uploading from the dispatcher part 32, at step S361, the internal storage service controller 45 stores an uploaded file in an internal storage.

At step S362, the internal storage service controller 45 determines whether the file stored in the internal storage is a multipage file. If the stored file is a multipage file (YES at step S362), at step S363, the internal storage service controller 45 converts the multipage file into a file of JPEG format or the like projectable by the projector 15. At step S364, the internal storage service controller 45 deletes the multipage file before conversion (original file), and proceeds to step S368.

On the other hand, if the stored file is not a multipage file (NO at step S362), at step S365, the internal storage service controller 45 determines whether the file stored in the internal storage is in such format as to allow its direct projection by the projector 15. If the file is so formatted to be directly projectable format (YES at step S365), the internal storage service controller 45 proceeds to step S368.

If the file is not so formatted as to be directly projectable by the projector 15 (NO at step S365), at step S366, the internal storage service controller 45 converts the file, not so formatted as to be directly projectable by the projector 15, into a file of JPEG format or the like projectable by the projector 15. Then, at step S367, the internal storage service controller 45 deletes the file before conversion (original file), and thereafter proceeds to step S368.

At step S368, the setting part 51 of the internal storage service controller 45 determines whether there is a record having the same access number as another access number entered in the field 2051 of FIG. 63 (hereinafter, referred to as "input") in the user management part 37. If there is such a record (YES at step S368), at step S369, the setting part 51 extracts the value of Apparatus Authentication Setting and the value of Projection Authorized Projector ID of the record having the same access number as the input. The setting part 51 registers (records) the access number-based apparatus authentication setting information of the file whose uploading has been requested, using the extracted values of Apparatus Authentication Setting and Projection Authorized Projector ID, and thereafter proceeds to step S370.

On the other hand, if there is no record having the same access number as the input in the user management part 37 (NO at step S368), the setting part 51 skips step S369 and proceeds to step S370. At step S370, the internal storage service controller 45 registers (records) the file information of the uploaded file as illustrated in FIG. 49. Then, at step S371, the internal storage service controller 45 causes a portal screen to be displayed on the browser of the PC 13 that has requested the uploading of the file.

Figure 65:
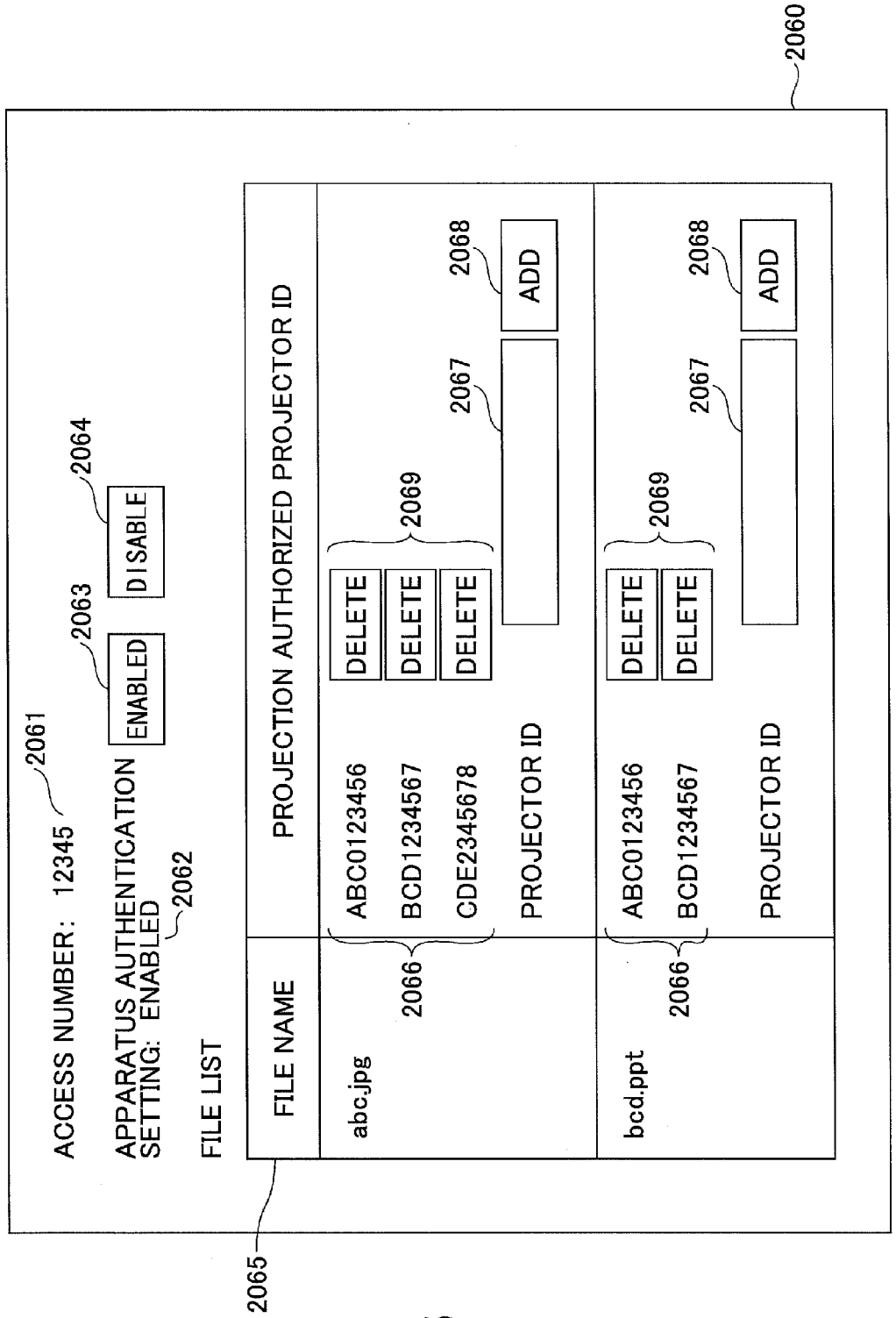
FIG. 65 is a diagram illustrating an image of another access number-based apparatus authentication setting screen according to the third embodiment.

FIG. 65 is a diagram illustrating an image of another access number-based apparatus authentication setting screen. Referring to FIG. 65, an access number-based apparatus authentication setting screen 2060 includes, for example, an issued access number 2061 entered in the field 2002 of the portal screen 2000 (FIG. 51), a value 2062 of Apparatus Authentication Setting of access number-based apparatus authentication setting information (for example, "enabled" or "disabled"), an ENABLE button 2063 that sets the value 2062 of Apparatus Authentication setting to "enabled," and a DISABLE button 2064 that sets the value 2062 of Apparatus Authentication setting to "disabled."

The access number-based apparatus authentication setting screen 2060 further includes a file list 2065 tied to the same access number, where the IDs of projectors authorized to perform projection are set for each filename (filename by filename). For each filename, the file list 2065 includes a field 2067, where an operator enters a projector ID. By the operator depressing an ADD button 2068, the projector 15 of the apparatus ID entered in the field 2067 is recorded in the file list 2065 as a projector authorized to perform projection, and is added to Projection Authorized Projector ID of the access number-based apparatus authentication setting information.

For each filename, a DELETE button 2069 is provided for each of projection authorized projector IDs 2066. By the operator depressing the DELETE button 2069, the apparatus ID of the projector 15 corresponding to the DELETE button 2069 is deleted from the projection authorized projector IDs 2066 included in the file list 2065, and is deleted from Projection Authorized Projector ID of the access number-based apparatus authentication setting information.

Furthermore, when the operator depresses the ENABLE button 2063, the access number-based apparatus authentication setting of each of the files (for example, abc.jpg and bcd.jpg) included in the file list 2065 is enabled.

In the case of the access number-based apparatus authentication setting screen 2060 as illustrated in FIG. 65, the access number-based apparatus authentication setting information is, for example, as illustrated in FIGS. 66A and 66B. FIGS. 66A and 66B are diagrams illustrating other configurations of access number-based apparatus authentication setting information. The access number-based apparatus authentication setting information of FIGS. 66A and 66B includes the items of Access Number, Filename, File Path, Apparatus Authentication Setting, and Projection Authorized Projector ID. The access number-based apparatus authentication setting information of FIGS. 66A and 66B records a file "abc.jpg" and a file "bcd.jpg" in correlation with an access number "12345" and records the IDs (apparatus IDs) of projectors authorized to perform projection file by file.

Figure 67:
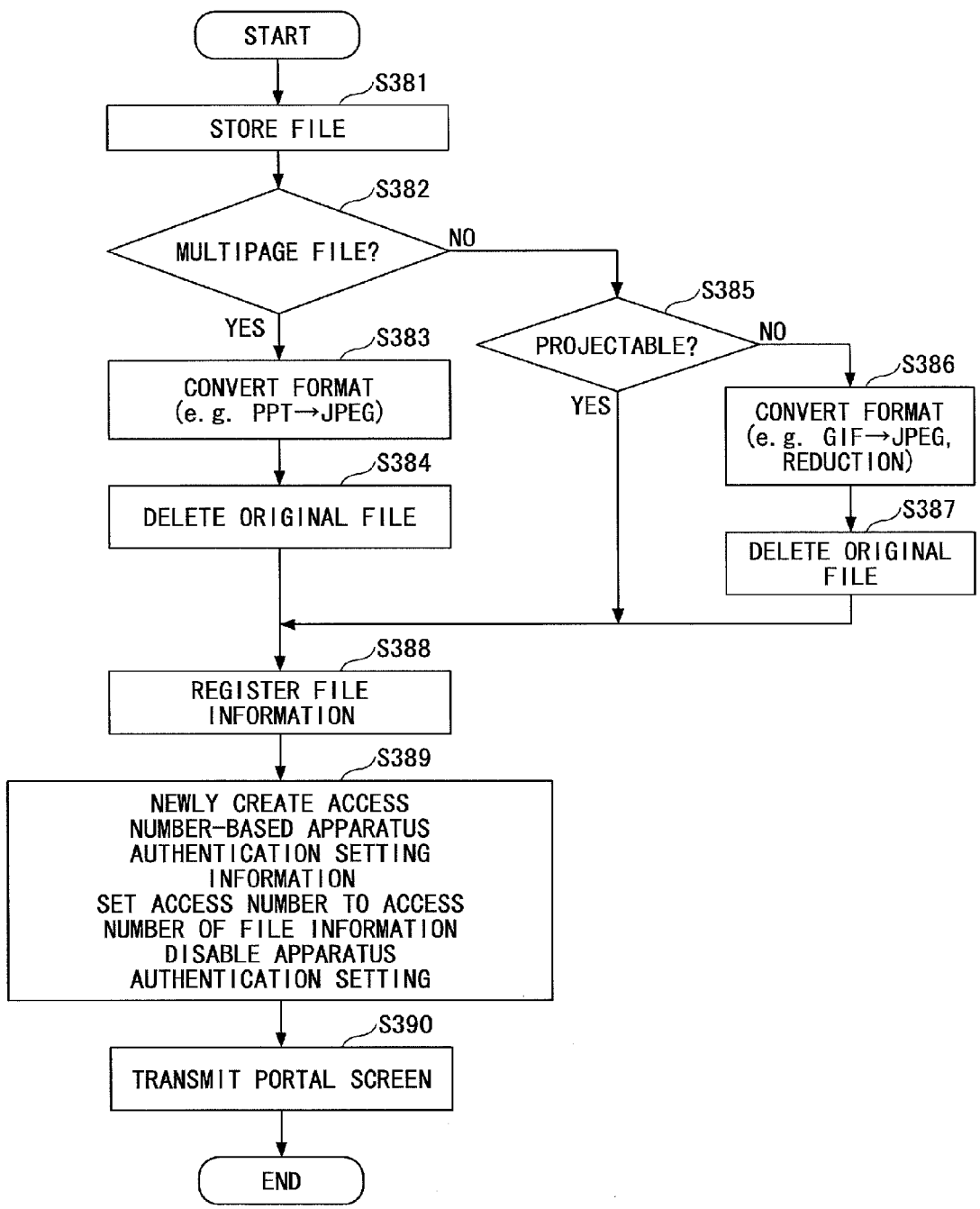
FIG. 67 is a flowchart illustrating another file uploading process according to the third embodiment.
Figure 68:
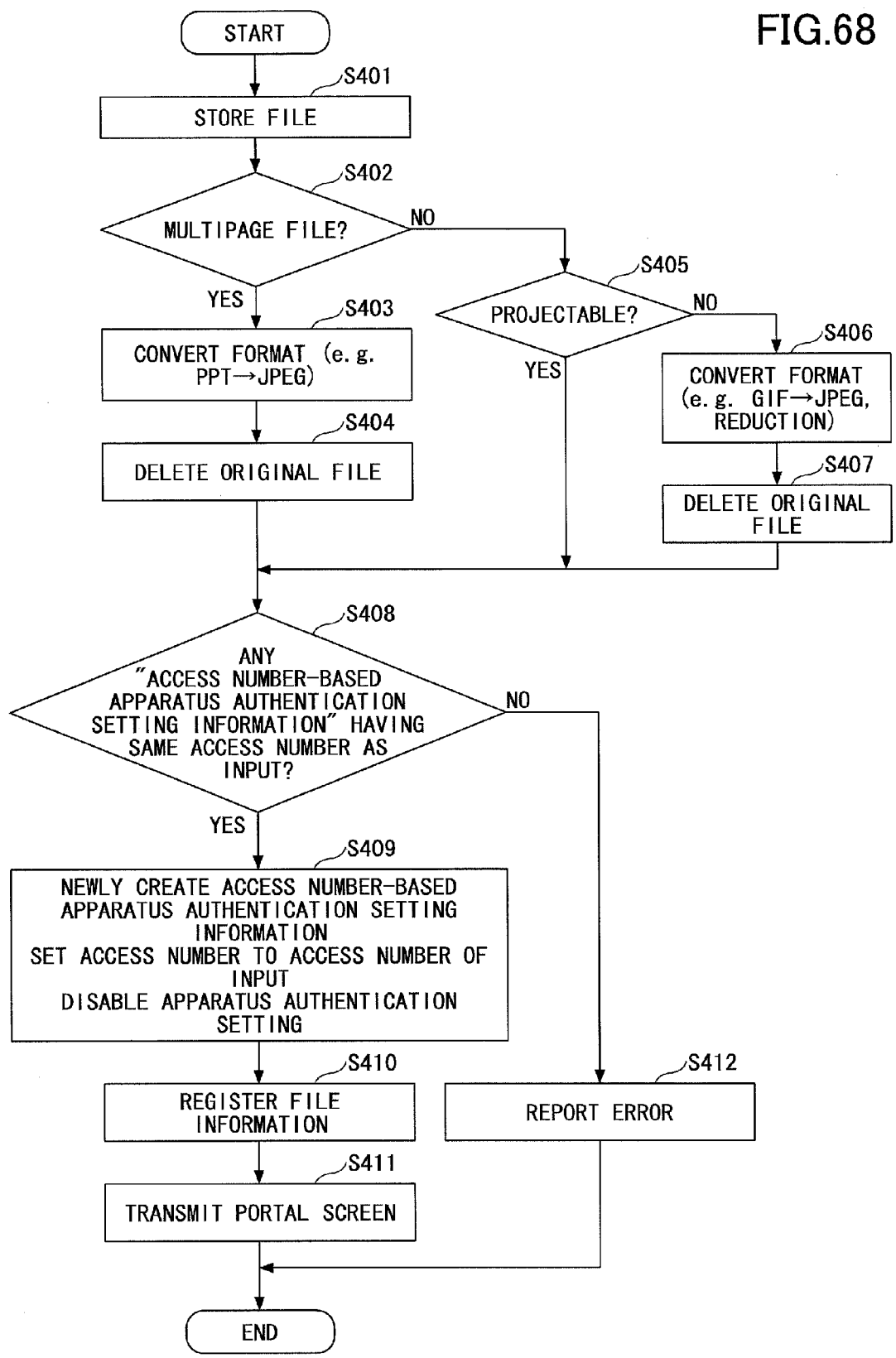
FIG. 68 is a flowchart illustrating another file uploading process according to the third embodiment.

The file uploading process illustrated in FIG. 64 may also be executed as illustrated in, for example, FIG. 67 or FIG. 68.

FIG. 67 is a flowchart illustrating another file uploading process. FIG. 67 illustrates a case where there is no setting of an access number at the time of uploading a file. In FIG. 67, the process of steps S381 through S387 is the same as the process of steps S361 through S367 of FIG. 64, and its description is therefore omitted.

Referring to FIG. 67, at step S388, the internal storage service controller 45 registers (records) the file information of an uploaded file as illustrated in FIG. 49. At step S389, the setting part 351 newly creates and registers (records) the access number-based apparatus authentication setting information of the file whose uploading has been requested. The access number is set to the value of the item of Access Number of the file information. The apparatus authentication setting is disabled. Then, at step S390, the internal storage service controller 45 causes a portal screen to be displayed on the browser of the PC 13 that has requested the uploading of the file.

FIG. 68 is a flowchart illustrating another file uploading process. FIG. 68 illustrates a case where there is the setting of an access number at the time of uploading a file. In FIG. 68, the process of steps S401 through S408 is the same as the process of steps S361 through S368 of FIG. 64, and its description is therefore omitted.

Referring to FIG. 68, if it is determined at step S408 that there is such a record (YES at step S408), at step S409, the setting part 351 newly creates and registers (records) the access number-based apparatus authentication setting information of the file whose uploading has been requested. The access number is set to the access number of the input. The apparatus authentication setting is disabled.

At step S410, the internal storage service controller 45 registers (records) the file information of the uploaded file as illustrated in FIG. 49. Then, at step S411, the internal storage service controller 45 causes a portal screen to be displayed on the browser of the PC 13 that has requested the uploading of the file.

If it is determined at step S408 that there is no record having the same access number as the input in the user management part 37 (NO at step S408), at step S412, the setting part 51 reports an error by causing the PC 13 or the projector 15 operated by the operator to display a message to that effect.

Figure 69:
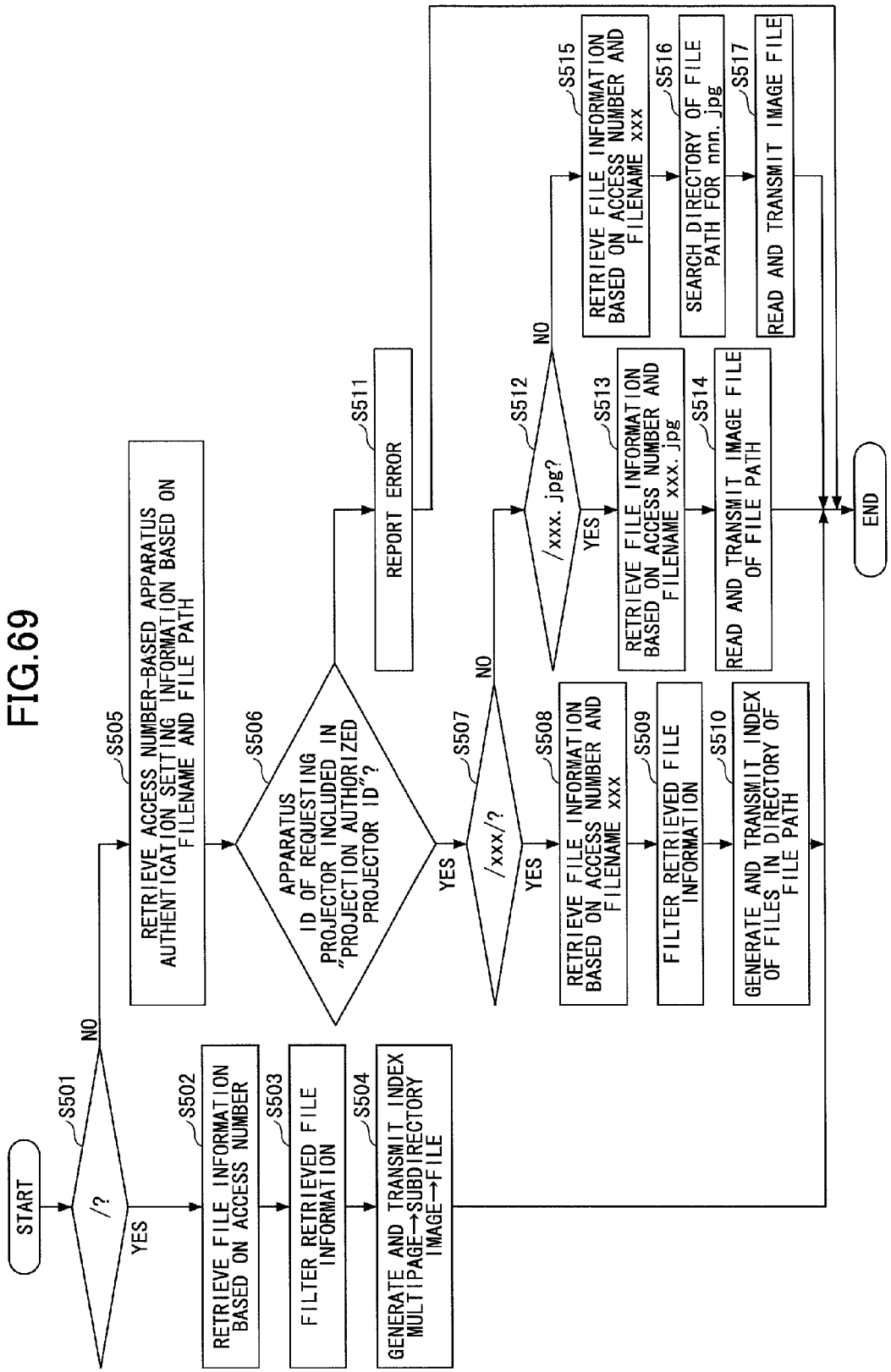
FIG. 69 is a flowchart illustrating a file transmission process according to the third embodiment.

FIG. 69 is a flowchart illustrating a file transmission process. For example, the projector 15 may request transmission of a file by making a file GET request to a URL (for example, http://projection.example.com/12345/local/presentation-.ppt/file001.jpeg).

In the above-described URL, a portion of "/presentation-.ppt/file001.jpeg" is referred to as a URL path in an internal storage. At step S501 of FIG. 69, the internal storage service controller 45 determines whether a URL path in an internal storage included in the received URL is "/".

If the URL path in an internal storage included in the received URL is "/" (YES at step S501), at step S502, the internal storage service controller 45 retrieves file information based on an access number. At step S503, the internal storage service controller 45 filters the retrieved file information as described below.

At step S504, the internal storage service controller 45 generates an index file of a list in which, of the files in the internal storage, multipage files are shown as subdirectories and non-multipage files are shown as files based on the file information filtered at step S503.

The internal storage service controller 45 provides the projector 15 with the generated index file. The index file does not include files deleted by the filtering of step S503.

On the other hand, if it is determined at step S501 that the URL path in an internal storage included in the received URL is not "/" (NO at step S501), the internal storage service controller 45 executes the process of step S505.

At step S505, the internal storage service controller 45 retrieves an access number from file information using a filename and a file path, and retrieves access number-based apparatus authentication setting information using the retrieved access number.

At step S506, the internal storage service controller 45 determines whether the apparatus ID of the projector 15 that has made the file GET request is included in Projection Authorized Projector ID of the retrieved access number-based apparatus authentication setting information.

If it is determined at step S506 that the apparatus ID of the projector 15 that has made the file GET request is included in Projection Authorized Projector ID (YES at step S506), at step S507, the internal storage service controller 45 determines whether the URL path in an internal storage included in the received URL matches a pattern including a subdirectory indicating a multipage file (/xxx/ in FIG. 69). If it is determined at step S507 that the URL path in an internal storage matches a pattern including a subdirectory (YES at step S507), at step S508, the internal storage service controller 45 retrieves file information based on the access number and the filename.

At step S509, like at step S503, the internal storage service controller 45 filters the retrieved file information. At step S510, the internal storage service controller 45 generates an index file listing files in a directory specified by a file path included in the retrieved file information, and transmits the generated index file to the projector 15.

If it is determined at step S507 that the URL path in an internal storage does not match a pattern including a subdirectory (NO at step S507), at step S512, the internal storage service controller 45 determines whether the URL path in an internal storage included in the received URL matches a pattern including an image file (/xxx.jpg in FIG. 69).

If it is determined at step S512 that the URL path in an internal storage matches the pattern (YES at step S512), at step S513, the internal storage service controller 45 retrieves file information based on the access number and the filename. At step S514, the internal storage service controller 45 reads an image file of a file path included in the retrieved file information, and transmits the read image file to the projector 15.

If it is determined at step S512 that the URL path in an internal storage does not match the pattern "/xxx.jpg", that is, if the URL path in an internal storage is information indicating an image file (page) in a multipage file (for example, /xxx/nnn.jpg) (NO at step S512), at step S515, the internal storage service controller 45 retrieves file information based on the access number and the filename "xxx".

At step S516, the internal storage service controller 45 searches a directory of a file path included in the retrieved file information for an image file "nnn.jpg". At step S17, the internal storage service controller 45 reads the requested image file from the internal storage, and provides the projector 15 with the read image file.

If it is determined at step S506 that the apparatus ID of the projector 15 that has made the file GET request is not included in Projection Authorized Projector ID, in step S511, the internal storage service controller 45 reports an error to the projector 15.

Figure 70:
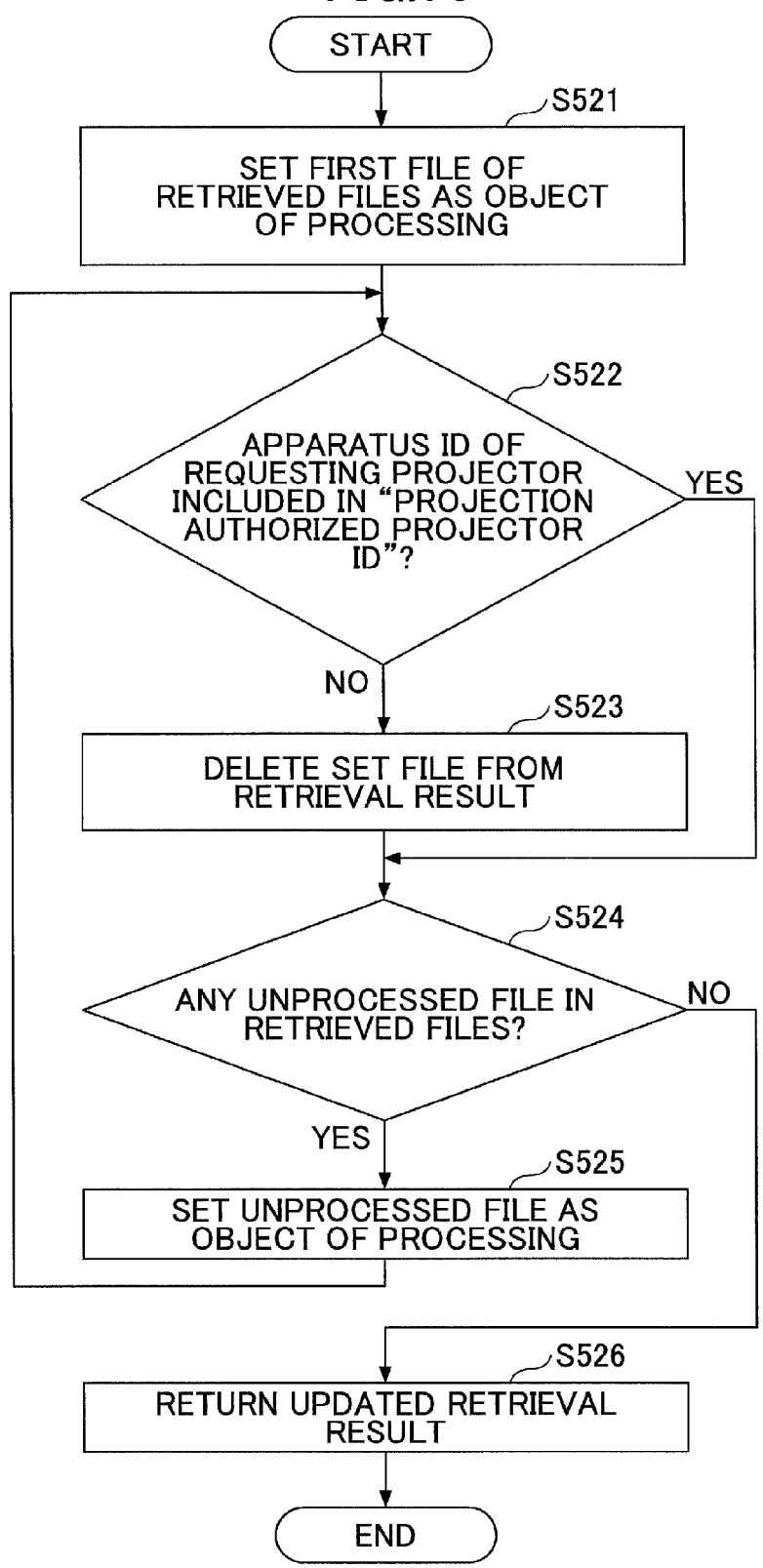
FIG. 70 is a flowchart illustrating a file information filtering process according to the third embodiment.

FIG. 70 is a flowchart illustrating a process for filtering file information. Referring to FIG. 70, at step S521, the internal storage service controller 45 sets the first file in retrieved file information as an object of processing.

At step S522, the internal storage service controller 45 determines whether the apparatus ID of the projector 15 that has made a file GET request is included in Projection Authorized Projector ID.

If the apparatus ID of the projector 15 that has made a file GET request is not included in Projection Authorized Projector ID (NO at step S522), the internal storage service controller 45 proceeds to step S524 after execution of the process of step S523. At step S523, the internal storage service controller 45 deletes the file set as an object of processing from the retrieved file information.

If the apparatus ID of the projector 15 that has made a file GET request is included in Projection Authorized Projector ID (YES at step S522), the internal storage service controller 45 proceeds to step S524 without execution of the process of step S523.

At step S524, the internal storage service controller 45 determines whether there is any unprocessed file in the retrieved file information. If there is an unprocessed file (YES at step S524), at step S525, the internal storage service controller 45 sets the unprocessed file as an object of processing. Then, the internal storage service controller 45 returns to step S522 and continues the process.

If the internal storage service controller 45 determines that there is no unprocessed file left in the retrieved information (NO at step S524), at step S526, the internal storage service controller 45 returns an undeleted (remaining) portion of the retrieved file information (the filtered file information).

FIG. 71 is a diagram illustrating an image of another access number-based apparatus authentication setting screen. An access number-based apparatus authentication setting screen 2070 of FIG. 71 is a combination of the access number-based apparatus authentication setting screen 2010 of FIG. 52 and a field 2071 for entering a one-time password and a REGISTER button 2072 for registering the one-time password.

A process for registering the ID of a projector using a one-time password is started by, for example, an operator entering a one-time password in the field 2071 and depressing the REGISTER button 2072 on the access number-based apparatus authentication setting screen 2070.

Figure 72:
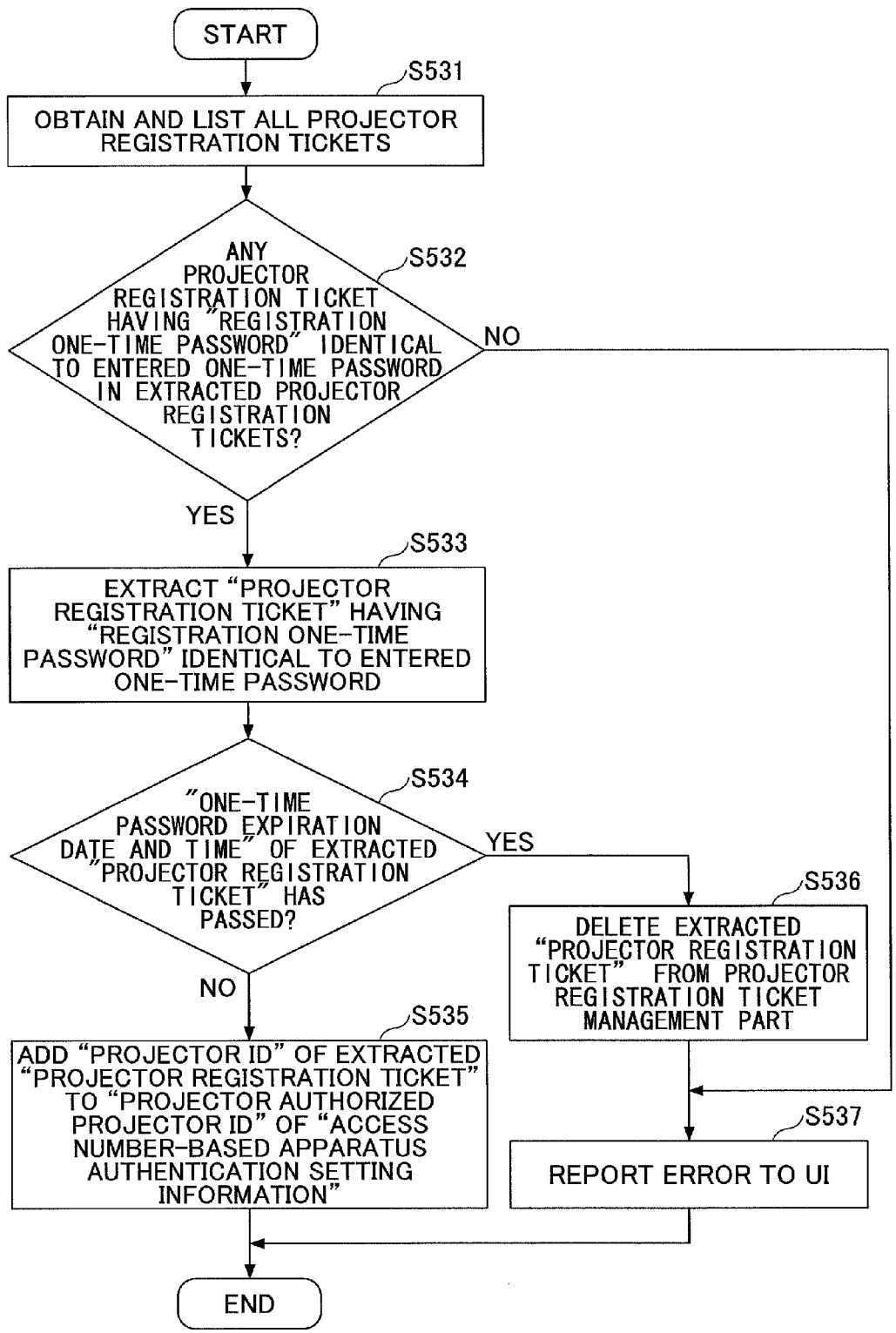
FIG. 72 is a flowchart illustrating a projector registration process using a one-time password according to the third embodiment.

FIG. 72 is a flowchart illustrating a projector registration process using a one-time password. Referring to FIG. 72, at step S531, the setting part 51 (FIG. 4) obtains and lists all projector registration tickets from the projector registration ticket management part 40. At step S532, the setting part 51 determines whether there is a projector registration ticket that has a "registration one-time password" identical to the one-time password entered in the field 2071 in the listed projector registration tickets.

If there is such a projector registration ticket (YES at step S532), at step S533, the setting part 51 extracts the projector registration ticket that has a "registration one-time password" identical to the one-time password entered in the field 2071.

At step S534, the setting part 51 determines whether the "one-time password expiration date and time" of the extracted projector registration ticket has passed. If the "one-time password expiration date and time" of the extracted projector registration ticket has not passed (NO at step S534), at step S535, the setting part 51 adds the "projector ID" of the extracted projector registration ticket to Projection Authorized Projector ID of the access number-based apparatus authentication setting information.

If it is determined at step S532 that there is no projector registration ticket that has a "registration one-time password" identical to the one-time password entered in the field 2071 (NO at step S532), at step S537, the setting part 51 reports an error to a user interface (UI). For example, a message indicating the failure of a projector registration process using the one-time password entered in the field 2071 is displayed on the apparatus authentication setting screen 2070.

Furthermore, if it is determined at step S534 that the "one-time password expiration date and time" of the extracted projector registration ticket has passed (YES at step S534), at step S536, the setting part 51 deletes the projector registration ticket whose "one-time password expiration date and time" has passed from the projector registration ticket management part 40. Then, at step S537, the setting part 51 reports an error to the UI.

Figure 73:
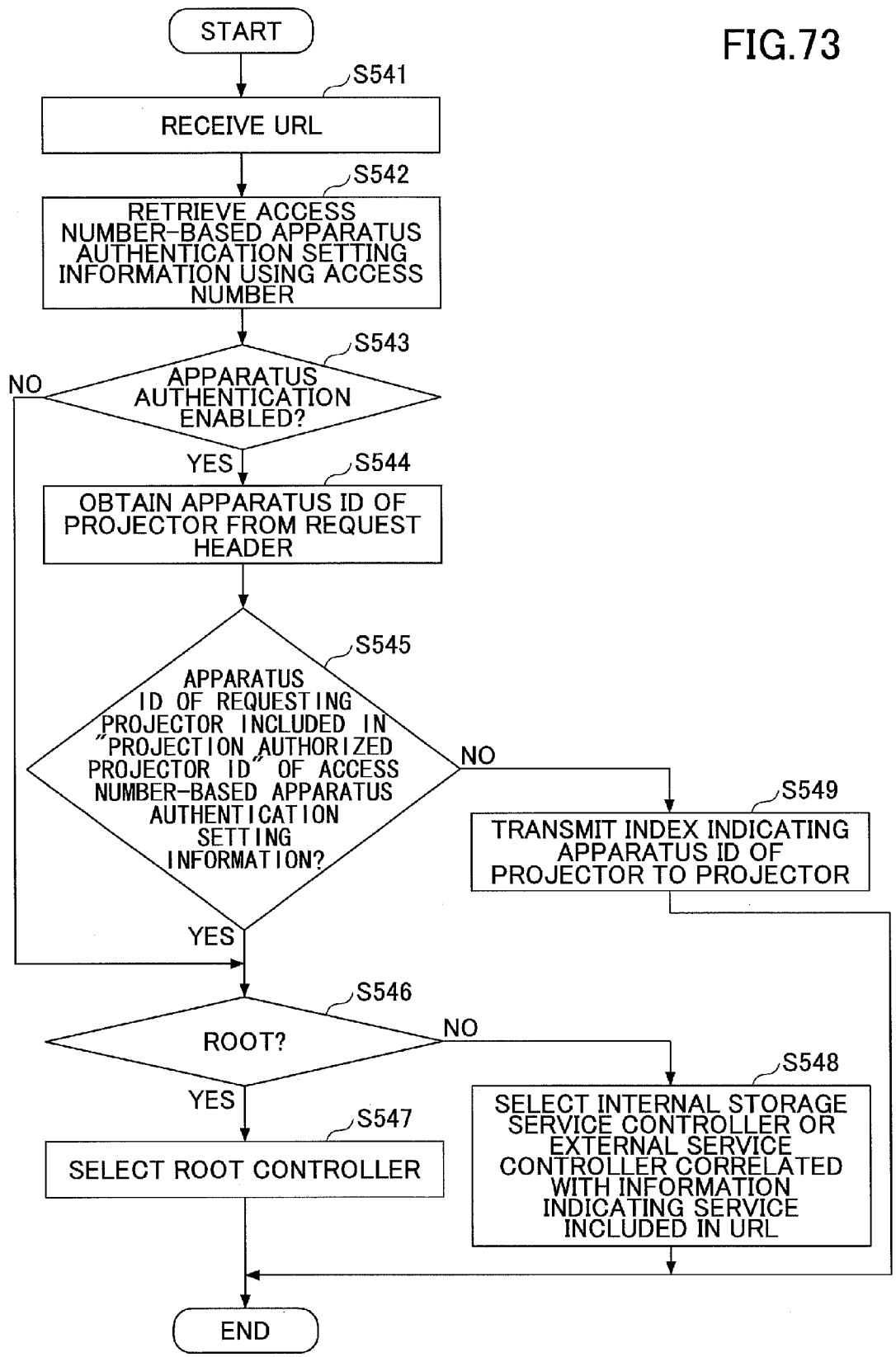
FIG. 73 is a flowchart illustrating another procedure for processes of a dispatcher part and a controller part according to the third embodiment.

FIG. 73 is a flowchart illustrating another procedure for processes of a dispatcher part and a controller part. The process of the flowchart of FIG. 73 is the same as the process of the flowchart of FIG. 53 except for some parts. Accordingly, a description of the process of the flowchart of FIG. 73 is omitted where appropriate.

The process of steps S541 through S543 of FIG. 73 is the same as the process of steps S311 through S313 of FIG. 53. If it is determined at step S543 that the apparatus authentication setting included in the access number-based apparatus authentication setting information is "enabled" (YES at step S543), at step S544, the dispatcher part 32 obtains the apparatus ID of the projector 15 from a request header.

At step S545, the dispatcher part 32 determines whether the apparatus ID of the (requesting) projector 15 obtained at step S544 is included in Projection Authorized Projector ID of the access number-based apparatus authentication setting information.

If the dispatcher part 32 determines that the apparatus ID is included (YES at step S545), at step S546, the dispatcher part 32 determines whether the received URL is a root. The process of steps S246 through S248 is the same as the process of steps S317, S318, and S320.

If the dispatcher part 32 determines at step S545 that the obtained apparatus ID of the projector 15 is not included in Projection Authorized Projector ID of the access number-based apparatus authentication setting information (NO at step S545), at step S549, the dispatcher part 32 notifies the access control part 54 of the apparatus authentication controller 47 (FIG. 4) that the obtained apparatus ID of the projector 15 is not included.

The access control part 54 transmits an index indicating the apparatus ID of the projector 15 as illustrated in FIG. 16 to the projector 15. The process of step S549 is executed when the apparatus ID of the requesting projector 15 is not set in Projection Authorized Projector ID of the access number-based apparatus authentication setting information and projection of contents is therefore prevented. The operator of the projector 15 is enabled to project contents by, for example, registering the apparatus ID of the projector 15 from the access number-based apparatus authentication setting screen 2010 of FIG. 52.

In response to reception of the index file of FIG. 16, the projector 15 projects, for example, a file list screen 600 as illustrated in FIG. 17.

The file list screen 600 of FIG. 17 is displayed when the requesting projector 15 is not set in Projection Authorized Projector ID. The apparatus ID of the projector 15 to be registered is included in an index on the file list screen 600. This allows the operator to determine the apparatus ID of the projector 15 to be registered without checking a certificate of product registration shipped with the product.

The file displayed on the file list screen of FIG. 17 is merely an index without an actual file. Therefore, nothing is displayed in response to its selection. Furthermore, the apparatus ID displayed on the file list screen of FIG. 17 may be a one-time password that is correlated with the apparatus ID of the projector 15 by a projector registration ticket. Furthermore, the process of steps S543 through S545 of FIG. 73 may be added to processes of the root controller 44 and the external service controller 46.

Figure 74:
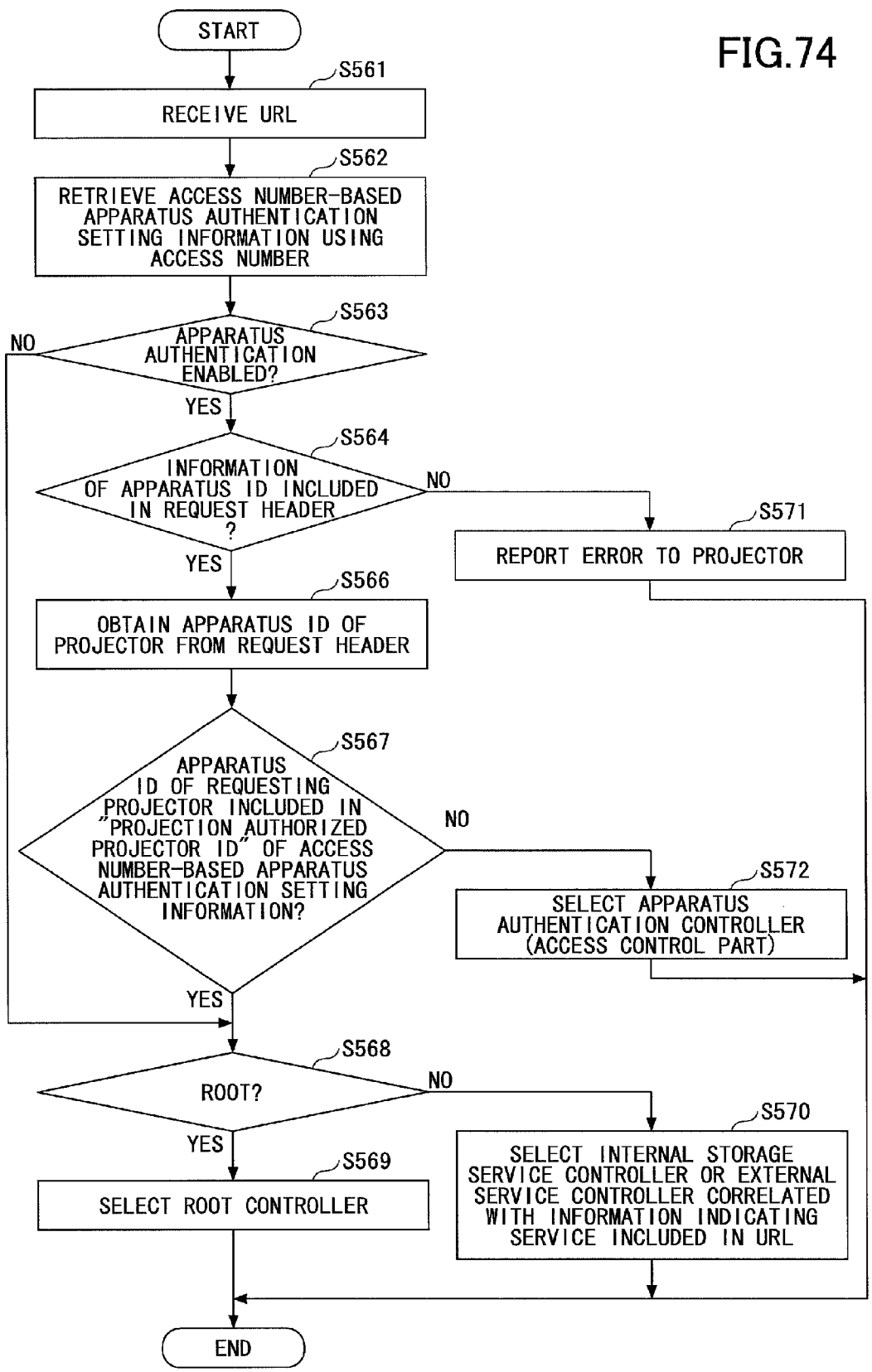
FIG. 74 is a flowchart illustrating another procedure for processes of a dispatcher part and a controller part according to the third embodiment.

FIG. 74 is a flowchart illustrating another procedure for processes of a dispatcher part and a controller part. The process of the flowchart of FIG. 74 is the same as the process of the flowchart of FIG. 73 except for some parts, and accordingly, its description is omitted where appropriate.

The process of steps S561 through S563 is the same as the process of steps S541 through S543 of FIG. 73. If it is determined at step S563 that the apparatus authentication setting is "enabled" (YES at step S563), at step S564, the dispatcher part 32 determines whether the apparatus ID of the projector 15 is included in a request header.

If the dispatcher part 32 determines that the apparatus ID of the projector 15 is included in a request header (YES at step S564), at step S566, the dispatcher part 32 obtains the apparatus ID of the projector 15 from the request header. The process of steps S567 through S570 is the same as the process of steps S545 through S548 of FIG. 73.

If the dispatcher part 32 determines that the apparatus ID of the projector 15 is not included in a request header (NO at step S564), at step S571, the dispatcher part 32 reports an error to the projector 15.

If the dispatcher part 32 determines at step S567 that the obtained apparatus ID of the projector 15 is not included in Projection Authorized Projector ID of the access number-based apparatus authentication setting information (NO at step S567), at step S572, the dispatcher part 32 selects the access control part 54 of the apparatus authentication controller 47 (FIG. 4) and notifies the access control part 54 that the obtained apparatus ID of the projector 15 is not included.

The apparatus authentication controller 47 executes a process as described below in order to cause the operator of the projector 15 to register the apparatus ID of the projector 15 in Projection Authorized Projector ID of the access number-based apparatus authentication setting information. Such forms as described below are possible for the process of step S572.

Figure 75:
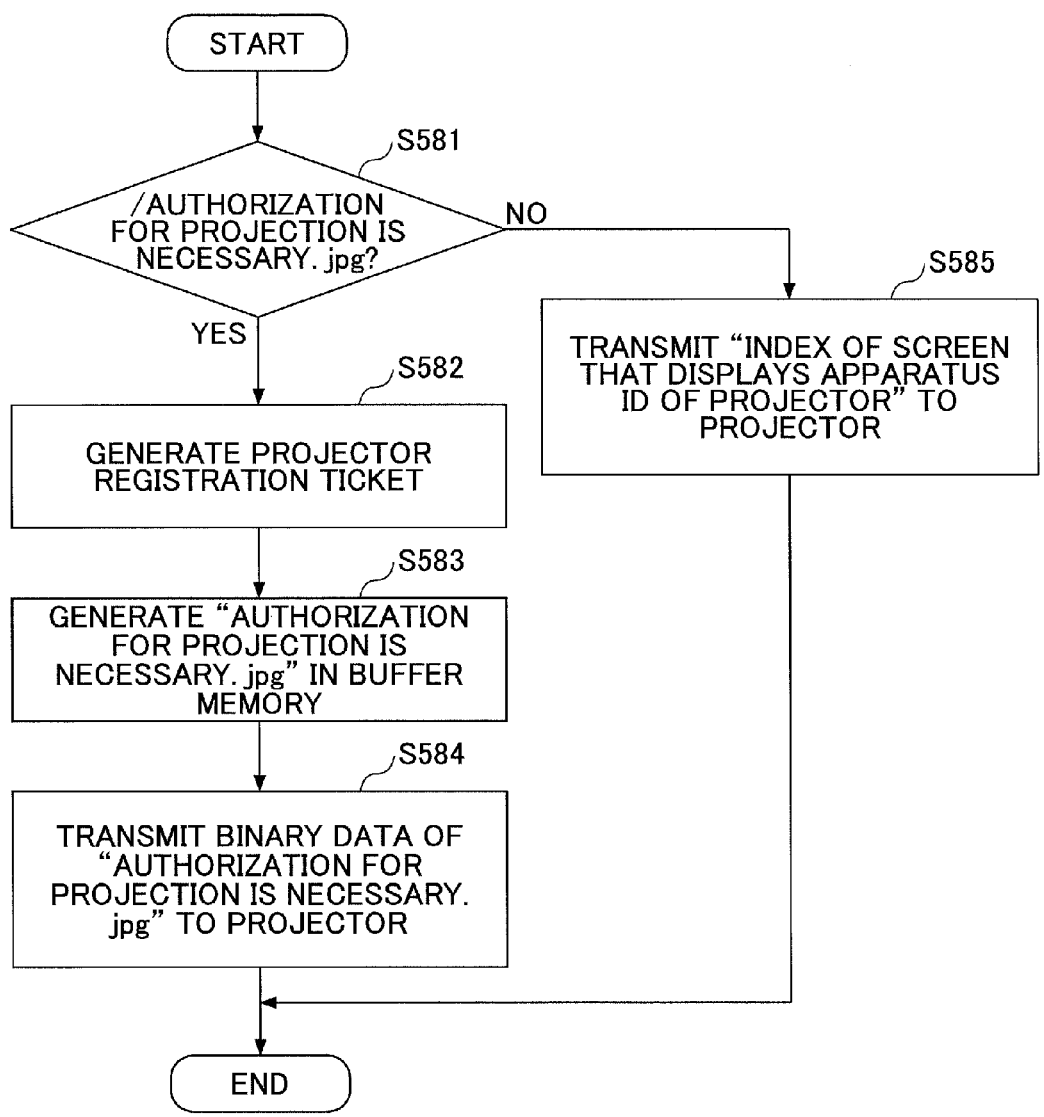
FIG. 75 is a flowchart illustrating a procedure for a process of an apparatus authentication controller according to the third embodiment.

FIG. 75 is a flowchart illustrating a procedure for a process of an apparatus authentication controller. Referring to FIG. 75, at step S581, the access control part 54 of the apparatus authentication controller 47 (FIG. 4) determines whether an input is a request for the projection (selection) of "AUTHORIZATION FOR PROJECTION IS NECESSARY.jpg".

If an input is not a request for the projection (selection) of "AUTHORIZATION FOR PROJECTION IS NECESSARY.jpg" (NO at step S581), at step S585, the access control part 54 transmits the "index of a screen that displays the apparatus ID of a projector" as illustrated in FIG. 20 to the projector 15.

In response to reception of the index file of FIG. 20, the projector 15 projects, for example, a file list screen 700 as illustrated in FIG. 21. The file list screen 700 of FIG. 21 is displayed in response to the entering of an access number when the requesting projector 15 is not set in Projection Authorized Projector ID. Accordingly, it is possible for the operator to determine that authorization for projection is necessary to project contents with the projector 15.

If "AUTHORIZATION FOR PROJECTION IS NECESSARY.jpg" is selected on the file list screen 700 (YES at step S581), at step S582, the registration ticket generation part 52 (FIG. 4) of the apparatus authentication controller 47 executes a process for generating a projector registration ticket (a projector registration ticket generation process) for the projector 15. A description is given in detail below of the projector registration ticket generation process of step S582.

At step S583, the projection screen generation part 53 (FIG. 4) of the apparatus authentication controller 47 generates the binary data of "AUTHORIZATION FOR PROJECTION IS NECESSARY.jpg" in a buffer memory as described below. At step 5584, the access control part 54 transmits the binary data of "AUTHORIZATION FOR PROJECTION IS NECESSARY.jpg" to the projector 15.

In response to reception of the binary data of "AUTHORIZATION FOR PROJECTION IS NECESSARY.jpg", the projector 15 projects, for example, a notification screen 2100 as illustrated in FIG. 76. FIG. 76 is a diagram illustrating an image of a notification screen that is projected when "AUTHORIZATION FOR PROJECTION IS NECESSARY.jpg" is selected. The notification screen 2100 of FIG. 76 includes an apparatus ID and a one-time password. Accordingly, it is possible for the operator to easily determine an apparatus ID and/or a one-time password to be registered on the access number-based apparatus authentication setting screen 2070 of FIG. 71, for example.

Figure 77:
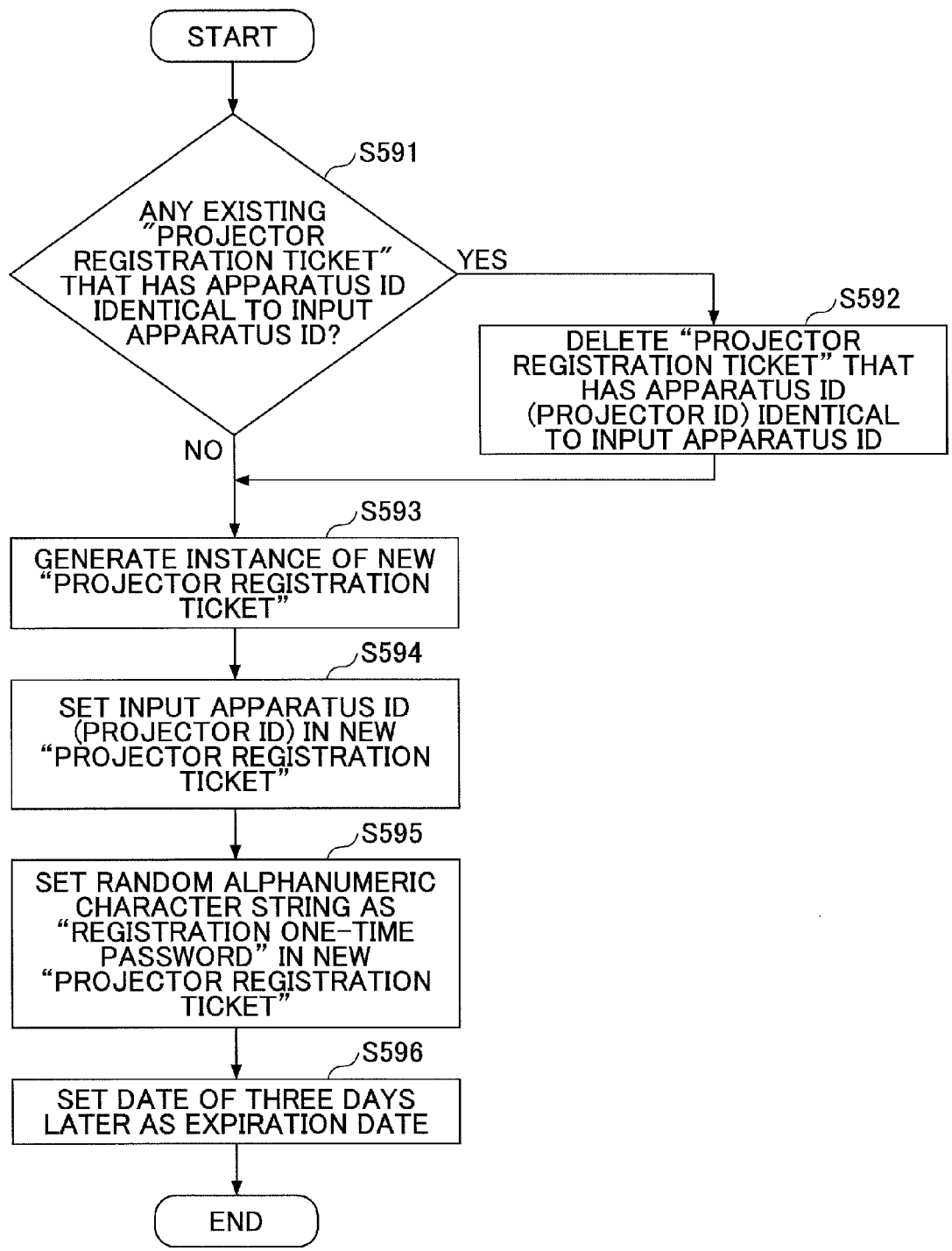
FIG. 77 is a flowchart illustrating a projector registration ticket generation process according to the third embodiment.

FIG. 77 is a flowchart illustrating a projector registration ticket generation process. Referring to FIG. 77, at step S591, the registration ticket generation part 52 determines whether there is a projector registration ticket that has an apparatus ID obtained from a request header as a "projector ID," referring to the existing projector registration tickets managed by the projector registration ticket management part 40 (FIG. 4).

If there is a projector registration ticket that has an apparatus ID obtained from a request header as a "projector ID" (YES at step S591), the registration ticket generation part 52 executes the process of step S593 after execution of the process of step S592. If there is no projector registration ticket that has an apparatus ID obtained from a request header as a "projector ID" (NO at step S591), the registration ticket generation part 52 executes the process of step S593 without execution of the process of step S592.

At step S592, the registration ticket generation part 52 deletes the projector registration ticket that has an apparatus ID obtained from a request header as a "projector ID" from the projector registration ticket management part 40.

At step S593, the registration ticket generation part 52 generates the instance of a new projector registration ticket. At step S594, the registration ticket generation part 52 sets the apparatus ID obtained from the request header in Projector ID of the new projector registration ticket.

At step S595, the registration ticket generation part 52 sets a random alphanumeric character string in Registration One-Time Password of the new projector registration ticket. At step S596, the registration ticket generation part 52 sets, for example, the date of three days later in One-Time Password Expiration Date & Time of the new projector registration tickets.

Figure 78:
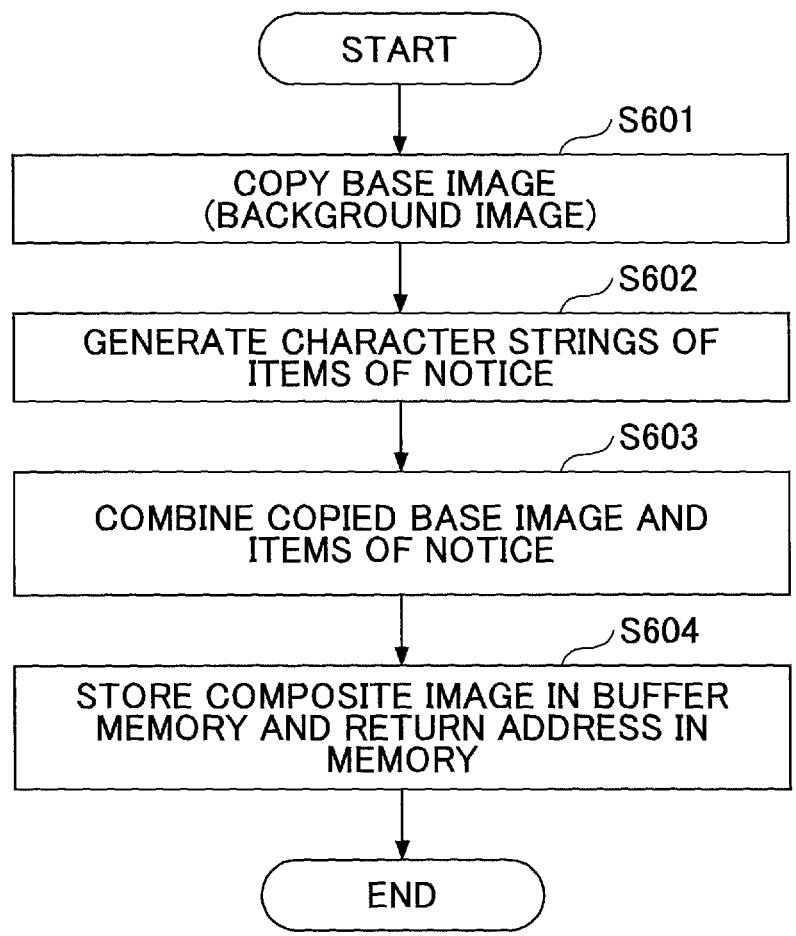
FIG. 78 is a flowchart illustrating a process for generating the binary data of "AUTHORIZATION FOR PROJECTION IS NECESSARY.jpg" according to the third embodiment.

FIG. 78 is a flowchart illustrating a process for generating the binary data of "AUTHORIZATION FOR PROJECTION IS NECESSARY.jpg". FIGS. 79A and 79B are diagrams illustrating a base image and notice items. Referring to FIG. 78, at step S601, the projection screen generation part 53 (FIG. 4) makes a copy of, for example, the base image (background image) illustrated in FIG. 79A. At step S602, the projection screen generation part 53 generates character strings of, for example, the notice items illustrated in FIG. 79B. The character strings of the notice items represent an apparatus ID, a one-time password, and an expiration date and time, which correspond to a projector ID, a registration one-time password, and a one-time password expiration date and time, respectively, set in the projector registration ticket.

At step S603, the projection screen generation part 53 combines the copy of the base image and the generated character strings of the notice items. At step S604, the projection screen generation part 53 stores the binary data of the composite notice image (notification screen) 2100 (FIG. 76), into which the base image and the character strings of the notice items have been combined, in a buffer memory, and returns an address at which the binary data of the notice image 2100 is stored to the access control part 54.

FIGS. 80A and 80B are diagrams illustrating other base image and notice items. FIG. 80A illustrates a base image (background image). The base image of FIG. 80A includes parts into which Notice Items 1 through 4 are incorporated.

The character strings of notice items include an apparatus ID, an access number, a one-time password, and an expiration date and time.

The projection screen generation part 53 may generate the binary data of a notification screen including an apparatus ID, an access number, a one-time password, and an expiration date and time by combining the base image of FIG. 80A and the notice items of FIG. 80B.

FIG. 81 is a flowchart illustrating another procedure for processes of a dispatcher part and a controller part. The process of the flowchart of FIG. 81 is the same as the process of the flowchart of FIG. 73 except for some parts, and accordingly, its description is omitted where appropriate.

Referring to FIG. 81, at step S611, the dispatcher part 32 receives a URL from the HTTP server part 31. At step S612, the dispatcher part 32 determines whether the access number included in the received URL is "0000."

If the access number included in the received URL is not "0000" (NO at step S612), at step S613, the dispatcher part 32 retrieves access number-based apparatus authentication setting information from the user management part 37 based on the access number.

At step S614, the dispatcher part 32 determines whether the received URL is a root. If the received URL is a root (YES at step S614), at step S615, the dispatcher part 32 selects the root controller 44 and delivers the URL to the root controller 44. If the received URL is not a root (NO at step S614), the dispatcher part 32 executes the process of step S616.

At step S616, based on information indicating a service ("local," "ext1," etc.) included in the received URL, the dispatcher part 32 selects the internal storage service controller 45 or the external service controller 46 correlated with the information indicating a service, and delivers the URL to the selected internal storage service controller 45 or external service controller 46.

If the access number included in the received URL is "0000" (YES at step S612), at step S617, the dispatcher part 32 selects the access control part 54 of the apparatus authentication controller 47 and notifies the access control part 54 that the access number included in the received URL is "0000." The apparatus authentication controller 47 executes, for example, the process as illustrated in FIG. 75 in order to cause an operator of the projector 15 to register the apparatus ID of the projector 15 in Projection Authorized Projector ID of the access number-based apparatus authentication setting information.

According to the projection system 1 of this embodiment, by pre-specifying the projector 15 that is authorized to obtain contents, it is possible to prevent projectors other than the pre-specified projector 15 from obtaining the contents even when a passcode that removes access restriction, such as an access number, is brought to the knowledge of a malicious third party or an IC card that removes a restriction placed by an access code is obtained by a malicious third party.

Furthermore, according to the projection system 1 of this embodiment, it is possible to pre-specify the projector 15 authorized to obtain contents even without logging on. Therefore, it is possible to prevent projectors other than the pre-specified projector 15 from obtaining the contents even when a passcode that removes access restriction, such as an access number, is brought to the knowledge of a malicious third party or an IC card that removes a restriction placed by an access code is obtained by a malicious third party. Accordingly, in the case of no logging on, there is no need for the projection system 1 to have authentication information, thus reducing the risk of leakage of information.

Thus, according to the projection system 1 of this embodiment, it is possible to increase the convenience of the projector 15.

In the above-described embodiments, the access number may correspond to access authority information, Projection Authorized Projector ID may correspond to the identification information of an image display apparatus authorized to display contents, and the access number-based apparatus authentication setting information may correspond to apparatus authentication setting information.

Applications of elements, expressions, or any combinations thereof according to aspects of the present invention to methods, apparatuses, systems, computer programs, recording media, and data structures are effective as embodiments of the present invention.

Various aspects of the subject-matter described herein may be set out non-exhaustively in the following numbered clauses:

1. A server connectable via a network to one or more apparatuses providing a plurality of contents and to an image display apparatus displaying the contents, the server including:

an index information processing part configured to provide the image display apparatus with index information for causing a list of information items associated with the contents to be displayed by the image display apparatus;

an image data processing part configured to provide the image display apparatus with image data for causing a content associated with an information item selected from the list to be displayed by the image display apparatus; and an apparatus authentication part configured to cause the index information processing part and the image data processing part to execute respective processes when identification information of the image display apparatus that has requested to obtain the content associated with the selected information item by using access authority information regarding authority to access the content is managed in correlation with the access authority information.

2. The server of clause 1, wherein the apparatus authentication part is configured to cause the index information processing part and the image data processing part to execute respective processes, when the identification information of the image display apparatus is registered as identification information of an image display apparatus authorized to display the content in apparatus authentication setting information including the access authority information.

3. The server of clause 2, wherein the apparatus authentication part is configured to set the access authority information without setting the identification information of the image display apparatus authorized to display the content, when the apparatus authentication part newly registers the apparatus authentication setting information.

4. The server of clause 2, wherein the apparatus authentication part is configured to receive a setting as to whether to enable or disable apparatus authentication using the apparatus authentication setting information, when the apparatus authentication part sets the identification information of the image display apparatus authorized to display the content in correlation with the access authority information in the apparatus authentication setting information.

5. The server of clause 2, wherein the apparatus authentication part is configured to receive a setting as to whether to enable or disable apparatus authentication using the apparatus authentication setting information, when the apparatus authentication part receives a request to upload the content from the one or more apparatuses.

6. The server of clause 2, wherein the apparatus authentication part is configured to use apparatus authentication setting information specified by other access authority information, when the apparatus authentication part sets the identification information of the image display apparatus authorized to display the content in correlation with the access authority information in the apparatus authentication setting information.

7. The server of clause 2, wherein the apparatus authentication part is configured to fix the apparatus authentication setting information.

8. The server of clause 7, wherein the apparatus authentication part is configured to fix the apparatus authentication setting information after setting the identification information of the image display apparatus authorized to display the content in correlation with the access authority information in the apparatus authentication setting information.

9. The server of clause 7, wherein the apparatus authentication part includes a user interface configured to receive a setting as to whether to enable or disable a function of fixing the apparatus authentication setting information.

10. The server of clause 2, wherein the apparatus authentication part is configured to set the apparatus authentication setting information using apparatus authentication setting information specified by other access authority information, when the apparatus authentication part receives a request to upload the content from the one or more apparatuses.

11. The server of clause 2, wherein the apparatus authentication part is configured to set, content by content, the identification information of the image display apparatus authorized to display the content in correlation with the access authority information in the apparatus authentication setting information.

12. The server of clause 2, wherein the apparatus authentication part is configured to prevent the index information processing part and the image data processing part from executing respective processes, and to provide the image display apparatus with index information for causing the identification information of the image display apparatus to be displayed by the image display apparatus, when the identification information of the image display apparatus that has requested to obtain the content is not registered as the identification information of the image display apparatus authorized to display the content in the apparatus authentication setting information.

13. The server of clause 2, wherein the apparatus authentication part is configured to prevent the index information processing part and the image data processing part from executing respective processes, and to provide the image display apparatus with index information for causing authentication information, correlated with the identification information of the image display apparatus that has requested to obtain the content, to be displayed by the image display apparatus, when the identification information of the image display apparatus that has requested to obtain the content is not registered as the identification information of the image display apparatus authorized to display the content in the apparatus authentication setting information.

14. The server of clause 1, wherein the image display apparatus is a projector.

15. A non-transient computer-readable recording medium having an executable program recorded thereon, wherein the program instructs a computer processor to implement, in a server connectable via a network to one or more apparatuses providing a plurality of contents and to an image display apparatus displaying the contents, an index information processing part configured to provide the image display apparatus with index information for causing a list of information items associated with the contents to be displayed by the image display apparatus;

an image data processing part configured to provide the image display apparatus with image data for causing a content associated with an information item selected from the list to be displayed by the image display apparatus; and an apparatus authentication part configured to cause the index information processing part and the image data processing part to execute respective processes when identification information of the image display apparatus that has requested to obtain the content associated with the selected information item by using access authority information regarding authority to access the content is managed in correlation with the access authority information.

16. The non-transient computer-readable recording medium of clause 15, wherein the apparatus authentication part is configured to cause the index information processing part and the image data processing part to execute respective processes, when the identification information of the image display apparatus is registered as identification information of an image display apparatus authorized to display the content in apparatus authentication setting information including the access authority information.

17. An image display system, including:

one or more apparatuses configured to provide a plurality of contents;

an image display apparatus configured to display the contents; and a server connected to the one or more apparatuses and the image display apparatus via a network, wherein the server includes an index information processing part configured to provide the image display apparatus with index information for causing a list of information items associated with the contents to be displayed by the image display apparatus;

an image data processing part configured to provide the image display apparatus with image data for causing a content associated with an information item selected from the list to be displayed by the image display apparatus; and an apparatus authentication part configured to cause the index information processing part and the image data processing part to execute respective processes when identification information of the image display apparatus that has requested to obtain the content associated with the selected information item by using access authority information regarding authority to access the content is managed in correlation with the access authority information, and wherein the image display apparatus includes a first display part configured to display a screen of the list of the information items associated with the contents based on the provided index information; and a second display part configured to display a screen of the content associated with the selected information item based on the provided image data.

18. The image display system of clause 17, wherein the apparatus authentication part is configured to cause the index information processing part and the image data processing part to execute respective processes, when the identification information of the image display apparatus is registered as identification information of an image display apparatus authorized to display the content in apparatus authentication setting information including the access authority information.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A server connectable via a network to one or more apparatuses providing a plurality of contents and to an image display apparatus displaying the contents, the server comprising:
    a computer processor; and
    a memory storing a program that, when executed by the processor, causes the server to
    provide the image display apparatus with index information for causing a list of information items associated with the contents to be displayed by the image display apparatus;
    provide the image display apparatus with image data for causing a content associated with an information item selected from the list to be displayed by the image display apparatus; and
    determine whether identification information of the image display apparatus that has requested to obtain the content associated with the selected information item is managed in correlation with access authority information used by the image display apparatus to request to obtain the content, the access authority information being information regarding authority to access the content,
    wherein the server is caused to provide the image display apparatus with the index information and the image data when the server determines that the identification information of the image display apparatus is managed in correlation with the access authority information, and
    wherein the server is caused to generate link information regarding a link to a screen for registering the identification information of the image display apparatus that has requested to obtain the content in correlation with the access authority information, generate code information of the link information, and provide the image display apparatus with index information for causing the code information to be displayed by the image display apparatus, when the server determines that the identification information of the image display apparatus that has requested to obtain the content is not managed in correlation with the access authority information.

2. The server as claimed in claim 1, wherein the server is caused to provide the image display apparatus with the index information and the image data, when the identification information of the image display apparatus that has requested to obtain the content is registered as identification information of an image display apparatus authorized to display the content in user information including the access authority information.

3. The server as claimed in claim 1, wherein
    the access authority information is included in user information, and
    the server is caused to provide the image display apparatus with the index information and the image data, when the identification information of the image display apparatus that has requested to obtain the content is registered as identification information of an image display apparatus authorized to display the content in display authorization information including identification information of one or more image display apparatuses authorized to display a content user by user and content by content.

4. The server as claimed in claim 1, wherein the link information includes at least one of
    the identification information of the image display apparatus that has requested to obtain the content by using the access authority information, and
    authentication information correlated with the identification information of the image display apparatus.

5. The server as claimed in claim 1, wherein the server is further caused to generate the index information or the image data, based on the content that the image display apparatus that has requested to obtain the content by using the access authority information is authorized to display.

6. The server as claimed in claim 1, wherein
    the authority information is included in user information, and
    the user information includes information that enables or disables said determining by the server.

7. The server as claimed in claim 1, wherein the image display apparatus is a projector.

8. A non-transient computer-readable recording medium having an executable program recorded thereon, wherein the program, when executed by a computer processor in a server connectable via a network to one or more apparatuses providing a plurality of contents and to an image display apparatus displaying the contents, causes the server to
    provide the image display apparatus with index information for causing a list of information items associated with the contents to be displayed by the image display apparatus;
    provide the image display apparatus with image data for causing a content associated with an information item selected from the list to be displayed by the image display apparatus; and
    determine whether identification information of the image display apparatus that has requested to obtain the content associated with the selected information item is managed in correlation with access authority information used by the image display apparatus to request to obtain the content, the access authority information being information regarding authority to access the content,
    wherein the server is caused to provide the image display apparatus with the index information and the image data when the server determines that the identification information of the image display apparatus is managed in correlation with the access authority information, and
    wherein the server is caused to generate link information regarding a link to a screen for registering the identification information of the image display apparatus that has requested to obtain the content in correlation with the access authority information, generate code information of the link information, and provide the image display apparatus with index information for causing the code information to be displayed by the image display apparatus, when the server determines that the identification information of the image display apparatus that has requested to obtain the content is not managed in correlation with the access authority information.

9. The non-transient computer-readable recording medium as claimed in claim 8, wherein the server is caused to provide the image display apparatus with the index information and the image data, when the identification information of the image display apparatus that has requested to obtain the content is registered as identification information of an image display apparatus authorized to display the content in user information including the access authority information.

10. The non-transient computer-readable recording medium as claimed in claim 8, wherein
the access authority information is included in user information, and
the server is caused to provide the image display apparatus with the index information and the image data, when the identification information of the image display apparatus that has requested to obtain the content is registered as identification information of an image display apparatus authorized to display the content in display authorization information including identification information of one or more image display apparatuses authorized to display a content user by user and content by content.

11. The non-transient computer-readable recording medium as claimed in claim 8, wherein the image display apparatus is a projector.

12. An image display system, comprising:
one or more apparatuses configured to provide a plurality of contents;
an image display apparatus configured to display the contents; and
a server connected to the one or more apparatuses and the image display apparatus via a network,
wherein the server includes
a computer processor; and
a memory storing a program that, when executed by the processor, causes the server to
provide the image display apparatus with index information for causing a list of information items associated with the contents to be displayed by the image display apparatus;
provide the image display apparatus with image data for causing a content associated with an information item selected from the list to be displayed by the image display apparatus; and
determine whether identification information of the image display apparatus that has requested to obtain the content associated with the selected information item is managed in correlation with access authority information used by the image display apparatus to request to obtain the content, the access authority information being information regarding authority to access the content,
wherein the server is caused to provide the image display apparatus with the index information and the image data when the server determines that the identification information of the image display apparatus is managed in correlation with the access authority information, and
wherein the server is caused to generate link information regarding a link to a screen for registering the identification information of the image display apparatus that has requested to obtain the content in correlation with the access authority information, generate code information of the link information, and provide the image display apparatus with index information for causing the code information to be displayed by the image display apparatus, when the server determines that the identification information of the image display apparatus that has requested to obtain the content is not managed in correlation with the access authority information, and
wherein the image display apparatus displays a screen of the list of the information items associated with the contents based on the provided index information; and displays a screen of the content associated with the selected information item based on the provided image data.

13. The image display system as claimed in claim 12, wherein the server is caused to provide the image display apparatus with the index information and the image data, when the identification information of the image display apparatus that has requested to obtain the content is registered as identification information of an image display apparatus authorized to display the content in user information including the access authority information.

14. The image display system as claimed in claim 12, wherein
the access authority information is included in user information, and
the server is caused to provide the image display apparatus with the index information and the image data, when the identification information of the image display apparatus that has requested to obtain the content is registered as identification information of an image display apparatus authorized to display the content in display authorization information including identification information of one or more image display apparatuses authorized to display a content user by user and content by content.

15. The image display system as claimed in claim 12, wherein the image display apparatus is a projector.

* * * * *